United States Patent
Matsumura et al.

(10) Patent No.: US 10,547,483 B2
(45) Date of Patent: *Jan. 28, 2020

(54) OFDM TRANSMITTER DEVICE HAVING A SYMBOL GENERATOR FOR GENERATING NON-ZERO CONTROL SYMBOLS, AND OFDM TRANSMISSION METHOD INCLUDING GENERATING NON-ZERO CONTROL SYMBOLS

(71) Applicant: Sun Patent Trust, New York, NY (US)

(72) Inventors: Yoshinobu Matsumura, Osaka (JP); Tomohiro Kimura, Osaka (JP); Mikihiro Ouchi, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,505

(22) Filed: Dec. 27, 2018

(65) Prior Publication Data

US 2019/0132179 A1  May 2, 2019

Related U.S. Application Data

(60) Continuation of application No. 14/657,158, filed on Mar. 13, 2015, now Pat. No. 10,218,554, which is a
(Continued)

(30) Foreign Application Priority Data

Jan. 8, 2010 (JP) .................... 2010-002634

(51) Int. Cl.
*H04L 27/26* (2006.01)
*H04L 5/00* (2006.01)

(52) U.S. Cl.
CPC ........ *H04L 27/2647* (2013.01); *H04L 5/0048* (2013.01); *H04L 27/2607* (2013.01);
(Continued)

(58) Field of Classification Search
USPC .......................................... 375/340, 259, 260
See application file for complete search history.

(56) References Cited

U.S. PATENT DOCUMENTS 6,115,354 A  9/2000 Weck
8,520,778 B2  8/2013 Sameer et al.
(Continued)

FOREIGN PATENT DOCUMENTS

CN  1529429  9/2004
CN  1567803  1/2005
(Continued)

OTHER PUBLICATIONS

Zhou et. al, "Brief Review of DVB-T2 Standard," Video Engineering, vol. 33, No. 5, May 31, 2009.*
(Continued)

*Primary Examiner* — Kevin M Burd
(74) *Attorney, Agent, or Firm* — Wenderoth, Lind & Ponack, L.L.P.

(57) ABSTRACT

An OFDM transmitter and an OFDM receiver respectively transmit and receive N (N≥2, N is an integer) control symbols. For each control symbol, a guard interval time-domain signal is, for example, identical to a signal obtained by frequency-shifting at least a portion of a useful symbol time-domain signal by an amount different from any other symbol, or to a signal obtained by frequency-shifting one or both of a portion and a span of a useful symbol interval time-domain signal different from any other symbol by a predetermined amount.

2 Claims, 59 Drawing Sheets

Related U.S. Application Data continuation of application No. 14/325,998, filed on Jul. 8, 2014, now Pat. No. 9,042,365, which is a division of application No. 13/254,954, filed as application No. PCT/JP2010/007241 on Dec. 13, 2010, now Pat. No. 8,811,370.

(52) U.S. Cl.
CPC ...... *H04L 27/2613* (2013.01); *H04L 27/2662* (2013.01); *H04L 27/2675* (2013.01); *H04L 27/2698* (2013.01); *H04L 27/2649* (2013.01)

(56) References Cited

U.S. PATENT DOCUMENTS

| | | | | |
|---|---|---|---|---|
| 8,811,370 | B2* | 8/2014 | Matsumura | H04L 5/0048 370/343 |
| 9,042,365 | B2* | 5/2015 | Matsumura | H04L 5/0048 370/343 |
| 2007/0263734 | A1 | 11/2007 | Seki | |
| 2009/0103651 | A1 | 4/2009 | Lahtonen et al. | |
| 2009/0225822 | A1 | 9/2009 | Tupala et al. | |
| 2009/0279647 | A1 | 11/2009 | Kanno | |
| 2009/0296838 | A1 | 12/2009 | Atungsiri et al. | |
| 2010/0118849 | A1 | 5/2010 | Kimura | |
| 2010/0202568 | A1 | 8/2010 | Tokoro et al. | |
| 2010/0265881 | A1 | 10/2010 | Shi et al. | |
| 2010/0272199 | A1 | 10/2010 | Hayashi et al. | |
| 2011/0013718 | A1* | 1/2011 | Ko | H04L 1/0045 375/295 |
| 2011/0044406 | A1 | 2/2011 | Insenser Farre et al. | |

FOREIGN PATENT DOCUMENTS

| | | |
|---|---|---|
| CN | 101485127 | 7/2009 |
| CN | 101594332 | 12/2009 |
| CN | 101689912 | 3/2010 |
| GB | 2454262 | 5/2009 |
| RU | 2292654 | 1/2007 |
| RU | 72 372 | 4/2008 |
| WO | 2007/009228 | 1/2007 |
| WO | 2008/013027 | 1/2008 |
| WO | 2009/028912 | 3/2009 |
| WO | 2009/050552 | 4/2009 |
| WO | 2009/060183 | 5/2009 |
| WO | 2009/074693 | 6/2009 |

OTHER PUBLICATIONS

International Search Report dated Feb. 22, 2011 in International (PCT) Application No. PCT/JP2010/007241.

Digital Video Broadcasting (DVB); Frame structure channel coding and modulation for a second generation digital terrestrial television broadcasting system (DVB-T2), ETSI EN 302 755, V1.1.1, pp. 104-115, Sep. 2009.

Jonathan Scott, "The P1 Symbol, DTG DVB-T2 Implementers' Seminar", pp. 1-16, Oct. 9, 2008.

DVB Bluebook Document A133; Implementation guidelines for a second-generation digital terrestrial television broadcasting system (DVB-T2), ETSI TS 102 831, V1.1.1, Oct. 2010.

Korean Office Action dated Aug. 30, 2012 in Korean Patent Application No. 2011-7020853.

"Digital Video Broadcasting (DVB); Frame structure channel coding and modulation for a second generation digital terrestrial television broadcasting system (DVB-T2)", ETSI EN 302 755 V1.1.1, Sep. 2009.

Decision to Grant dated Apr. 1, 2014 in Russian Patent Application No. 2012128456, together with English translation thereof.

Office Action dated Jun. 5, 2014 in Chinese Patent Application No. 201080011058.6, together with English translation thereof.

Vangelista L, Benvenuto N, Tomasin S, et al., Key technologies for next-generation, A-02 terrestrial digital television standard, DVB-T2, Communications Magazine, IEEE, vol. 47, No. 10.

Vangelista L, Rotoloni M. On the analysis of P1 symbol performance for DVB-T2, Sarnoff Symposium. IEEE.

English Translation of Notice of Preliminary Rejection dated Aug. 30, 2012 in Korean Application No. 10-2011-7020853.

English translation of International Search Report dated Feb. 22, 2011 in International (PCT) Application No. PCT/JP2010/007241.

Vangelista L, Rotoloni M. On the analysis of P1 symbol performance for DVB-T2, Sarnoff Symposium. IEEE, Apr. 1, 2009.

Official Action dated Jun. 8, 2016 in Russian Application No. 2015140800, with English translation.

Decision on Grant dated Nov. 29, 2016 in Russian Application No. 2015140800, with English translation.

Communication pursuant to Rule 164(1) EPC dated May 15, 2017 in European Patent Application No. 10842055.5.

"Digital Video Broadcasting (DVB); Frame structure channel coding and modulation for a second generation digital terrestrial television broadcasting system (DVB-T2)", European Standard (Telecommunications Series), European Telecommunications Standard Institute (ETSI), 650, Route Des Lucioles; F-06921 Sophia-Antipolis; France; No. V1.1.1, Jul. 2009 (Jul. 1, 2009), XP014044393, pp. 110-115.

Office Action dated Jul. 5, 2017 in Chinese Application No. 201510100214.0, with partial English translation.

Office Action dated Jun. 19, 2017 in Chinese Application No. 201510101167.1, with partial English translation.

Extended European Search Report dated Aug. 17, 2017 in European Application No. 10842055.5.

Zhou et al., "Brief Review of DVB-T2 Standard," Video Engineering, vol. 33, No. 5, May 31, 2009, with English language abstract.

* cited by examiner

FIG. 4

| Sub-carrier numbers for Active carriers k(0)...k(383) | |
|---|---|
| k(0)...k(63) CSSs1 | 44 45 47 51 54 59 62 64 65 66 70 75 78 80 81 82 84 85 87 88 89 90<br>94 96 97 98 102 107 110 112 113 114 116 117 119 120 121 122 124<br>125 127 131 132 133 135 136 137 138 142 144 145 146 148 149 151<br>152 153 154 158 160 161 162 166 171 |
| k(64)...k(319) CSSs2 | 172 173 175 179 182 187 190 192 193 194 198 203 206 208 209 210<br>212 213 215 216 217 218 222 224 225 226 230 235 238 240 241 242<br>244 245 247 248 249 250 252 253 255 259 260 261 263 264 265 266<br>270 272 273 274 276 277 279 280 281 282 286 288 289 290 294 299<br>300 301 303 307 310 315 318 320 321 322 326 331 334 336 337 338<br>340 341 343 344 345 346 350 352 353 354 358 363 364 365 367 371<br>374 379 382 384 385 386 390 395 396 397 399 403 406 411 412 413<br>415 419 420 421 423 424 425 426 428 429 431 435 438 443 446 448<br>449 450 454 459 462 464 465 466 468 469 471 472 473 474 478 480<br>481 482 486 491 494 496 497 498 500 501 503 504 505 506 508 509<br>511 515 516 517 519 520 521 522 526 528 529 530 532 533 535 536<br>537 538 542 544 545 546 550 555 558 560 561 562 564 565 567 568<br>569 570 572 573 575 579 580 581 583 584 585 586 588 589 591 595<br>598 603 604 605 607 611 612 613 615 616 617 618 622 624 625 626<br>628 629 631 632 633 634 636 637 639 643 644 645 647 648 649 650<br>654 656 657 658 660 661 663 664 665 666 670 672 673 674 678 683 |
| k(320)...k(383) CSSs1 | 684 689 692 696 698 699 701 702 703 704 706 707 708<br>712 714 715 717 718 719 720 722 723 725 726 727 729<br>733 734 735 736 738 739 740 744 746 747 748 753 756<br>760 762 763 765 766 767 768 770 771 772 776 778 779<br>780 785 788 792 794 795 796 801 805 806 807 809 |

FIG. 5

| | Value | Sequence (hexadecimal) |
|---|---|---|
| S1 | 000 | 124721741D482E7B |
| | 001 | 47127421481D7B2E |
| | 010 | 217412472E7B1D48 |
| | 011 | 742147127B2E481D |
| | 100 | 1D482E7B12472174 |
| | 101 | 481D7B2E47127421 |
| | 110 | 2E7B1D4821741247 |
| | 111 | 7B2E481D74214712 |
| S2 | 0000 | 121D4748212E747B1D1248472E217B7412E247B721D174841DED48B82EDE7B8B |
| | 0001 | 4748121D747B212E48471D127B742E2147B712E2748421D148B81DED7B8B2EDE |
| | 0010 | 212E747B121D47482E217B741D12484721D1748412E247B72EDE7B8B1DED48B8 |
| | 0011 | 747B212E4748121D7B742E2148471D12748421D147B712E27B8B2EDE48B81DED |
| | 0100 | 1D1248472E217B74121D4748212E747B1DED48B82EDE7B8B12E247B721D17484 |
| | 0101 | 48471D127B742E214748121D747B212E48B81DED7B8B2EDE47B712E2748421D1 |
| | 0110 | 2E217B741D124847212E747B121D47482EDE7B8B1DED48B821D1748412E247B7 |
| | 0111 | 7B742E2148471D12747B212E4748121D7B8B2EDE48B81DED748421D147B712E2 |
| | 1000 | 12E247B721D174841DED48B82EDE7B8B121D4748212E747B1D1248472E217B74 |
| | 1001 | 47B712E2748421D148B81DED7B8B2EDE4748121D747B212E48471D127B742E21 |
| | 1010 | 21D1748412E247B72EDE7B8B1DED48B8212E747B121D47482E217B741D124847 |
| | 1011 | 748421D147B712E27B8B2EDE48B81DED747B212E4748121D7B742E2148471D12 |
| | 1100 | 1DED48B82EDE7B8B12E247B721D174841D1248472E217B74121D4748212E747B |
| | 1101 | 48B81DED7B8B2EDE47B712E2748421D148471D127B742E214748121D747B212E |
| | 1110 | 2EDE7B8B1DED48B821D1748412E247B72E217B741D124847212E747B121D4748 |
| | 1111 | 7B8B2EDE48B81DED748421D147B712E27B742E2148471D12747B212E4748121D |

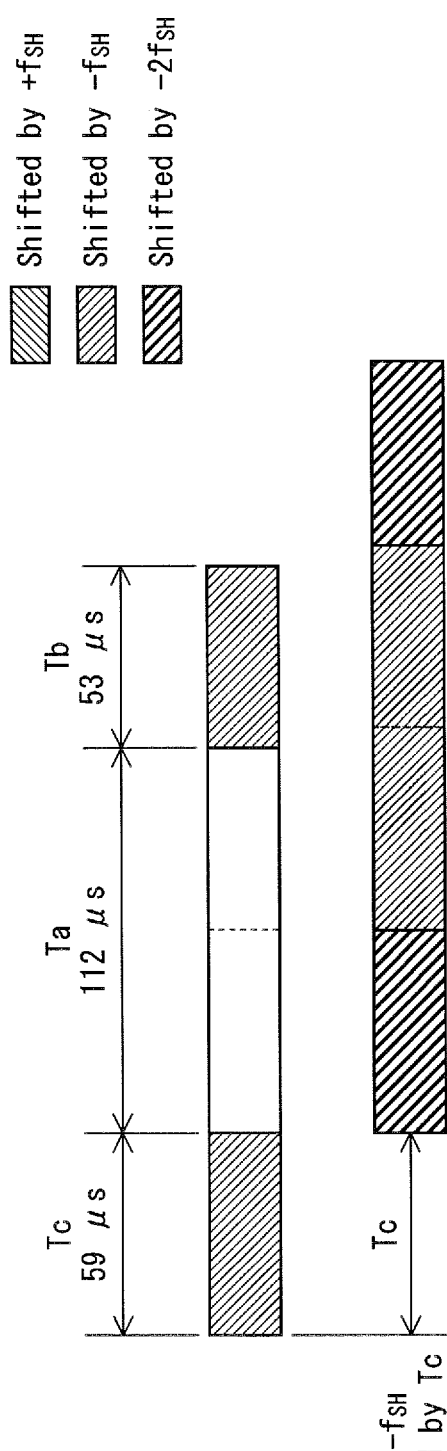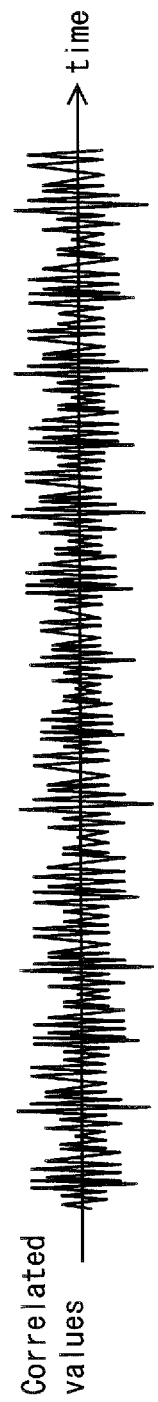
FIG. 18A
FIG. 18B
FIG. 18C

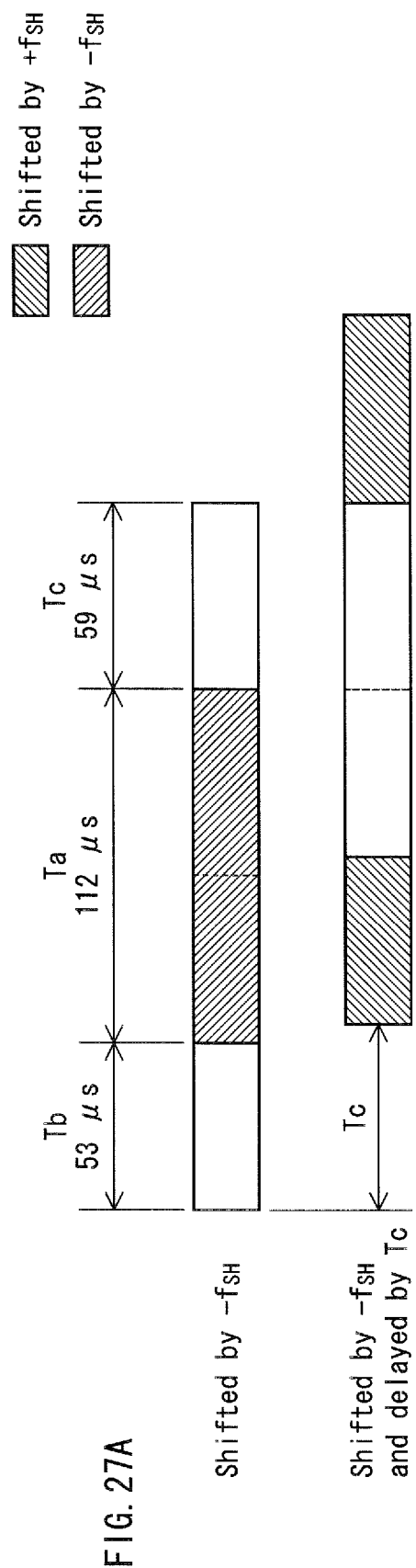
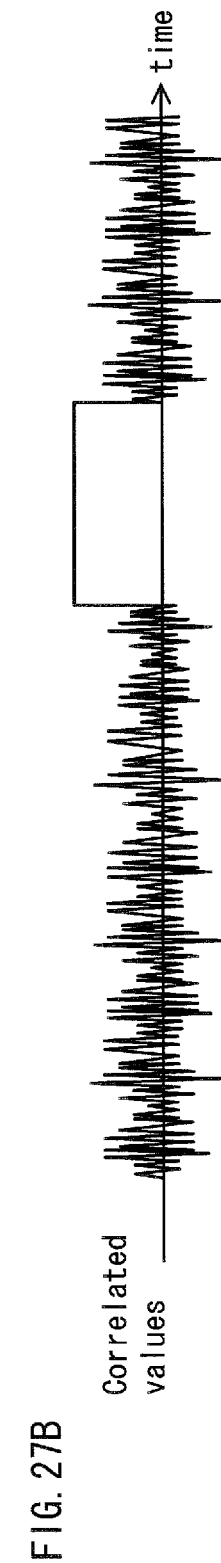
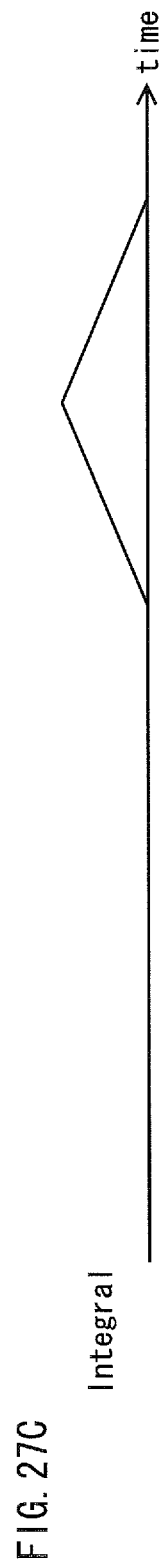
FIG. 27A
FIG. 27B
FIG. 27C

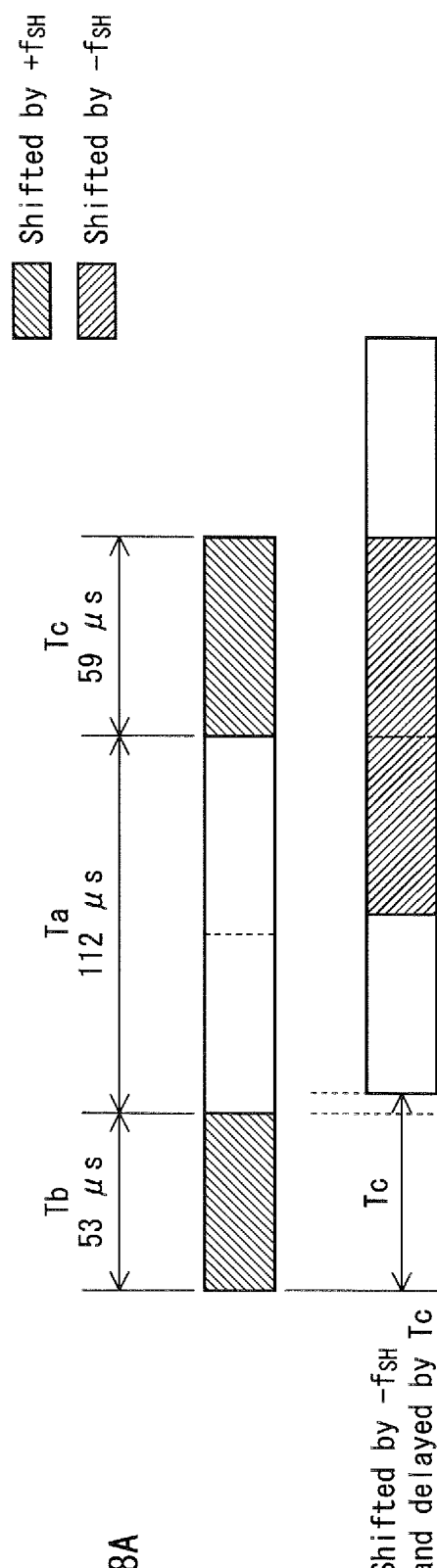
FIG. 28A
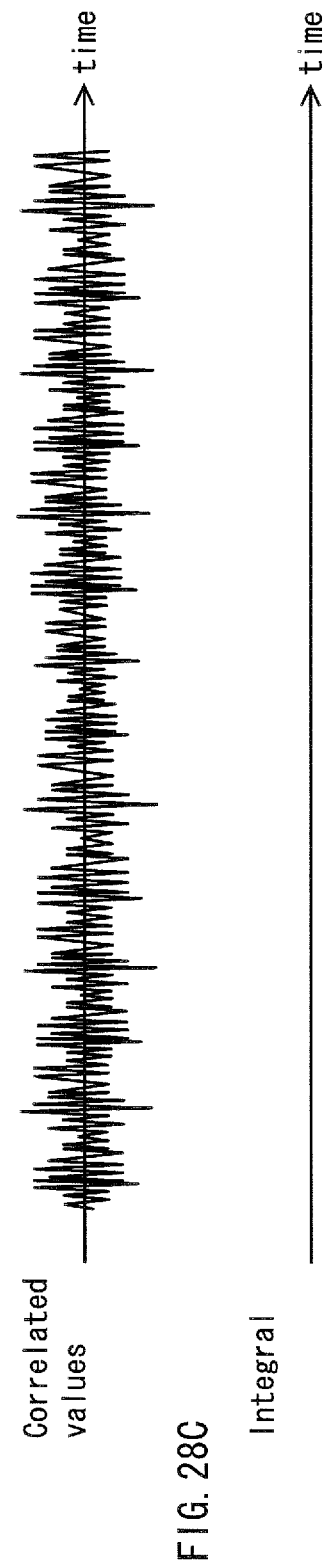
FIG. 28B
FIG. 28C

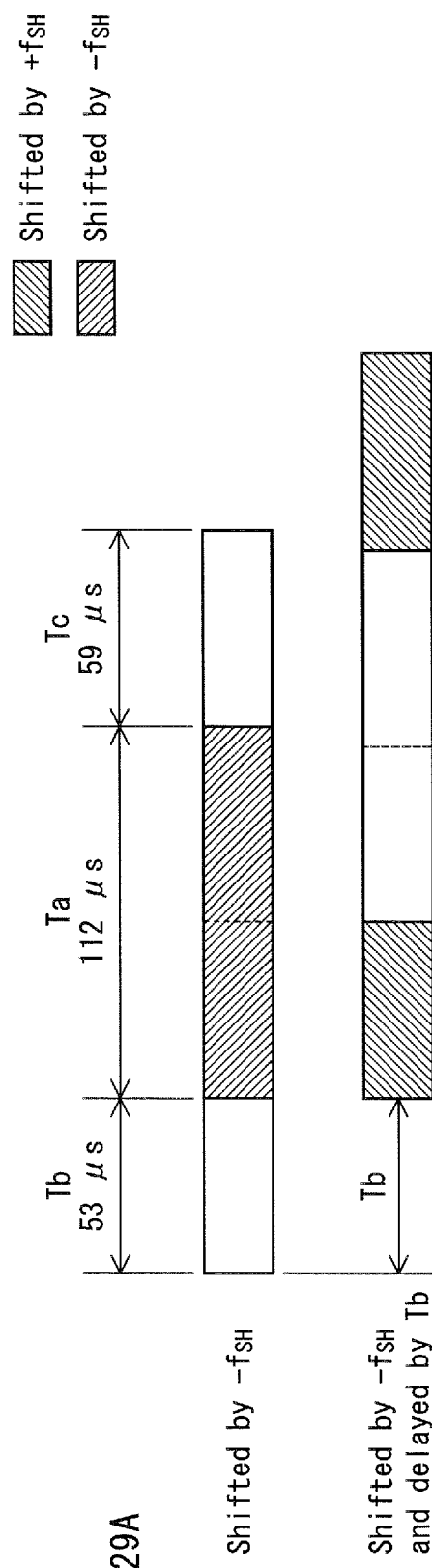
FIG. 29A
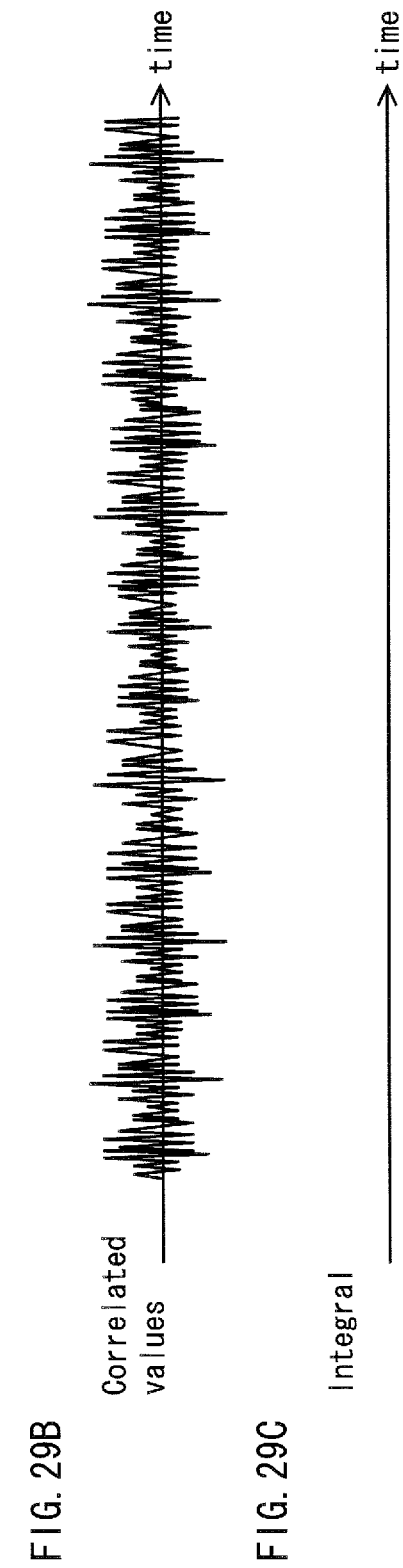
FIG. 29B
FIG. 29C

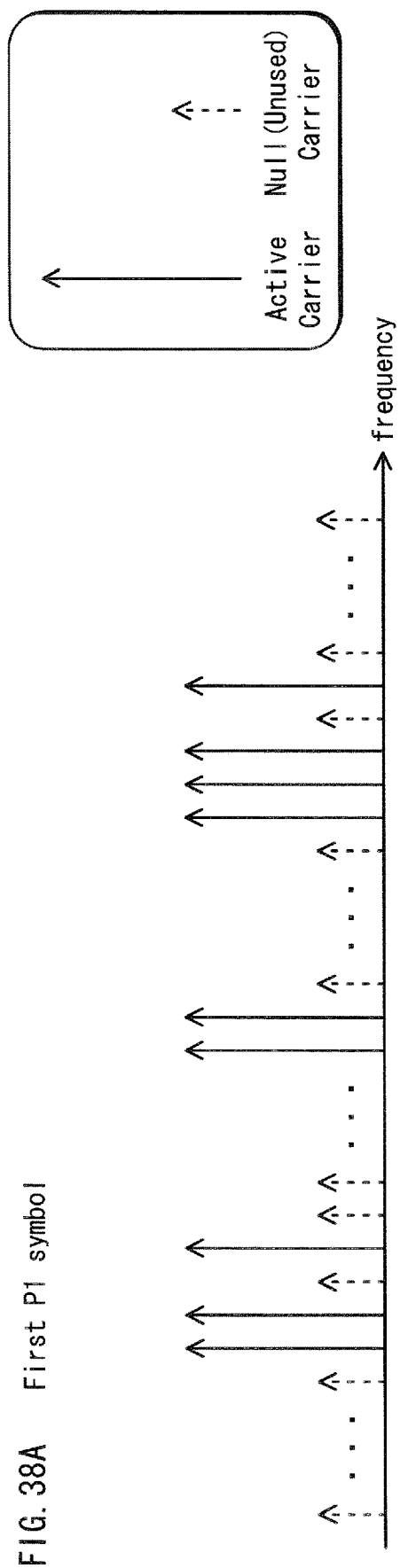
FIG. 38A  First P1 symbol
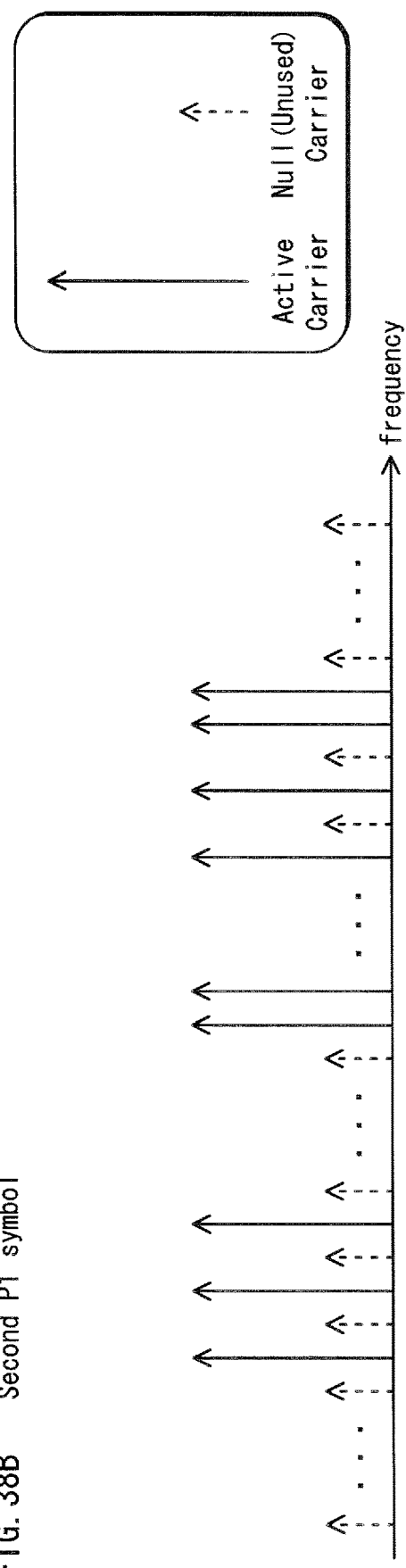
FIG. 38B  Second P1 symbol

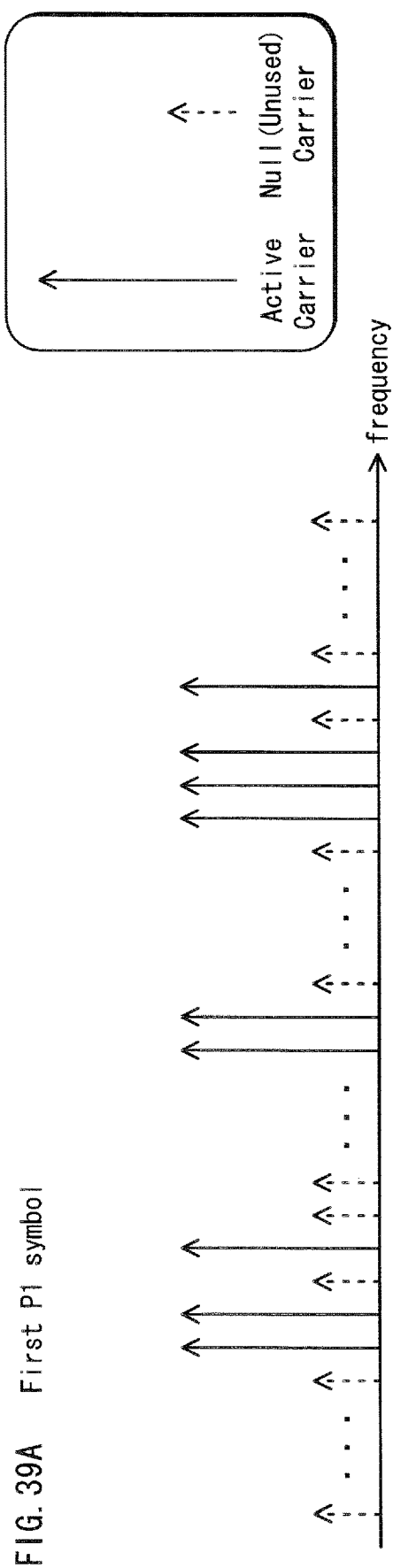
FIG. 39A  First P1 symbol
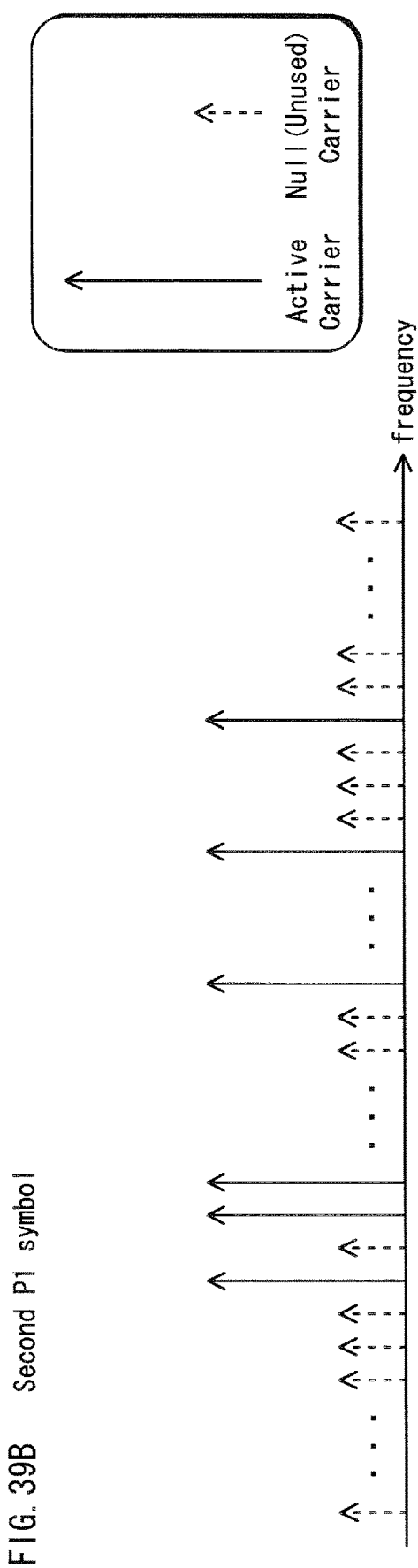
FIG. 39B  Second P1 symbol

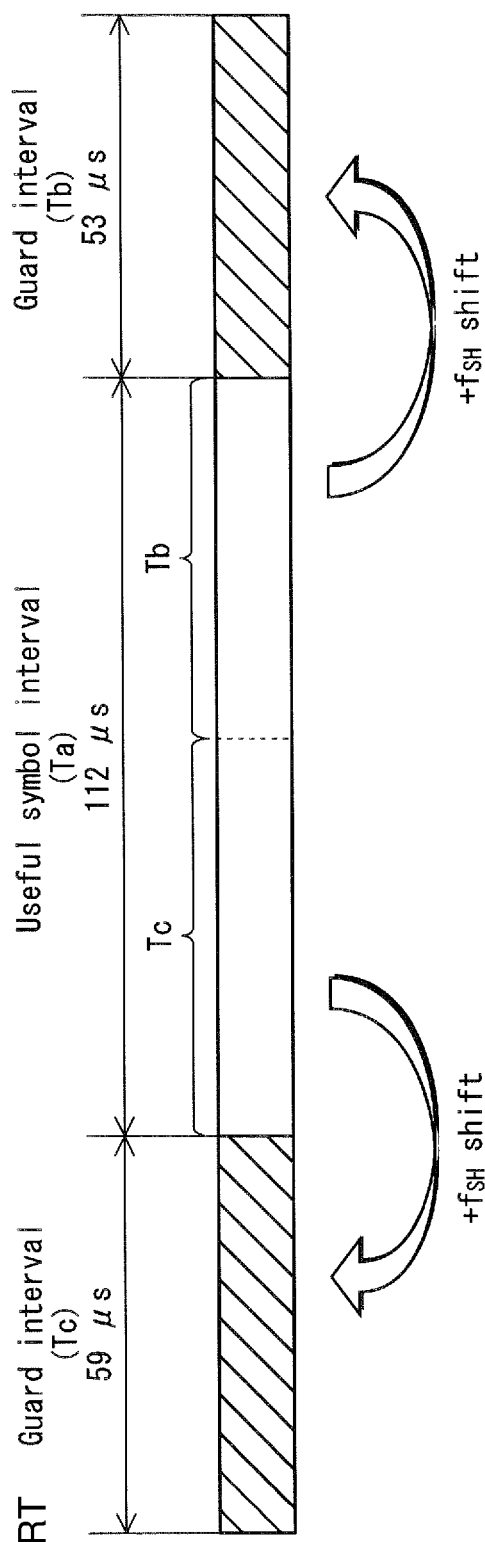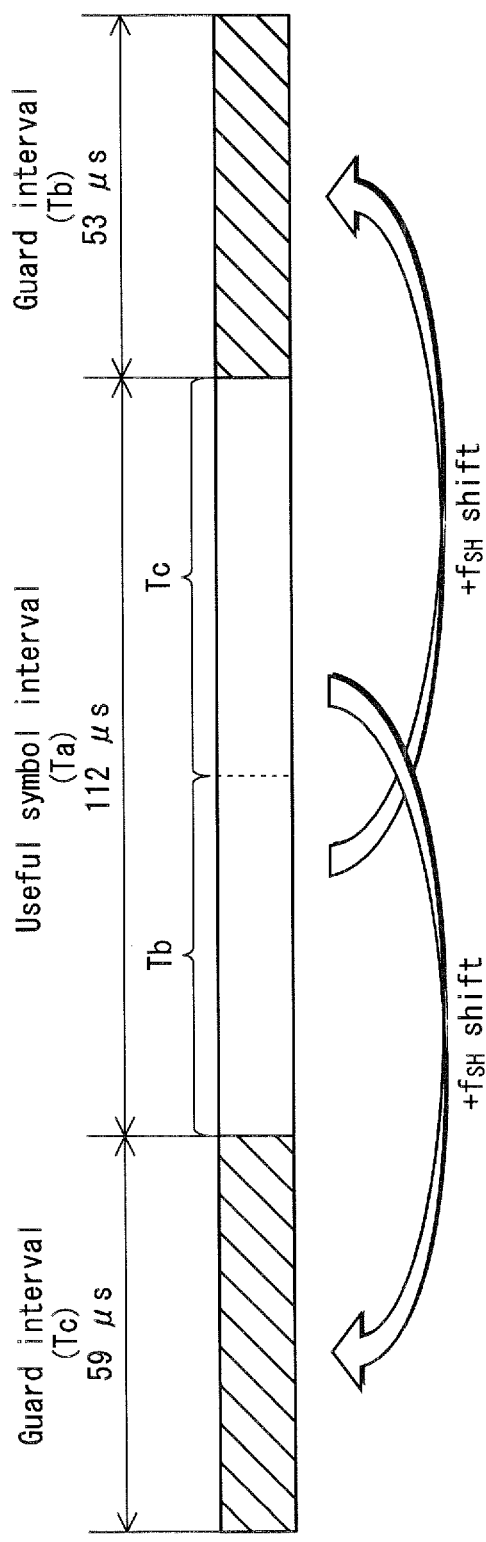

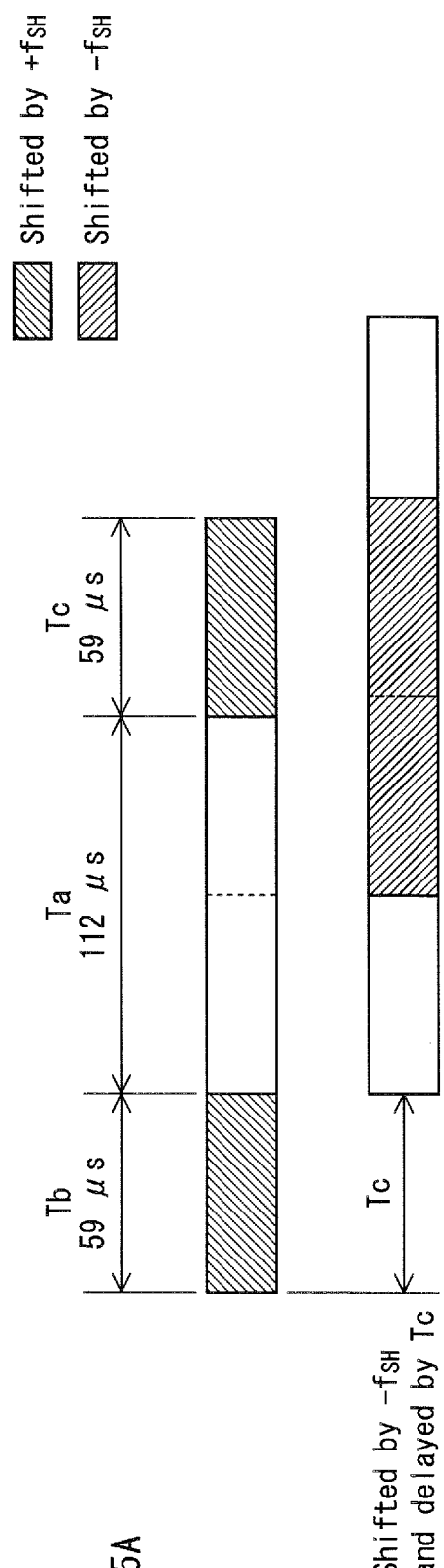
FIG. 55A
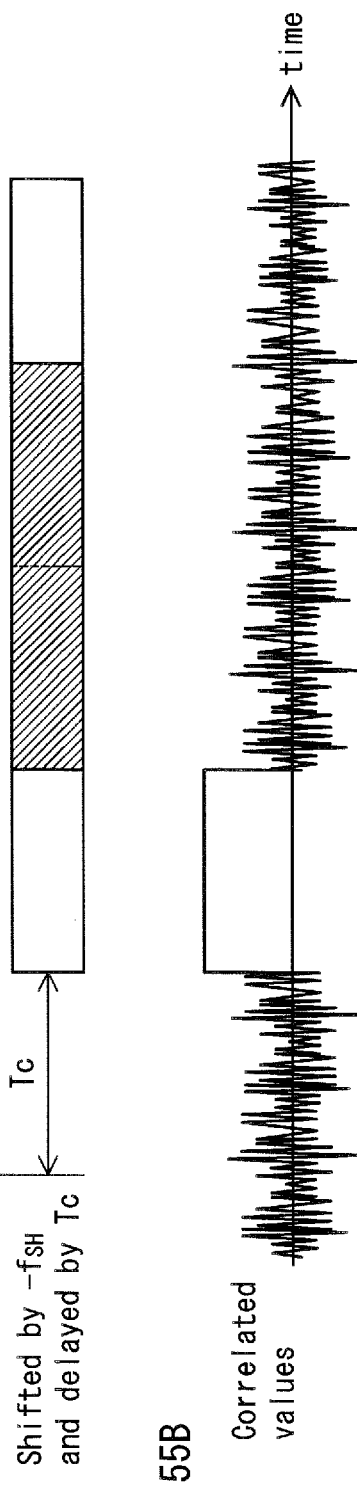
FIG. 55B Correlated values
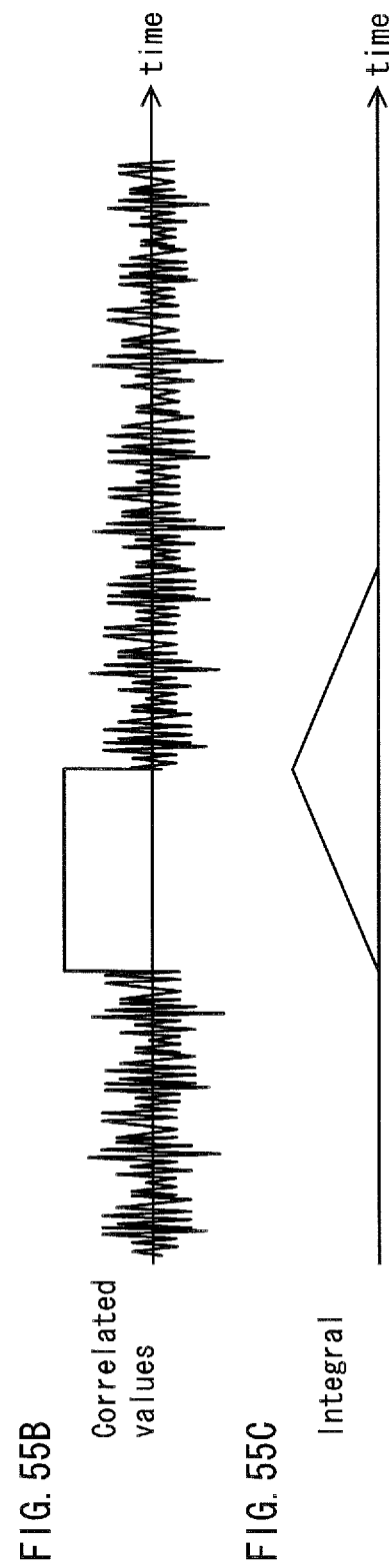
FIG. 55C Integral

OFDM TRANSMITTER DEVICE HAVING A SYMBOL GENERATOR FOR GENERATING NON-ZERO CONTROL SYMBOLS, AND OFDM TRANSMISSION METHOD INCLUDING GENERATING NON-ZERO CONTROL SYMBOLS

TECHNICAL FIELD

The present invention relates to technology for transmitting a signal multiplexed over a plurality of sub-carriers, and to technology for receiving a signal in which are multiplexed a plurality of sub-carriers.

BACKGROUND ART

Presently, Orthogonal Frequency Division Multiplexing (OFDM) is a transmission system widely used for various types of digital transmission, notably including terrestrial digital broadcasting and IEEE 802.11a. The OFDM method makes highly efficient use of frequencies by frequency-multiplexing a plurality of narrowband digitally-modulated signals using mutually-orthogonal sub-carriers.

Additionally, in the OFDM method, one symbol comprises a useful symbol as well as a guard interval, both of which are signals. As such, a portion of the useful symbol is replicated as the guard interval to produce intra-symbol periodicity. Thus, the influence of inter-symbol interference caused by multi-path interference is reduced, in that such a scheme offers superb resistance to such interference.

Analog television broadcasting is to cease around the world as worldwide frequency reconfiguration is being carried out. In Europe, demand is growing for HD (High Definition) broadcasting services in addition to the SD (Standard Definition) broadcasting services using DVB-T (Digital Video Broadcasting for Terrestrial) currently available. Thus the standardization of the second-generation European digital terrestrial television broadcasting system, DVB-T2, has advanced. The DVB-T2 broadcasting system is detailed in Non-Patent Literature 1.

As shown in FIG. 50, the DVB-T2 broadcasting system uses DVB-T2 frames, the structure of which includes a P1 symbol (P1 signal), one or more P2 symbols, and data symbols.

The P1 symbol is made to have an FFT (Fast Fourier Transform) size of 1 k. As shown in FIG. 51, guard intervals are arranged in front of and behind the useful symbol. In FIG. 51, the P1 symbol is shown in the time domain. Hereinafter, the guard interval arranged in front of the useful symbol interval is also termed the leading guard interval, while the guard interval arranged behind the useful symbol is also termed the trailing guard interval.

The guard interval of the P1 symbol differs from the guard interval used in the ISDB-T (Integrated Services Digital Broadcasting for Terrestrial) and DVB-T broadcasting systems thus far. In the P1 symbol, the guard interval arranged in front of the useful symbol (the leading guard interval) replicates the leading portion (Tc=59 μs) of the useful symbol (Ta=112 μs). Similarly, the guard interval arranged behind the useful symbol (the trailing guard interval) replicates the trailing portion (Tb=53 μs) of the useful symbol (Ta=112 μs). As shown in FIG. 51 and in Patent Literature 1, when these replicated portions are to be inserted, a predetermined frequency shift $f_{SH}$ (equivalent to the sub-carrier spacing of the P1 symbol) is first applied to the signal to be replicated before insertion. This process is expressed by the below-inscribed Math. 1.

$$p1(t) = \begin{cases} p1_A(t)e^{j2\pi f_{SH}t} & 0 \le t < 542T \\ p1_A(t - 542T) & 542T \le t < 1566T \\ p1_A(t - 1024T)e^{j2\pi f_{SH}t} & 1566T \le t < 2048T \\ 0 & \text{otherwise} \end{cases} \quad \text{(Math. 1)}$$

where p1(t) is the first P1 symbol, $p1_A(t)$ is the useful symbol, $+f_{SH}$ is the frequency shift, T is the time of one sample, post-IFFT, t is time, and the start time of the first P1 symbol is 0. In the DVB-T2 broadcasting system, for a bandwidth of 8 MHz, T=7/64 μs and the time span of the useful symbol (hereinafter, useful symbol length) is 1024T=112 μs.

Also, as shown in FIG. 52, the P1 symbol as expressed in the frequency domain is seen to be composed of a plurality of Active carriers and a plurality of Null carriers (Unused carriers). Information is affixed to the Active carriers. For convenience, FIG. 52 illustrates the Null carriers with dashed arrows. In reality, the Null carriers carry no information and have no amplitude. As described in Patent Literature 2, the Active carrier positions are given by a predetermined sequence. That is, the positions are designated according to CSS (Complementary Sets of Sequences).

FIG. 53 shows the configuration of a typical P1 symbol demodulator 10001 demodulating the P1 symbol, as described by Non-Patent Literature 1. The P1 symbol demodulator 10001 includes a P1 position detector 10101, an FFT unit 10102, and a P1 decoder 10103.

The P1 position detector 10101 detects the position of the P1 symbol in the input signal (i.e., the P1 symbol demodulator 10001 input signal) and accordingly outputs P1 symbol position information to the FFT unit 10102. FIG. 54 shows the configuration of the P1 position detector 10101.

The P1 position detector 10101 includes a multiplier 10201, a delayer 10202, a complex conjugate calculator 10203, a multiplier 10204, an integral calculator 10205, a delayer 10206, a complex conjugate calculator 10207, a multiplier 10208, an integral calculator 10209, a delayer 10210, a multiplier 10211, and a peak detector 10212.

The P1 position detector 10101 input signal is input to the multiplier 10201. The multiplier 10201 multiplies the P1 position detector 10101 input signal by $\exp(-j2\pi f_{SH}t)$ in order to apply a frequency shift that is the inverse of the $+f_{SH}$ frequency shift applied by the transmitter to the leading and trailing guard intervals of the first P1 symbol (applying a frequency shift of $-f_{SH}$). The multiplier 10201 then outputs the result to the delayer 10202 and to the multiplier 10208. The delayer 10202 delays the multiplier 10201 output signal by Tc (=59 μs), a span equivalent to the leading guard interval time span (hereinafter, the length of the leading guard interval), and then outputs the signal so delayed to the complex conjugate calculator 10203. The complex conjugate calculator 10203 calculates the complex conjugate of the signal output by the delayer 10202 and outputs the resulting complex conjugate signal to the multiplier 10204. The multiplier 10204 calculates a correlation by multiplying the P1 position detector 10101 input signal and the complex conjugate calculator 10203 output signal, then outputs the correlated value so calculated to the integral calculator 10205. The integral calculator 10205 integrates the output signal from the multiplier 10204 over the length Tc of the leading guard interval, and then outputs the result to the delayer 10210. FIGS. 55A through 55C are schematic diagrams illustrating this signal processing. As shown in FIG.

55A, the leading guard interval obtained by frequency shifting the P1 position detector 10101 input signal by $-f_{SH}$ and then delaying the result by the length Tc of the leading guard interval (shown in the lower portion of FIG. 55A) is identical to the leading part of the useful symbol within the P1 position detector 10101 (shown in the upper portion of FIG. 55A). A correlation appears in this portion, as shown in FIG. 55B. Given that other parts of the signals are not identical, no correlation appears therein. The peak shown in FIG. 55C is the effect of integrating the correlated value shown in FIG. 55B over the length Tc of the trailing guard interval.

Meanwhile, the P1 position detector 10101 input signal is input to the delayer 10206. The delayer 10206 delays the P1 position detector 10101 input signal by Tb (=53 μs), a span equivalent to the trailing guard interval time span (hereinafter, the length of the trailing guard interval), and then outputs the result to the complex conjugate calculator 10207. The complex conjugate calculator 10207 calculates the complex conjugate of the signal output by the delayer 10206 and outputs the resulting complex conjugate signal to the multiplier 10208. The signal input to the multiplier 10208 is the result of the multiplier 10201 multiplying the P1 position detector 10101 input signal by $\exp(-j2\pi f_{SH}t)$. The multiplier 10208 calculates a correlation by multiplying the multiplier 10201 output signal (the P1 position detector 10101 input signal with a frequency shift of $-f_{SH}$ applied thereto) and the complex conjugate calculator 10207 output signal, then outputs the correlated value so calculated to the integral calculator 10209. The integral calculator 10209 integrates the multiplier 10208 output signal over the length Tb of the trailing guard interval, and then outputs the result to the multiplier 10211. FIGS. 56A through 56C are schematic diagrams illustrating this signal processing. As shown in FIG. 56A, the trailing guard interval obtained by frequency shifting the P1 position detector 10101 input signal by $-f_{SH}$ (shown in the upper portion of FIG. 56A) is identical to the useful symbol within the P1 position detector 10101 with the trailing part delayed by the length Tb of the trailing guard interval (shown in the lower portion of FIG. 56A). The correlation appears in this part, as shown in FIG. 56B. Given that other parts of the signals are not identical, no correlation appears therein. The peak shown in FIG. 56C is the effect of integrating the correlated value shown in FIG. 56B over the length Tb of the trailing guard interval.

The signal output from the integral calculator 10205 is input to the delayer 10210. The delayer 10210 delays the signal output from the integral calculator 10205 to the match in the signal output from the integral calculator 10209 for output to the multiplier 10211. The multiplier 10211 multiplies the signal output from the integral calculator 10209 by the signal output from the delayer 10210, and then outputs the product to the peak detector 10212. Thus, the peaks are made more prominent by matching the peaks in the correlated value integral taken for the leading guard interval to the peaks in the correlated value integral taken for the trailing guard interval. The peak detector 10212 detects the position of the P1 symbol within the P1 position detector 10101 input signal (i.e., the signal input to the P1 symbol demodulator 10001) by detecting the peak position in the signal output from the multiplier 10211. The peak detector 10212 accordingly outputs position information for the P1 symbol to the FFT unit 10102 shown in FIG. 53. Given the presence of a delayed wave, a peak correlation appears in correspondence to the level and position of the delay.

The FFT unit 10102 shown in FIG. 53 performs a FFT (Fast Fourier Transform) on the signal input from the P1 symbol demodulator 10001 (a time-domain signal) in accordance with the P1 symbol position information, thus obtaining a converted frequency-domain signal for output to the P1 decoder 10103. The P1 decoder 10103 executes a decoding process on the P1 symbol using the Active carriers in the frequency-domain signal, calculates the values of the S1 and S2 signals added to the P1 symbol to discern information therefrom, such as the FFT size and MISO/SISO information.

Incidentally, the DVB-T2 broadcasting system includes FEF (Future Extension Frames) so that future broadcasting systems can broadcast using time multiplexing. Accordingly, broadcasting systems other than DVB-T2 are made possible. FIG. 57 shows the positional relationship between FEF and DVB-T2 frames. The head of an FEF part is a P1 symbol, much like that of a DVB-T2 frame. However, the information affixed to the P1 symbol is different from that used in the DVB-T2 broadcasting system. Therefore, a receiver implementing the DVB-T2 broadcasting system (hereinafter, a DVB-T2 receiver) demodulates the P1 symbol of the FEF part with the P1 symbol demodulator 10001, and can then acknowledge the presence of an FEF part by using the information affixed to the symbol.

CITATION LIST

Patent Literature

[Patent Literature 1]
International Application Publication No. WO2009/060183
[Patent Literature 2]
International Application Publication No. WO2009/074693

Non-Patent Literature

[Non-Patent Literature 1]
DVB Bluebook Document A133; Implementation guidelines for a second-generation digital terrestrial television broadcasting system (DVB-T2)

SUMMARY OF INVENTION

Technical Problem

Recently, worldwide debates on next-generation methods are taking place in consideration of DVB-S2 and the above-described DVB-T2. This concerns plausible services that make use of the FEF part. In such services, the information that can be transmitted by the P1 symbol at the head of the FEF part can only be 7 bits, and must further indicate the presence of the FEF part. This imposes considerable restrictions on the information. Transmitting an additional P1 symbol in the FEF part seems plausible for a new transmission system. However, the following problems arise in transmitting multiple P1 symbols in the FEF part as part of the same transmission format. For simplicity, the transmission of two P1 symbols considered, below.

In order to demodulate the P1 symbol, as described-above, a transmitter-imparted frequency shift is reversed, then a guard correlation is obtained, and peaks are detected therein. Here, the guard correlation appears for both P1 symbols. In the guard correlation, it is difficult to distinguish whether two detected peaks belong to separate P1 symbols, or whether one peak is a delayed wave of the other. This makes P1 symbol demodulation rather problematic. In the DVB-T2 broadcasting system, the maximum guard interval length for P2 symbols and data symbols, in some cases, 4864 samples (for an FFT size of 32 k and a guard interval ratio of 19/128). There thus appears to be an upper limit of 2098 samples for the P1 symbol, imposed by the delayed waves that can be tolerated by the guard intervals of the P2 symbols and the data symbols. For these reasons, there is a pressing need to distinguish a P1 symbol from a delayed wave of an already-detected peak from another P1 symbol. Also, in existing DVB-T2 receivers, demodulation is predicated on the expectation that only one P1 symbol per frame will be received. A problem thus arises in that demodulation operations are adversely affected when such DVB-T2 receivers receive the second P1 symbol, which renders reception of the DVB-T2 broadcasting system itself impossible.

In addition, both P1 symbols are transmitted using the same sub-carrier locations (with the same sub-carriers arranged as Active carriers). Thus, in the presence of a delayed wave, interference arises between the two P1 symbols because of the electric power concentration in the P1 symbol Active carriers. This interference is greater than that arising between the P1 symbols and typical data symbols. For example, as shown in FIG. 58, when interference arises between the P1 symbol and a delayed wave of a typical data symbol, the P1 symbol is affected in the Null carriers as well as the Active carriers because the data symbol has nearly no Null carriers. In contrast, as shown in FIG. 59, when interference arises between two P1 symbols, Active carriers are intensely affected. Given that the P1 symbol has many Null carriers, the electric power of the Active carriers is greater than that of a single sub-carrier for a typical data symbol. The same electric power in a delayed wave causes greater interference at the Active carrier level than the data symbol. As such, transmitting two P1 symbols using the same sub-carrier locations leads to a problem in that, in a delayed environment, P1 symbol demodulation can be erroneous, making correct reception impossible.

Therefore, an aim of the present invention is to provide an OFDM transmitter, an OFDM transmission method, an integrated circuit, and an OFDM transmission program that generate multiple control symbols that, without affecting existing DVB-T2 receivers, allow multiple control symbols (such as P1 symbols) to be reliably distinguished, or such that demodulation thereof is reliably possible in a delayed environment. Another aim of the present invention is to provide an OFDM receiver, an OFDM reception method, an integrated circuit, and an OFDM reception program that accurately receive the control symbols so transmitted.

Solution to Problem

In order to achieve the above-stated goal, the present invention provides an OFDM transmitter, comprising: a first symbol generator generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generator generating a plurality of symbols different from the control symbols; and a symbol inserter inserting the N control symbols into the plurality of symbols generated by the second symbol generator, wherein in each of the control symbols, the guard interval time-domain signal is identical to a signal in which at least a portion of the useful symbol time-domain signal has been frequency-shifted by an amount different from any other control symbols.

The present invention also seeks to provide an OFDM receiver, comprising: a first symbol demodulator demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulator demodulating symbols other than the control symbols according to results from the first symbol demodulator, wherein in each of the control symbols, the guard interval time-domain signal is identical to a signal in which at least a portion of the useful symbol time-domain signal has been frequency-shifted by an amount different from any other control symbols.

Advantageous Effects of Invention

Accordingly, when transmitting N control symbols, the receiver can easily and reliably distinguish whether two control symbols are distinct, or whether one symbol is a delayed wave of the other. In addition, reliable reception is assured when N control symbols are transmitted in the FEF part for reception by existing DVB-T2 receivers.

BRIEF DESCRIPTION OF DRAWINGS

FIG. 4 shows sub-carrier numbers for Active carriers.

FIG. 5 shows an MSS conversion sequence for the values of S1 and S2 signals.

FIGS. 18A, 18B, and 18C are schematic diagrams illustrating correlations taken in the leading portion of the second P1 symbol by the P1 position detector 301 of the first P1 symbol demodulator 300.

FIGS. 27A, 27B, and 27C are schematic diagrams illustrating correlations taken in the trailing portion of the second P1 symbol by the P1 position detector 401A from FIG. 25.

FIGS. 28A, 28B, and 28C are schematic diagrams illustrating correlations taken in the leading portion of the second P1 symbol by the P1 position detector 301 of the first P1 symbol demodulator 300 (from FIG. 13).

FIGS. 29A, 29B, and 29C are schematic diagrams illustrating correlations taken in the trailing portion of the second P1 symbol by the P1 position detector 301 of the first P1 symbol demodulator 300 (from FIG. 13).

FIGS. 38A and 38B are schematic diagrams illustrating sample sub-carrier locations for the first and second P1 symbols when a carrier location sequence a[j] and another carrier location sequence b[j] are orthogonal (uncorrelated) (frequency domain shown).

FIGS. 39A and 39B are schematic diagrams illustrating sample sub-carrier locations for the first and second P1 symbols when a subset of the Null carriers of the first P1 symbol are made the Active carriers of the second P1 symbol (frequency domain shown).

FIG. 49A is a schematic diagram illustrating the transmission format of the first P1 symbol in the time dimension, while FIG. 49B is a schematic diagram illustrating the transmission format of the second P1 symbol in the time dimension.

FIGS. 55A, 55B, and 55C are schematic diagrams illustrating correlations taken in the leading portion of the P1 symbol by the P1 position detector 10101 from FIG. 54.

DESCRIPTION OF EMBODIMENTS

Figure 1:
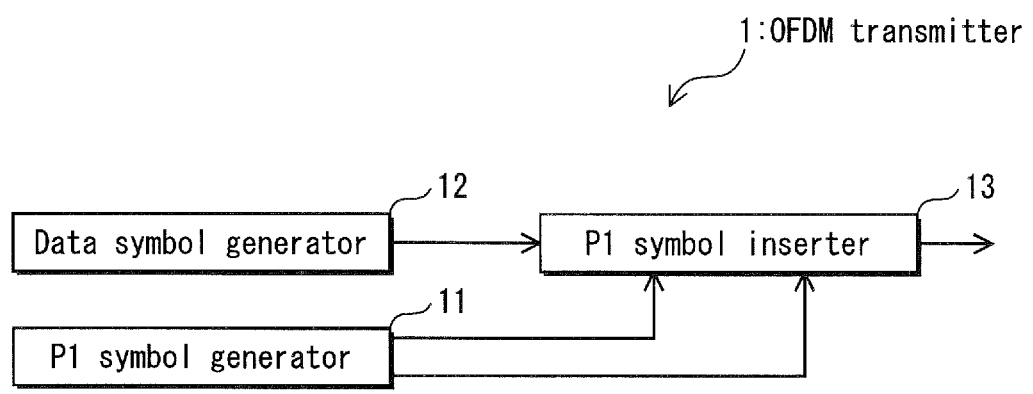
FIG. 1 is a block diagram showing the configuration of an OFDM transmitter 1 pertaining to Embodiment 1 of the present invention.

According to one aspect of the present invention, a first OFDM transmitter comprises: a first symbol generator generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generator generating a plurality of symbols different from the control symbols; and a symbol inserter inserting the N control symbols into the plurality of symbols generated by the second symbol generator, wherein in each of the control symbols, the guard interval time-domain signal is identical to a signal in which at least a portion of the useful symbol time-domain signal has been frequency-shifted by an amount different from any other control symbols.

According to another aspect of the present invention, an OFDM transmission method comprises a first symbol generation step of generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generation step of generating a plurality of symbols different from the control symbols; and a symbol insertion step of inserting the N control symbols into the plurality of symbols generated by the second symbol generator, wherein in each of the control symbols, the guard interval time-domain signal is identical to a signal in which at least a portion of the useful symbol time-domain signal has been frequency-shifted by an amount different from any other control symbols.

According a further aspect of the present invention, an integrated circuit comprises a first symbol generation circuit generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generation circuit generating a plurality of symbols different from the control symbols; and a symbol insertion circuit inserting the N control symbols into the plurality of symbols generated by the second symbol generator, wherein in each of the control symbols, the guard interval time-domain signal is identical to a signal in which at least a portion of the useful symbol time-domain signal has been frequency-shifted by an amount different from any other control symbols.

According to an alternative aspect of the present invention, an OFDM transmission program executed by an OFDM transmitter comprises: a first symbol generation step of generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generation step of generating a plurality of symbols different from the control symbols; and a symbol insertion step of inserting the N control symbols into the plurality of symbols generated by the second symbol generator, wherein in each of the control symbols, the guard interval time-domain signal is identical to a signal in which at least a portion of the useful symbol time-domain signal has been frequency-shifted by an amount different from any other control symbols.

Accordingly, when transmitting N control symbols, the receiver can easily and reliably distinguish whether two control symbols are distinct, or whether one symbol is a delayed wave of the other. In addition, reliable reception is assured when N control symbols are transmitted in the FEF part without interfering with reception by existing DVB-T2 receivers.

In a further aspect of the present invention, a second OFDM transmitter based on the first OFDM transmitter has the first symbol generator include: an inverse orthogonal transformer generating the useful symbol time-domain signal through an inverse orthogonal transformation from the frequency domain to the time domain, performed for each of the N control symbols; and a guard interval inserter (i) generating the guard interval time-domain signal by frequency-shifting at least a portion of the useful symbol time-domain signal by a given amount different from any other control symbols, and (ii) inserting the guard interval time-domain signal so generated to the useful symbol time-domain signal, for each of the N control symbols.

Accordingly, N control symbols can easily be generated.

According to an alternative aspect of the present invention, a third OFDM transmitter based on the second OFDM transmitter has the guard interval inserter generate the guard interval time-domain signal by frequency shifting one or both of a portion and a span of the useful symbol time-domain signal different from any other control symbols by the given amount.

Accordingly, when transmitting N control symbols, the receiver can easily and reliably distinguish whether two control symbols are distinct, or whether one symbol is a delayed wave of the other. In addition, reliable reception is assured when N control symbols are transmitted in the FEF part without interfering with reception by existing DVB-T2 receivers.

According to a further aspect of the present invention, a fourth OFDM transmitter based on the second OFDM transmitter has the plurality of sub-carriers include a plurality of Active carriers and a plurality of Null carriers, for each of the N control symbols, a carrier location sequence used to distinguish between the Active carriers and the Null carriers among the plurality of sub-carriers differs from another carrier location sequence for other control symbols, and the first symbol generator further includes a carrier locator generating the frequency-domain signal by mapping control information data to each of the Active carriers in accordance with the carrier location sequence, for each of the N control symbols.

Accordingly, when N control symbols are transmitted, reliable reception is made possible even when the receiver is in a delayed environment, with minimal interference occurring between control symbols due to delayed waves.

According to another alternative aspect of the present invention, a fifth OFDM transmitter based on the first OFDM transmitter has N be equal to 2.

According to an alternative aspect of the present invention, a sixth OFDM transmitter based on the fifth OFDM transmitter has a frequency shift applied to a first one of the control symbols and a frequency shift applied to a second one of the control symbols are equal in absolute value while being opposite in sign.

In this example, N equals two, and a sample frequency shift is provided for each of the two control symbols.

According to another aspect of the present invention, a seventh OFDM transmitter comprises: a first symbol generator generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generator generating a plurality of symbols different from the control symbols; and a symbol inserter inserting the N control symbols into the plurality of symbols generated by the second symbol generator, wherein for each of the control symbols, the guard interval time-domain signal is identical to one or both of a portion and a span of the useful symbol time-domain signal different from any other control symbols frequency-shifted by a predetermined amount.

Also, a second OFDM transmission method comprises: a first symbol generation step of generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generation step of generating a plurality of symbols different from the control symbols; and a symbol insertion step of inserting the N control symbols into the plurality of symbols generated by the second symbol generator, wherein in each of the control symbols, the guard interval time-domain signal is identical to a signal in which at least a portion of the useful symbol time-domain signal has been frequency-shifted by an amount different from any other control symbols.

Furthermore, a second integrated circuit comprises: a first symbol generation circuit generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generation circuit generating a plurality of symbols different from the control symbols; and a symbol insertion circuit inserting the N control symbols into the plurality of symbols generated by the second symbol generator, wherein in each of the control symbols, the guard interval time-domain signal is identical to a signal in which at least a portion of the useful symbol time-domain signal has been frequency-shifted by an amount different from any other control symbols.

In addition, a second OFDM transmission program executed by an OFDM transmitter comprises: a first symbol generation step of generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generation step of generating a plurality of symbols different from the control symbols; and a symbol insertion step of inserting the N control symbols into the plurality of symbols generated by the second symbol generator, wherein in each of the control symbols, the guard interval time-domain signal is identical to a signal in which at least a portion of the useful symbol time-domain signal has been frequency-shifted by an amount different from any other control symbols.

Accordingly, when transmitting N control symbols, the receiver can easily and reliably distinguish whether two control symbols are distinct, or whether one symbol is a delayed wave of the other. In addition, reliable reception is assured when N control symbols are transmitted in the FEF part without interfering with reception by existing DVB-T2 receivers.

According to an alternative aspect of the present invention, an eighth OFDM transmitter based on the seventh OFDM transmitter has the first symbol generator include: an inverse orthogonal transformer generating the useful symbol time-domain signal through an inverse orthogonal transformation from the frequency domain to the time domain, performed for each of the N control symbols; and a guard interval inserter (i) generating the guard interval time-domain signal by frequency-shifting one or both of a portion and a span different from any other control symbols of the useful symbol time-domain signal by the predetermined amount and (ii) inserting the guard interval time-domain signal so generated to the useful symbol time-domain signal, for each of the N control symbols.

Accordingly, N control symbols can easily be generated.

In yet a further aspect of the present invention, a ninth OFDM transmitter comprises: a first symbol generator generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generator generating a plurality of symbols different from the control symbols; and a symbol inserter inserting the N control symbols into the plurality of symbols generated by the second symbol generator, wherein the plurality of sub-carriers include a plurality of Active carriers and a plurality of Null carriers, for each of the N control symbols, a carrier location sequence used to distinguish between the Active carriers and the Null carriers among the plurality of sub-carriers differs from another carrier location sequence for other control symbols, and control information data is mapped to each of the Active carriers in accordance with the carrier location sequence for each of the N control symbols.

According to an alternative aspect of the present invention, a third OFDM transmission method has comprises: a first symbol generation step of generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generation step of generating a plurality of symbols different from the control symbols; and a symbol insertion step of inserting the N control symbols into the plurality of symbols generated by the second symbol generator, wherein the plurality of sub-carriers include a plurality of Active carriers and a plurality of Null carriers, for each of the N control symbols, a carrier location sequence used to distinguish between the Active carriers and the Null carriers among the plurality of sub-carriers differs from another carrier location sequence for other control symbols, and control information data is mapped to each of the Active carriers in accordance with the carrier location sequence for each of the N control symbols.

According to an alternative aspect of the present invention, a third integrated circuit comprises: a first symbol generation circuit generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generation circuit generating a plurality of symbols different from the control symbols; and a symbol insertion circuit inserting the N control symbols into the plurality of symbols generated by the second symbol generator, wherein the plurality of sub-carriers include a plurality of Active carriers and a plurality of Null carriers, for each of the N control symbols, a carrier location sequence used to distinguish between the Active carriers and the Null carriers among the plurality of sub-carriers differs from another carrier location sequence for other control symbols, and control information data is mapped to each of the Active carriers in accordance with the carrier location sequence for each of the N control symbols.

According to an alternative aspect of the present invention, a third program OFDM transmission program executed by an OFDM transmitter, comprises: a first symbol generation step of generating N (N being an integer satisfying N≥2) control symbols in which a plurality of mutually-orthogonal sub-carriers are multiplexed, the control symbols being made up of a useful symbol time-domain signal and a guard interval time-domain signal; a second symbol generation step of generating a plurality of symbols different from the control symbols; and a symbol insertion step of inserting the N control symbols into the plurality of symbols generated by the second symbol generator, wherein the plurality of sub-carriers include a plurality of Active carriers and a plurality of Null carriers, for each of the N control symbols, a carrier location sequence used to distinguish between the Active carriers and the Null carriers among the plurality of sub-carriers differs from another carrier location sequence for other control symbols, and control information data is mapped to each of the Active carriers in accordance with the carrier location sequence for each of the N control symbols.

Accordingly, when N control symbols are transmitted, reliable reception is made possible even when the receiver is in a delayed environment, with minimal interference occurring between control symbols due to delayed waves. In addition, reliable reception is assured when N control symbols are transmitted in the FEF part without interfering with reception by existing DVB-T2 receivers.

According to a further aspect of the present invention, a tenth OFDM transmitter based on the ninth OFDM transmitter has the first symbol generator include: a carrier locator generating the frequency-domain signal by mapping the control information data to each of the Active carriers in accordance with the carrier location sequence, for each of the N control symbols; an inverse orthogonal transformer generating the useful symbol time-domain signal through an inverse orthogonal transformation from the frequency domain to the time domain, performed for each of the N control symbols; and a guard interval inserter (i) generating the guard interval time-domain signal by frequency-shifting at least a portion of the useful symbol time-domain signal by a predetermined amount and (ii) inserting the guard interval time-domain signal so generated to the useful symbol time-domain signal, for each of the N control symbols.

Accordingly, N control symbols can easily be generated.

According to a further aspect of the present invention, an eleventh OFDM transmitter based on the ninth OFDM transmitter has the carrier location sequence used for each of the N control symbols be orthogonal to the other carrier location sequence used for any other control symbols.

According to yet a further aspect of the present invention, a twelfth OFDM transmitter based on the ninth OFDM transmitter has the Active carriers in the carrier location sequence used for each of the N control symbols be the Null carriers in the other carrier location sequence used for any other control symbols.

This provides a sample carrier location sequence for each of the N control symbols.

According to an aspect of the present invention, a first OFDM receiver comprises: a first symbol demodulator demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulator demodulating symbols other than the control symbols according to results from the first symbol demodulator, wherein in each of the control symbols, the guard interval time-domain signal is identical to a signal in which at least a portion of the useful symbol time-domain signal has been frequency-shifted by an amount different from any other control symbols.

According to another aspect of the present invention, a first OFDM reception method comprises: a first symbol demodulation step of demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulation step of demodulating symbols other than the control symbols according to results of the first symbol demodulation step, wherein in each of the control symbols, the guard interval time-domain signal is identical to a signal in which at least a portion of the useful symbol time-domain signal has been frequency-shifted by an amount different from any other control symbols.

According to a further aspect of the present invention, a fourth integrated circuit, comprises: a first symbol demodulation circuit demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulation circuit demodulating symbols other than the control symbols according to results from the first symbol demodulation circuit, wherein in each of the control symbols, the guard interval time-domain signal is identical to a signal in which at least a portion of the useful symbol time-domain signal has been frequency-shifted by an amount different from any other control symbols.

According to yet another aspect of the present invention, a first OFDM reception program comprises a first symbol demodulation step of demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulation step of demodulating symbols other than the control symbols according to results of the first symbol demodulation step, wherein in each of the control symbols, the guard interval time-domain signal is identical to a signal in which at least a portion of the useful symbol time-domain signal has been frequency-shifted by an amount different from any other control symbols.

Accordingly, the receiver can easily and reliably distinguish whether two control symbols are distinct, or whether one symbol is a delayed wave of the other.

According to yet a further aspect of the present invention, a second OFDM receiver based on the first OFDM receiver has the first symbol demodulator demodulate the N control symbols by detecting a position of at least one predetermined control symbol among the N control symbols in a received signal.

Accordingly, control symbol positions are detected for demodulation.

According to another further aspect of the present invention, a third OFDM receiver based on the second OFDM receiver has the first symbol demodulator detect the control symbol position by calculating a correlation between (i) the received signal, and (ii) a signal obtained by frequency-shifting the received signal by the inverse of the frequency shift applied by a transmitter to the control symbol undergoing position detection.

Accordingly, the frequency shift applied by the transmitter is taken into consideration for control symbol position detection.

According to another aspect of the present invention, a fourth OFDM receiver comprises: a first symbol demodulator demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulator demodulating symbols other than the control symbols according to results from the first symbol demodulator, wherein for each of the control symbols, the guard interval time-domain signal is identical to one or both of a portion and a span of the useful symbol time-domain signal different from any other control symbols frequency-shifted by a predetermined amount.

According to still another aspect of the present invention, a second OFDM reception method comprises: a first symbol demodulation step of demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulation step of demodulating symbols other than the control symbols according to results of the first symbol demodulation step, wherein for each of the control symbols, the guard interval time-domain signal is identical to one or both of a portion and a span of the useful symbol time-domain signal different from any other control symbols frequency-shifted by a predetermined amount.

According to a further aspect of the present invention, a fifth integrated circuit comprises: a first symbol demodulation circuit demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulation circuit demodulating symbols other than the control symbols according to results from the first symbol demodulation circuit wherein for each of the control symbols, the guard interval time-domain signal is identical to one or both of a portion and a span of the useful symbol time-domain signal different from any other control symbols frequency-shifted by a predetermined amount.

According to still another further aspect of the present invention, a second OFDM reception program executed by an OFDM receiver comprises: a first symbol demodulation step of demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulation step of demodulating symbols other than the control symbols according to results of the first symbol demodulation step, wherein for each of the control symbols, the guard interval time-domain signal is identical to one or both of a portion and a span of the useful symbol time-domain signal different from any other control symbols frequency-shifted by a predetermined amount.

Accordingly, the receiver can easily and reliably distinguish whether two control symbols are distinct, or whether one symbol is a delayed wave of the other, thus enabling stable reception.

According to still another aspect of the present invention, a fifth OFDM receiver based on the fourth OFDM receiver has the first symbol demodulator demodulate the N control symbols by detecting the position of at least one predetermined control symbol among the N control symbols in a received signal.

Accordingly, control symbol positions are detected for demodulation.

According to another aspect of the present invention, a sixth OFDM receiver based on the fifth OFDM receiver has the first symbol demodulator detects the control symbol position by calculating a correlation between (i) the received signal and (ii) a signal obtained by frequency-shifting the received signal by the inverse of the frequency shift applied by a transmitter to the control symbol undergoing position detection according to one or both of a portion and a span of the control symbol.

Accordingly, the frequency shift applied by the transmitter during generation and the original signal are taken into consideration for control symbol position detection.

According an aspect of the present invention, a seventh OFDM receiver comprises a first symbol demodulator demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulator demodulating symbols other than the control symbols according to results from the first symbol demodulator, wherein the plurality of sub-carriers includes a plurality of Active carriers and a plurality of Null carriers, for each of the N control symbols, a carrier location sequence used to distinguish between the Active carriers and the Null carriers among the plurality of sub-carriers differs from another carrier location sequence for other control symbols, and control information data is mapped to each of the Active carriers in accordance with the carrier location sequence for each of the N control symbols.

According to an alternate aspect of the present invention, a third OFDM reception method comprises: a first symbol demodulation step of demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulation step of demodulating symbols other than the control symbols according to results of the first symbol demodulation step, wherein the plurality of sub-carriers includes a plurality of Active carriers and a plurality of Null carriers, for each of the N control symbols, a carrier location sequence used to distinguish between the Active carriers and the Null carriers among the plurality of sub-carriers differs from another carrier location sequence for other control symbols, and control information data is mapped to each of the Active carriers in accordance with the carrier location sequence for each of the N control symbols.

According to another alternate aspect of the present invention, a sixth integrated circuit comprises a first symbol demodulation circuit demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulation circuit demodulating symbols other than the control symbols according to results from the first symbol demodulation circuit, wherein the plurality of sub-carriers includes a plurality of Active carriers and a plurality of Null carriers, for each of the N control symbols, a carrier location sequence used to distinguish between the Active carriers and the Null carriers among the plurality of sub-carriers differs from another carrier location sequence for other control symbols, and control information data is mapped to each of the Active carriers in accordance with the carrier location sequence for each of the N control symbols.

According to a further alternate aspect of the present invention, a third OFDM reception program executed by an OFDM receiver, comprising: a first symbol demodulation step of demodulating N (N being an integer satisfying N≥2) control symbols in which a plurality of mutually-orthogonal sub-carriers are multiplexed, the control symbols being made up of a useful symbol time-domain signal and a guard interval time-domain signal; and a second symbol demodulation step of demodulating symbols other than the control symbols according to results of the first symbol demodulation step, wherein the plurality of sub-carriers includes a plurality of Active carriers and a plurality of Null carriers, for each of the N control symbols, a carrier location sequence used to distinguish between the Active carriers and the Null carriers among the plurality of sub-carriers differs from another carrier location sequence for other control symbols, and control information data is mapped to each of the Active carriers in accordance with the carrier location sequence for each of the N control symbols.

Accordingly, the receiver can easily and reliably distinguish whether two control symbols are distinct, or whether one symbol is a delayed wave of the other, thus enabling stable reception.

Embodiments of the present invention are described below with reference to the drawings.

Embodiment 1

An OFDM transmitter 1 and an OFDM receiver 2 pertaining to Embodiment 1 of the present invention are described below with reference to the drawings. In Embodiment 1, as well as in the later-described Embodiments 2 though 4, examples are given using DVB-T2, which is the second-generation digital terrestrial television broadcasting system used in Europe, and further describe the use of a P1 symbol in the FEF part.

(OFDM Transmitter)

FIG. 1 is a block diagram showing the configuration of the OFDM transmitter 1 pertaining to Embodiment 1. The OFDM transmitter 1 includes a P1 symbol generator 11, a data symbol generator 12, and a P1 symbol inserter 13. The P1 symbol generator 11 generates two P1 symbols, as will be described later with reference to the drawings, then outputs the generated P1 symbols to the P1 symbol inserter 13. The data symbol generator 12 generates a plurality of data symbols, which are distinct from the P1 symbols, by performing encoding, modulation, pilot insertion, guard interval insertion, and other processes on input data (e.g., data other than the data to be transmitted in the P1 symbols). The generated data symbols are then output to the P1 symbol inserter 13. The P1 symbol inserter 13 inserts each of the P1 symbols generated by the P1 symbol generator 11 between the data symbols generated by the data symbol generator 12 for output. The signals output by the P1 symbol inserter 13 are transmitted after further processing by a non-diagrammed processor within the OFDM transmitter 1, such as digital-to-analog conversion and up-conversion to the transmission frequency band. The P1 symbol generator 11 characterizes the OFDM transmitter 1. Other components thereof may be modified or removed as required, and other structures may also be implemented (the same applies to other OFDM transmitters pertaining to the present invention). For example, the data symbol generator 12 may be replaced with a symbol generator that generates other symbols distinct from the P1 symbols, and these other symbols may partly consist of data symbols.

(P1 Symbol Generator)

Figure 2:
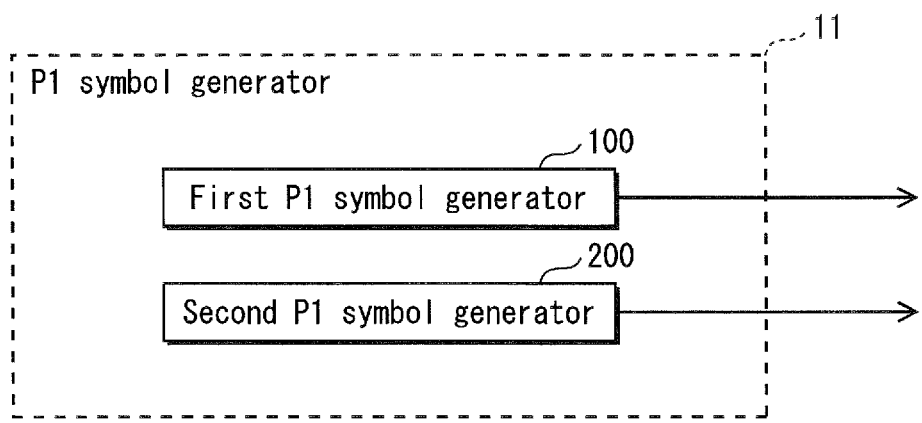
FIG. 2 is a block diagram showing the configuration of a P1 symbol generator 11 from FIG. 1.

FIG. 2 is a block diagram showing the configuration of the P1 symbol generator 11 shown in FIG. 1. The P1 symbol generator 11 includes a first P1 symbol generator 100 and a second P1 symbol generator 200.

As will be described with reference to later figures, the first symbol generator 100 generates a P1 symbol (hereinafter, first P1 symbol) for output to the P1 symbol inserter 13 from FIG. 1. As will be similarly described with reference to later figures, the second symbol generator 200 generates another P1 symbol (hereinafter, second P1 symbol) for output to the P1 symbol inserter 13 from FIG. 1.

(First P1 Symbol Generator)

Figure 3:
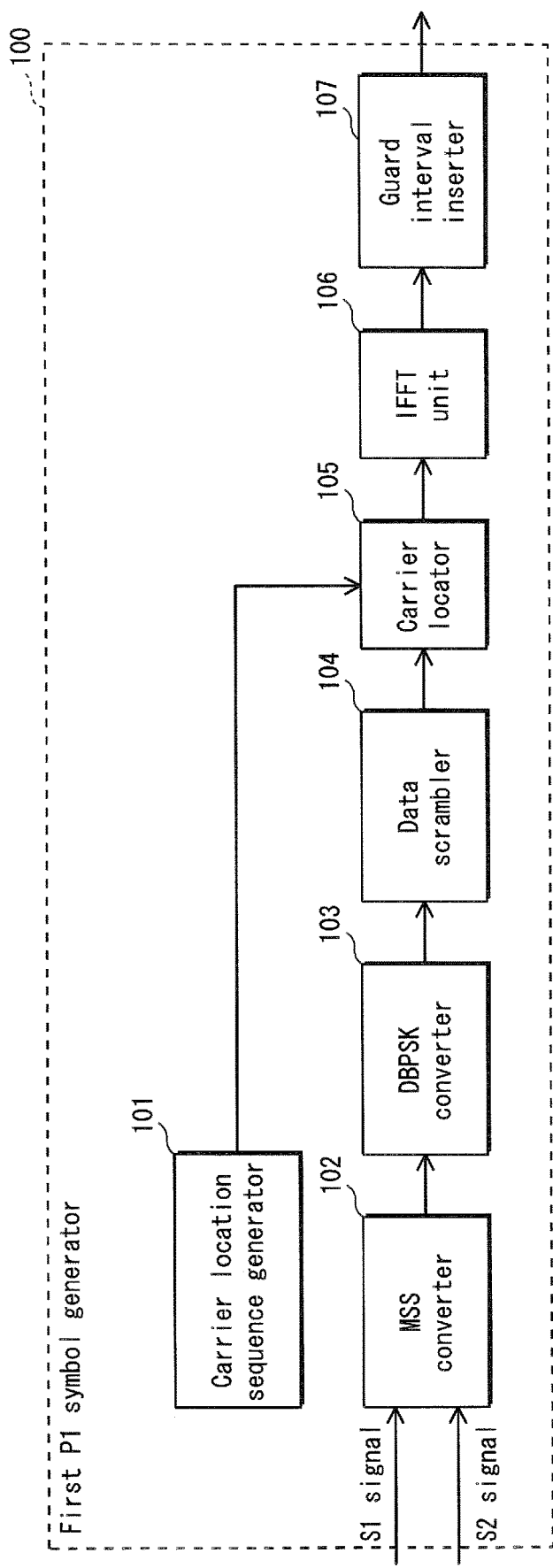
FIG. 3 is a block diagram showing the configuration of a first P1 symbol generator 100 from FIG. 2.

FIG. 3 is a block diagram showing the configuration of the first P1 symbol generator 100 from FIG. 2. In this example, the first P1 symbol is a P1 symbol used in the DVB-T2 broadcasting system and the FEF part. However, the P1 symbol is not limited as such.

The first P1 symbol generator 100 includes a carrier location sequence generator 101, an MSS converter 102, a DBPSK converter 103, a data scrambler 104, a carrier locator 105, an IFFT unit 106, and a guard interval inserter 107. MSS is the abbreviation of Modulation Signaling Sequence.

The carrier location sequence generator 101 generates or stores a carrier location sequence a[j] such that, as shown in FIG. 4, a[j]=1 (indicating Active carriers) for a sub-carrier number j and a[j]=0 (indicating Null carriers) for all other sub-carriers. The carrier location sequence generator 101 then outputs the carrier location sequence a[j] to the carrier locator 105.

The values of an S1 signal and an S2 signal, which indicate transmission parameter information, are input to the MSS converter 102. The MSS converter 102 converts the values of the S1 signal and the S2 signal input thereto into the sequence shown in FIG. 5, then outputs the resulting sequence to the DBPSK converter 103. In FIG. 5, the "Value" column indicates the values input to the MSS converter 102, while the "Sequence (hexadecimal)" column indicates the converted sequences (the sequences output by the MSS converter 102).

The DBPSK converter 103 performs DBPSK (Differential Binary Phase Shift Keying) on the sequence input thereto from the MSS converter 102, then outputs the resulting sequence to the data scrambler 104.

The data scrambler 104 uses a Pseudorandom Binary Sequence (PRBS) to scramble the sequence input by the DBPSK converter 103, and then outputs the resulting scrambled sequence to the carrier locator 105.

The carrier locator 105 maps the sequence data input thereto from the data scrambler 104 to the sub-carriers having a sub-carrier number with the value 1 (i.e., the Active carriers) in the carrier location sequence input thereto from the carrier location sequence generator 101, then outputs the resulting map to the IFFT unit 106.

Once the data have been mapped to the Active carriers by the carrier locator 105, the IFFT unit 106 converts the signal output by the carrier locator 105 (a frequency-domain signal) into a useful symbol, which is a signal in the time domain, by applying an IFFT (Inverse Fast Fourier Transform) thereto. The IFFT unit 106 then outputs the useful symbol so obtained to the guard interval inserter 107.

The guard interval inserter 107 inserts a leading guard interval and a trailing guard interval, which are time-domain signals, into the signal output by the IFFT unit 106 (the signal with a useful symbol interval in the time domain), thus generating the first P1 symbol. The guard interval inserter 107 then outputs the first P1 symbol to the P1 symbol inserter 13 shown in FIG. 1.

Figure 6:
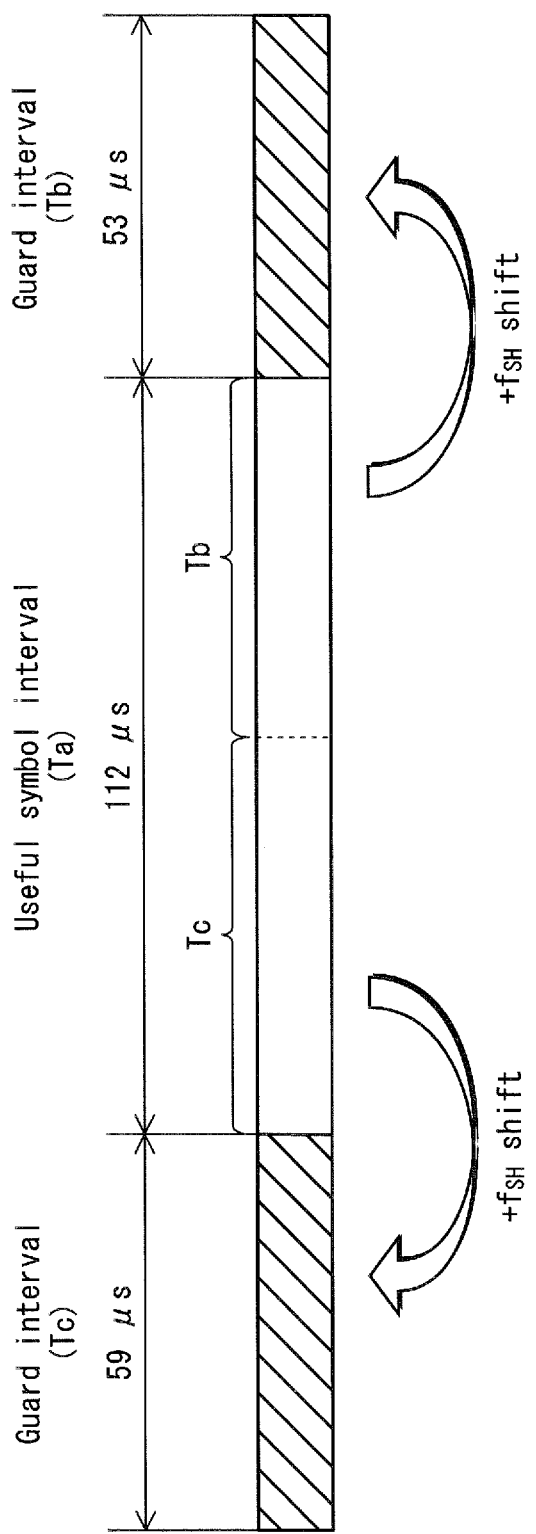
FIG. 6 is a schematic diagram illustrating a first P1 symbol with guard intervals inserted by a guard interval inserter 107 (time domain shown).

FIG. 6 is a schematic diagram illustrating the first P1 symbol with guard intervals inserted by the guard interval inserter 107 (time domain shown). As shown, the guard interval inserter 107 generates the leading guard interval by frequency-shifting the leading portion (Tc=59 μs) of the useful symbol (Ta=112 μs) by $+f_{SH}$ (equivalent to the sub-carrier spacing in the first P1 symbol). The guard interval inserter 107 then inserts the leading guard interval so generated at the head of the useful symbol. The above are all time-domain signals. Similarly, the guard interval inserter 107 generates the trailing guard interval by frequency-shifting the trailing portion (Tb=53 μs) of the useful symbol by $+f_{SH}$. The guard interval inserter 107 then inserts the trailing guard interval so generated at the tail of the useful symbol interval. The above are all time-domain signals. The first P1 symbol is thereby generated. This process is expressed in the below-inscribed Math. 2.

$$p1_{1st}(t) = \begin{cases} p1_{1st\_A}(t)e^{j2\pi f_{SH}t} & 0 \le t < 542T \\ p1_{1st\_A}(t - 542T) & 542T \le t < 1566T \\ p1_{1st\_A}(t - 1024T)e^{j2\pi f_{SH}t} & 1566T \le t < 2048T \\ 0 & \text{otherwise} \end{cases} \quad \text{(Math. 2)}$$

where $p1_{1st}(t)$ is the first P1 symbol, $p1_{1stA}(t)$ is the useful symbol, $+f_{SH}$ is the frequency shift, T is the time of one sample, post-IFFT, t is time, and the start time of the first P1 symbol is 0. In the DVB-T2 broadcasting system, for a bandwidth of 8 MHz, T is 7/64 µs and the useful symbol length is 1024T=112 µs.

(Second P1 Symbol Generator)

Figure 7:
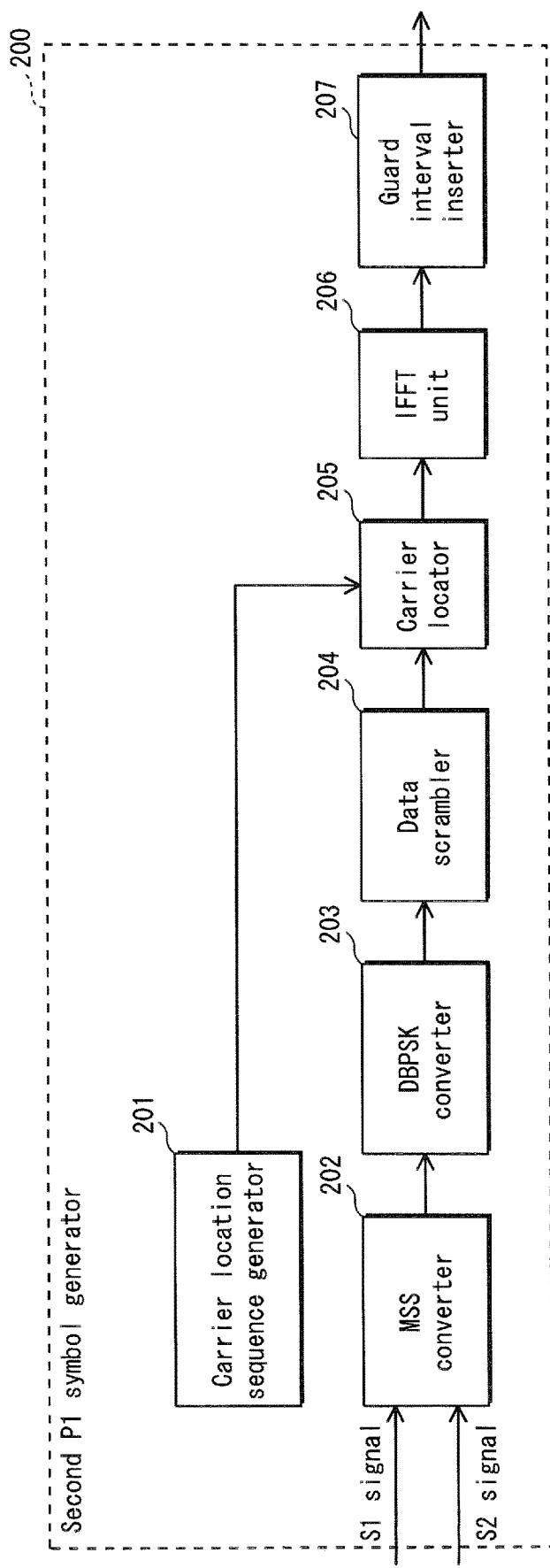
FIG. 7 is a block diagram showing the configuration of a second P1 symbol generator 200 from FIG. 2.

FIG. 7 is a block diagram showing the configuration of the second P1 symbol generator 200 from FIG. 2.

The second P1 symbol generator 200 includes a carrier location sequence generator 201, an MSS converter 202, a DBPSK converter 203, a data scrambler 204, a carrier locator 205, an IFFT unit 206, and a guard interval inserter 207.

The carrier location sequence generator 201 generates or stores a carrier location sequence a[j] such that, as shown in FIG. 4, a[j]=1 (indicating Active carriers) for a sub-carrier number j and a[j]=0 (indicating Null carriers) for all other sub-carriers. The carrier location sequence generator 101 then outputs the carrier location sequence a[j] to the carrier locator 205. The carrier location sequence generator 201 outputs a carrier location sequence identical to that output by the carrier location sequence generator 101 of the first P1 symbol generator 100.

The values of the S1 signal and the S2 signal, which indicate transmission parameter information, are input to the MSS converter 202. The MSS converter 202 converts the values of the S1 signal and the S2 signal input thereto into the sequence shown in FIG. 5, then outputs the resulting sequence to the DBPSK converter 203. In FIG. 5, the "Value" column indicates the values input to the MSS converter 202, while the "Sequence (hexadecimal)" column indicates the converted sequences (the sequences output by the MSS converter 202). The transmission parameter information input to the first P1 symbol generator 100 is not the same as the transmission parameter information input to the second P1 symbol generator 200 (which receives more information). However, the same information may also be input to both generators (improving information reliability through multiple transmissions).

The DBPSK converter 203 performs DBPSK on the sequence input thereto from the MSS converter 202, and then outputs the resulting sequence to the data scrambler 204.

The data scrambler 204 uses a PBRS to scramble the sequence input thereto by the DBPSK converter 203, and then outputs the resulting scrambled sequence to the carrier locator 205.

The carrier locator 205 maps the sequence data input thereto from the data scrambler 204 to the sub-carriers having a sub-carrier number with a value of 1 (i.e., the Active carriers) in the carrier location sequence input thereto from the carrier location sequence generator 201, then outputs the resulting map to the IFFT unit 206.

In this example, the structure of the carrier location sequence 201 through the carrier locator 205 is described as identical to that of the corresponding components of the first P1 symbol generator 100. However, this is not intended as a restriction. That is, information may be modulated without using MSS conversion beforehand, and the modulation need not necessarily be DBPSK. Furthermore, a structure without carrier location sequences, such as the ISDB-T broadcasting system or the DVB-T broadcasting system in which the central useful sub-carriers are all used, is also applicable.

Once the data have been mapped to the Active carriers by the carrier locator 205, the IFFT unit 206 converts the signal output by the carrier locator 205 (a frequency-domain signal) into a signal with a useful symbol in the time domain by applying an IFFT thereto. The IFFT unit 106 then outputs the useful symbol so obtained to the guard interval inserter 207.

The guard interval inserter 207 inserts a leading guard interval and a trailing guard interval, which are time-domain signals, into the signal output by the IFFT unit 206 (the signal with a useful symbol interval in the time domain), thus generating the first P1 symbol. The guard interval inserter 207 then outputs the second P1 symbol to the P1 symbol inserter 13 shown in FIG. 1.

Figure 8:
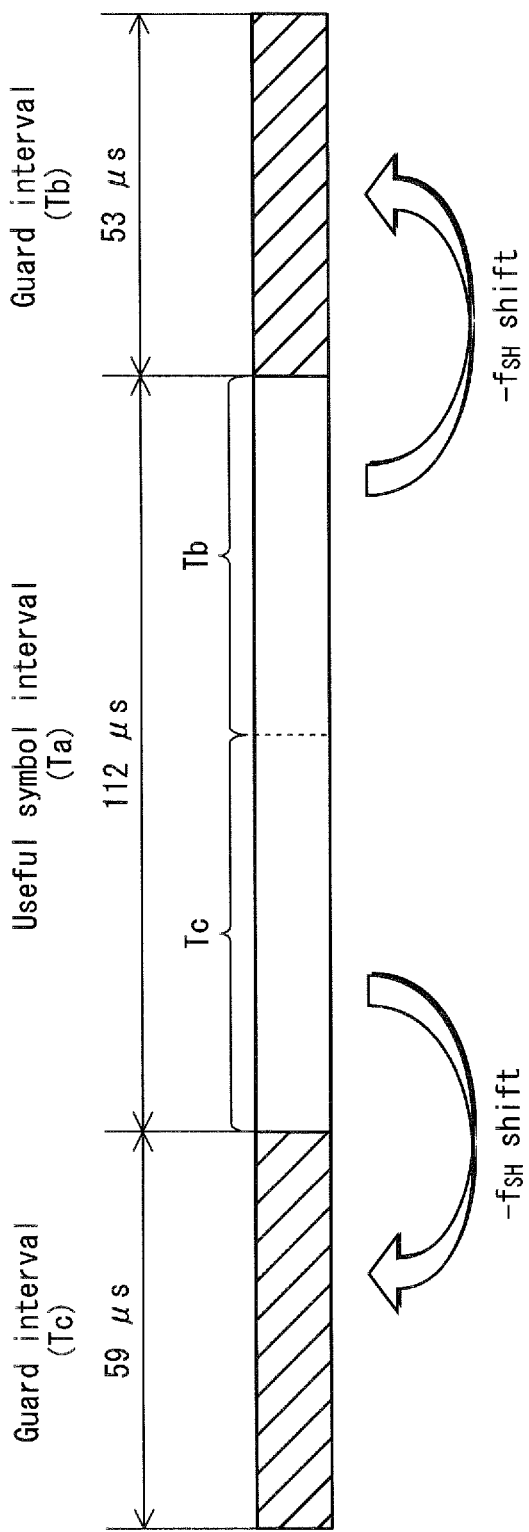
FIG. 8 is a schematic diagram illustrating a second P1 symbol with guard intervals inserted by a guard interval inserter 207 (time domain shown).

FIG. 8 is a schematic diagram illustrating the second P1 symbol with guard intervals inserted by the guard interval inserter 207 (time domain shown). As shown, the guard interval inserter 207 generates the leading guard interval by frequency-shifting the leading portion (Tc=59 µs) of the useful symbol (Ta=112 µs) by $-f_{SH}$. The guard interval inserter 207 then inserts the leading guard interval so generated at the head of the useful symbol. The above are all time-domain signals. Similarly, the guard interval inserter 207 generates the trailing guard interval by frequency-shifting the trailing portion (Tb=53 µs) of the useful symbol by $-f_{SH}$. The guard interval inserter 207 then inserts the trailing guard interval so generated at the tail of the useful symbol interval. The above are all time-domain signals. The second P1 symbol is thereby generated. This process is expressed in the below-inscribed Math. 3.

$$p1_{2nd}(t') = \begin{cases} p1_{2nd\_A}(t')e^{-j2\pi f_{SH}t'} & 0 \le t' < 542T \\ p1_{2nd\_A}(t' - 542T) & 542T \le t' < 1566T \\ p1_{2nd\_A}(t' - 1024T)e^{-j2\pi f_{SH}t'} & 1566T \le t' < 2048T \\ 0 & \text{otherwise} \end{cases} \quad \text{(Math. 3)}$$

where $p1_{2nd}(t')$ is the second P1 symbol, $p1_{2ndA}(t')$ is the useful symbol, $-f_{SH}$ is the frequency shift, T is the time of one sample, post-IFFT, t' is time, and the start time of the second P1 symbol is 0. In the DVB-T2 broadcasting system, for a bandwidth of 8 MHz, T=7/64 µs and the useful symbol length is 1024T=112 µs.

As described above, the leading guard interval and the trailing guard interval of the first P1 symbol are time-domain signals obtained by frequency-shifting a given portion of the useful symbol in the time domain by $+f_{SH}$ ($\ne 0$) (see FIG. 6). In contrast, the leading guard interval and the trailing guard interval of the second P1 symbol are time-domain signals obtained by frequency-shifting a given portion of the useful symbol in the time domain by $-f_{SH}$ (equal in absolute value but opposite in sign to $f_{SH}$) (see FIG. 8). Thus, the first and second P1 symbols differ in terms of the frequency shift applied to the appropriate portion of the useful symbol in the time domain in order to generate the guard intervals. The same portion and span (length) of the useful symbol in the time domain is used to generate the leading guard interval for both the first P1 symbol and the second P1 symbol. Likewise, the same portion and span (length) of the useful symbol in the time domain is used to generate the trailing guard interval for both the first P1 symbol and the second P1 symbol (see FIGS. 6 and 8).

Figure 9:
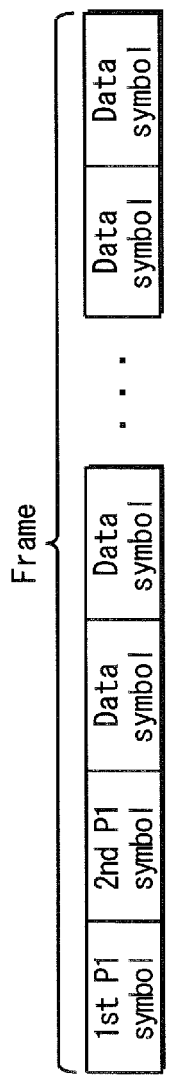
FIG. 9 is a schematic diagram illustrating a transmission system frame structure that uses first and second P1 symbols.

The P1 symbol inserter 13 from FIG. 1 inserts the first and second P1 symbols, generated as described above, into the group of data symbols generated by the data symbol generator 11 from FIG. 1. As shown in FIG. 9, the structure of a frame is as follows: the first P1 symbol (labeled "1st P1 symbol" in FIG. 9) is arranged at the head of the frame, immediately followed by the second P1 symbol (labeled "2nd P1 symbol" in FIG. 9), and the data symbols are arranged after the second P1 symbol to complete the frame. Thus, the main symbols (i.e., the data symbols) can be demodulated according to the transmission parameter information added to the first and second P1 symbols.

(OFDM Receiver)

Figure 10:
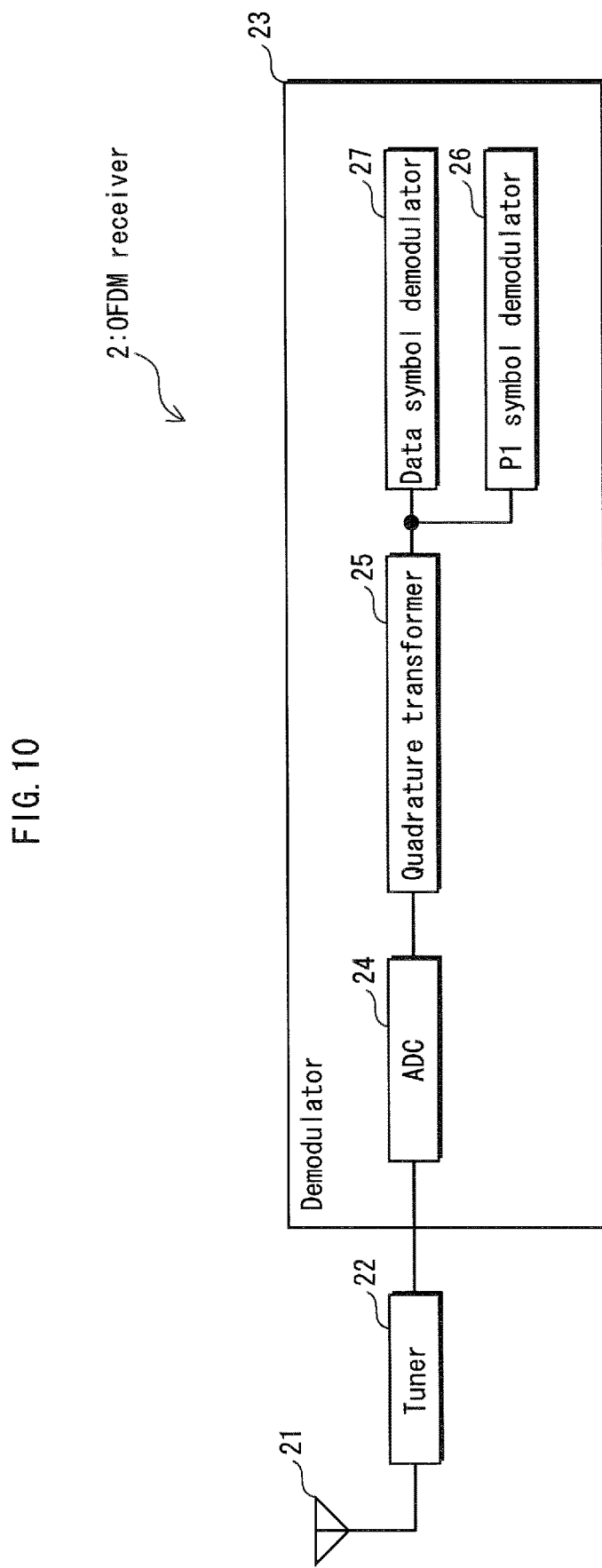
FIG. 10 is a block diagram showing the configuration of an OFDM receiver 2 pertaining to Embodiment 1 of the present invention.

FIG. 10 is a block diagram showing the configuration of the OFDM receiver 2 pertaining to Embodiment 1. The OFDM receiver 2 includes an antenna 21, a tuner 22, and a demodulator 23.

The antenna 21 receives transmission waves from the OFDM transmitter 1 shown in FIG. 1, and then outputs the received transmission waves (received waves) to the tuner 22. The tuner 22 selects a desired received wave among the multiple received waves input thereto by the antenna 21, converts the selected wave from the RF (Radio Frequency) band to the IF (Intermediate Frequency) band, and then outputs the resulting IF-band wave to the demodulator 23.

The demodulator 23 includes an ADC (analog-to-digital converter) 24, a quadrature transformer 25, a P1 symbol demodulator 26, and a data symbol demodulator 27. The ADC 24 converts the received IF-band waves from analog signals to digital signals for output. The quadrature transformer 25 then performs a quadrature transformation on the signals output by the ADC 24 to obtain complex baseband signals for output. As will be described later with reference to the drawings, the P1 symbol demodulator 26 demodulates the P1 symbols (the first and second P1 symbols) included in the signal output by the quadrature transformer 25. The data symbol demodulator 27 demodulates the multiple data symbols included in the signal output by the quadrature transformer 25 according to the results of P1 symbol demodulation by the P1 symbol demodulator 26 (that is, according to the transmission parameter information obtained by demodulating the P1 symbols). The P1 symbol demodulator 26 characterizes the OFDM receiver 2. Other components thereof may be modified or removed as required, and other structures may also be implemented (the same applies to other OFDM receivers pertaining to the present invention). For example, the data symbol demodulator 27 may be replaced by a symbol demodulator that demodulates other symbols distinct from the P1 symbols, and these other symbols may partly consist of data symbols.

(P1 Symbol Demodulator)

Figure 11:
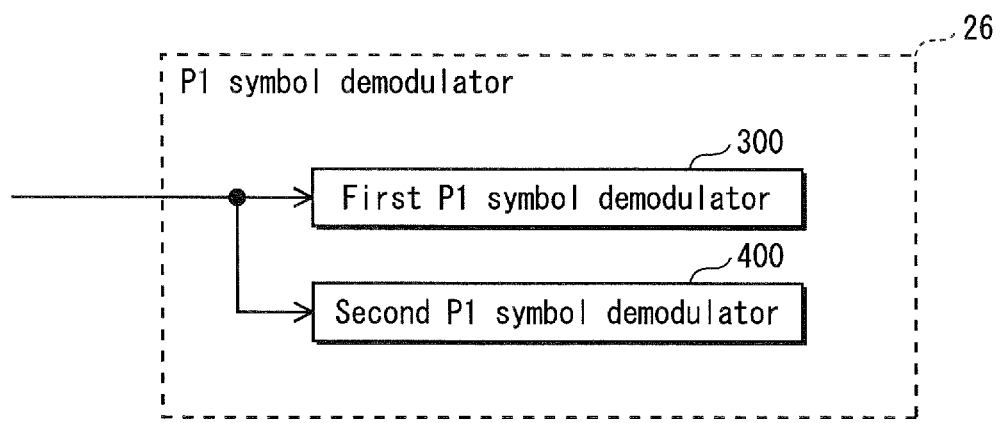
FIG. 11 is a block diagram showing the configuration of a P1 symbol demodulator 26 from FIG. 10.

FIG. 11 is a block diagram showing the configuration of the P1 symbol demodulator 26 shown in FIG. 10. The P1 symbol demodulator 26 includes a first P1 symbol demodulator 300 and a second P1 symbol demodulator 400.

As will be described later with reference to the drawings, the first P1 symbol demodulator 300 demodulates the first P1 symbol while the second P1 symbol demodulator 400 demodulates the second P1 symbol.

(First P1 Symbol Demodulator)

Figure 12:
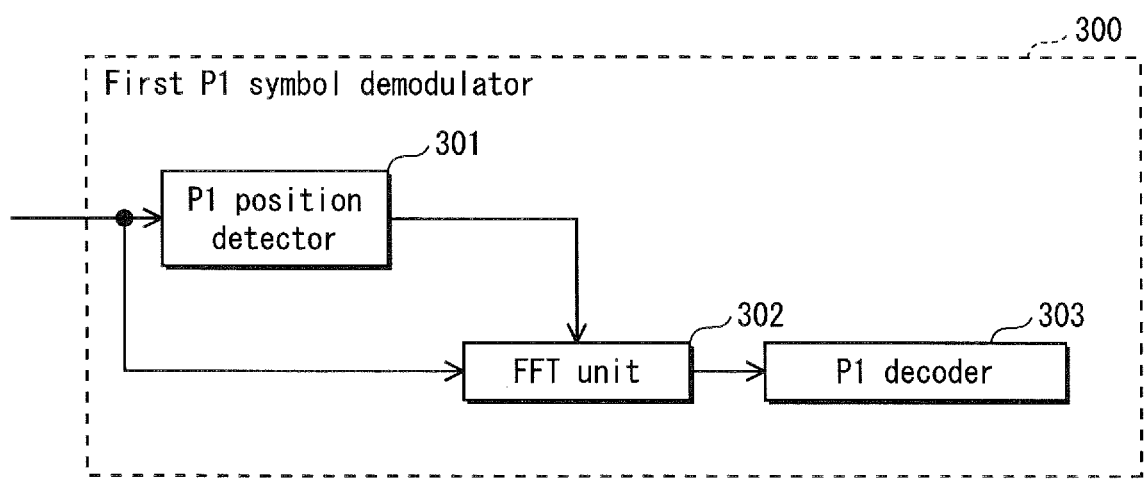
FIG. 12 is a block diagram showing the configuration of a first P1 symbol demodulator 300 from FIG. 11.

FIG. 12 is a block diagram showing the configuration of the first P1 symbol demodulator 300 shown in FIG. 11. The first P1 symbol demodulator 300 includes a P1 position detector 301, an FFT unit 302, and a P1 decoder 303.

Figure 13:
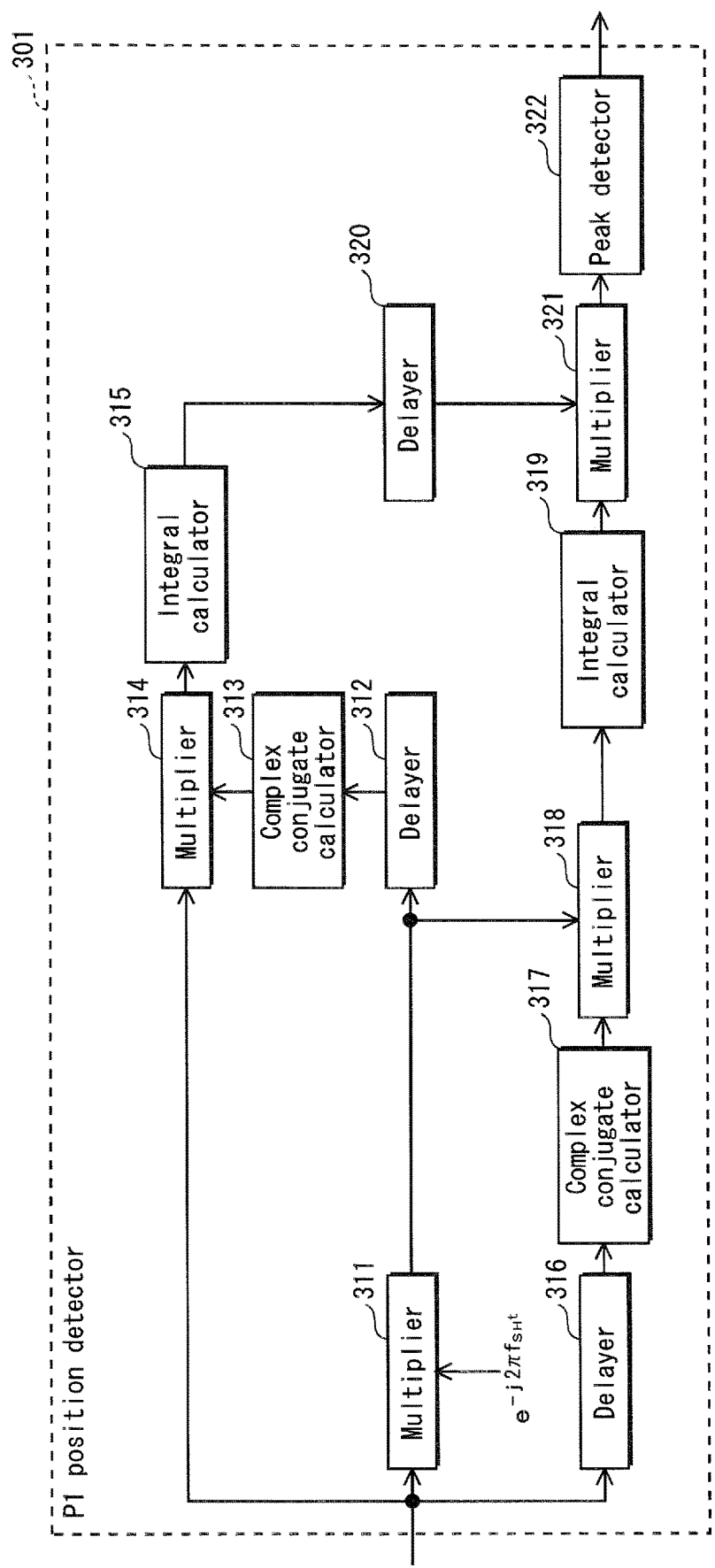
FIG. 13 is a block diagram showing the configuration of a P1 position detector 301 from FIG. 12.

The P1 position detector 301 detects the position of the first P1 symbol in the time-domain signal input thereto (i.e., in the first P1 symbol demodulator 300 input signal) and outputs the first P1 symbol position information so obtained to the FFT unit 302. FIG. 13 shows the structure of the P1 position detector 301.

The P1 position detector 301 includes a multiplier 311, a delayer 312, a complex conjugate calculator 313, a multiplier 314, an integral calculator 315, a delayer 316, a complex conjugate calculator 317, a multiplier 318, an integral calculator 319, a delayer 320, a multiplier 321, and a peak detector 322.

The P1 position detector 301 input signal is input to the multiplier 311. The multiplier 311 multiplies the P1 position detector 301 input signal by $\exp(-j2\pi f_{SH}t)$ in order to apply a frequency shift that is the inverse of the $+f_{SH}$ frequency shift applied by the transmitter to the time-domain signals of the leading and trailing guard intervals of the first P1 symbol (applying a frequency shift of $-f_{SH}$). The multiplier 311 then outputs the result to the delayer 312 and to the multiplier 318. The delayer 312 delays the signal output by the multiplier 311 by a span equivalent to the length of the first P1 symbol leading guard interval (Tc=59 μs), then outputs the delayed signal to the complex conjugate calculator 313. The complex conjugate calculator 313 calculates the complex conjugate of the signal output by the delayer 312 and outputs the resulting complex conjugate signal to the multiplier 314. The multiplier 314 calculates a correlation by multiplying the P1 position detector 301 input signal and the complex conjugate calculator 313 output signal, then outputs the correlated value so calculated to the integral calculator 315. The integral calculator 315 integrates the output signal from the multiplier 314 over the length Tc of the leading guard interval of the first P1 symbol, and then outputs the result to the delayer 320. This signal processing is also illustrated by FIGS. 55A through 55C.

Figure 56A:
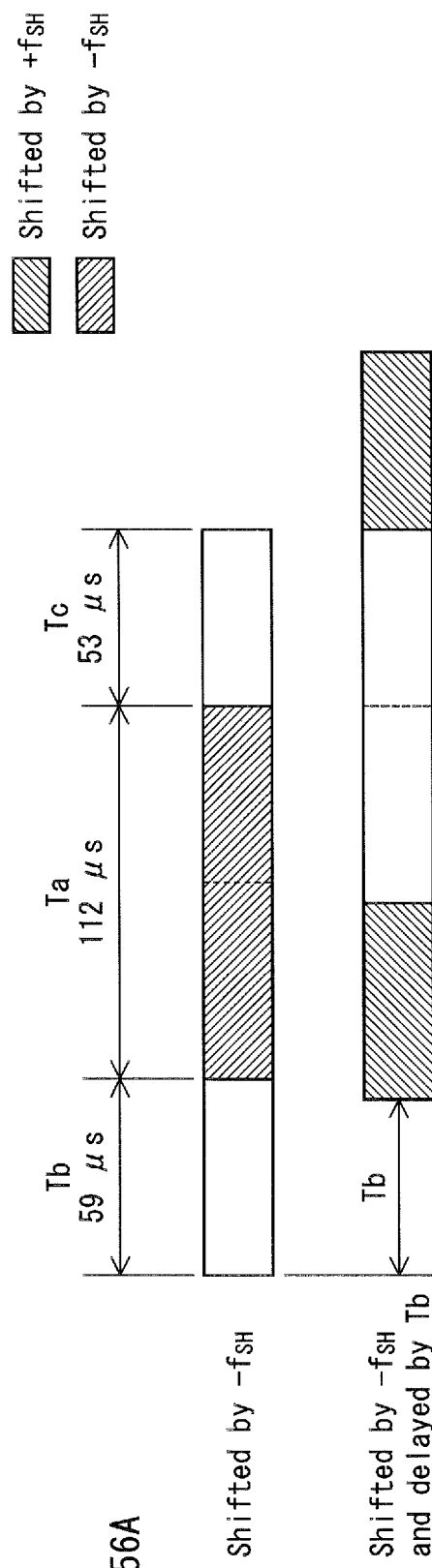
FIGS. 56A, 56B, and 56C are schematic diagrams illustrating correlations taken in the trailing portion of the P1 symbol by the P1 position detector 10101 from FIG. 54.
Figure 56B:
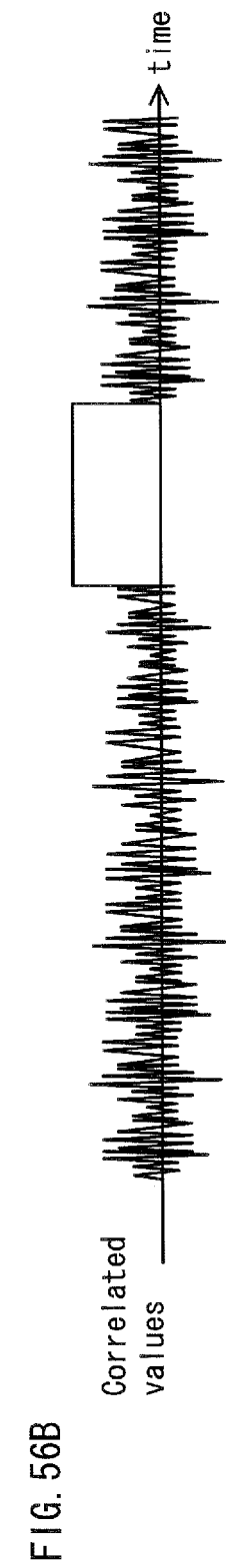
Figure 56C:
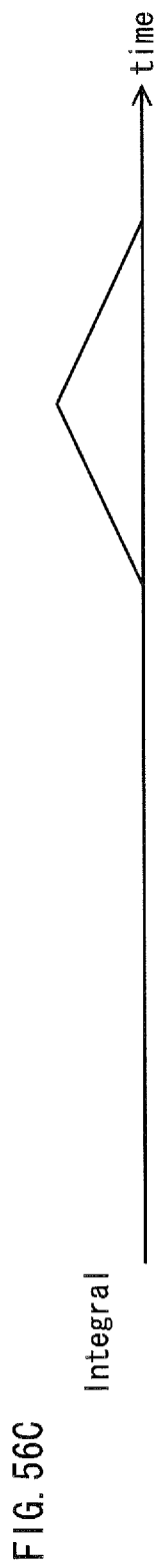
Figure 57:
FIG. 57 is a schematic diagram illustrating the structure of FEF and DVB-T2 frames.
Figure 58:
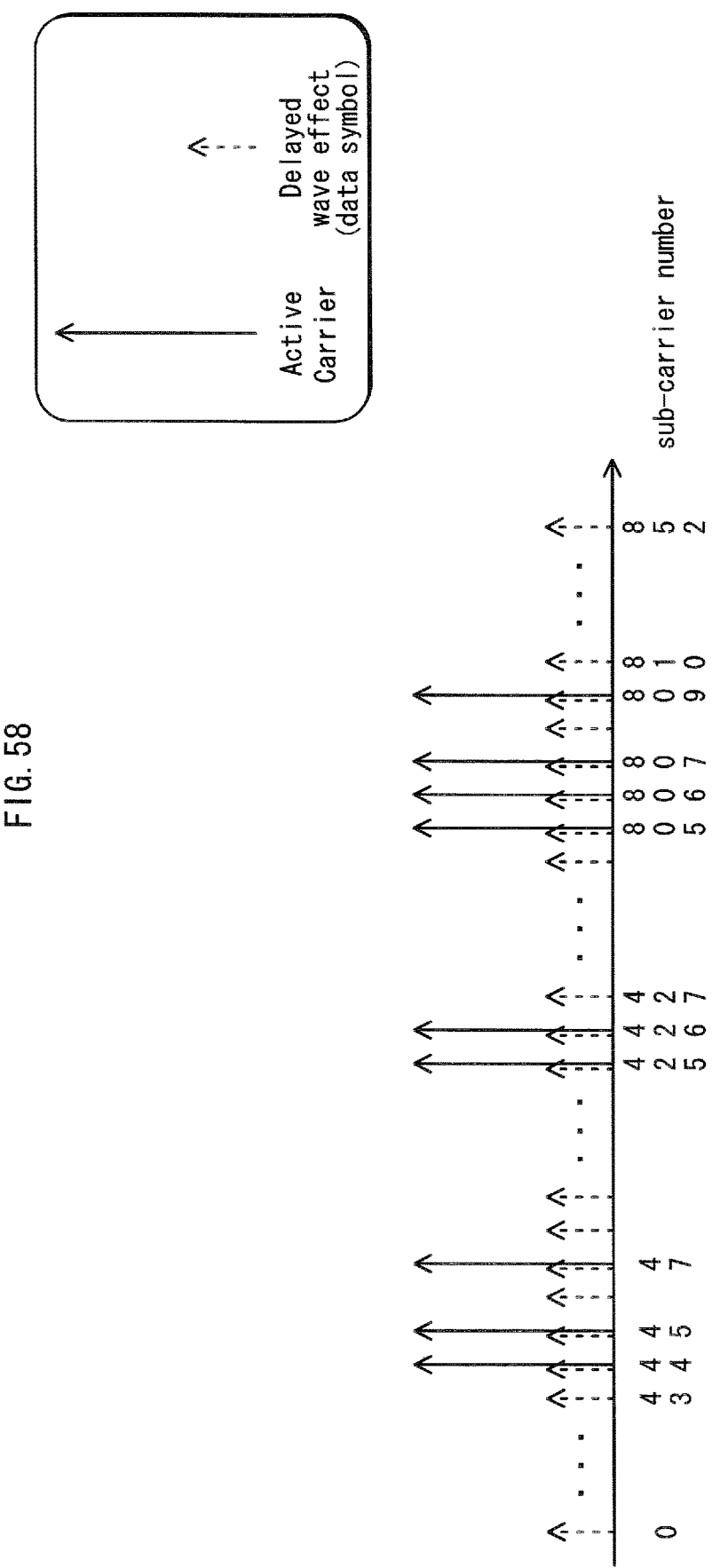
FIG. 58 is a schematic diagram illustrating interference between the P1 symbol and data symbols in a delayed environment.
Figure 59:
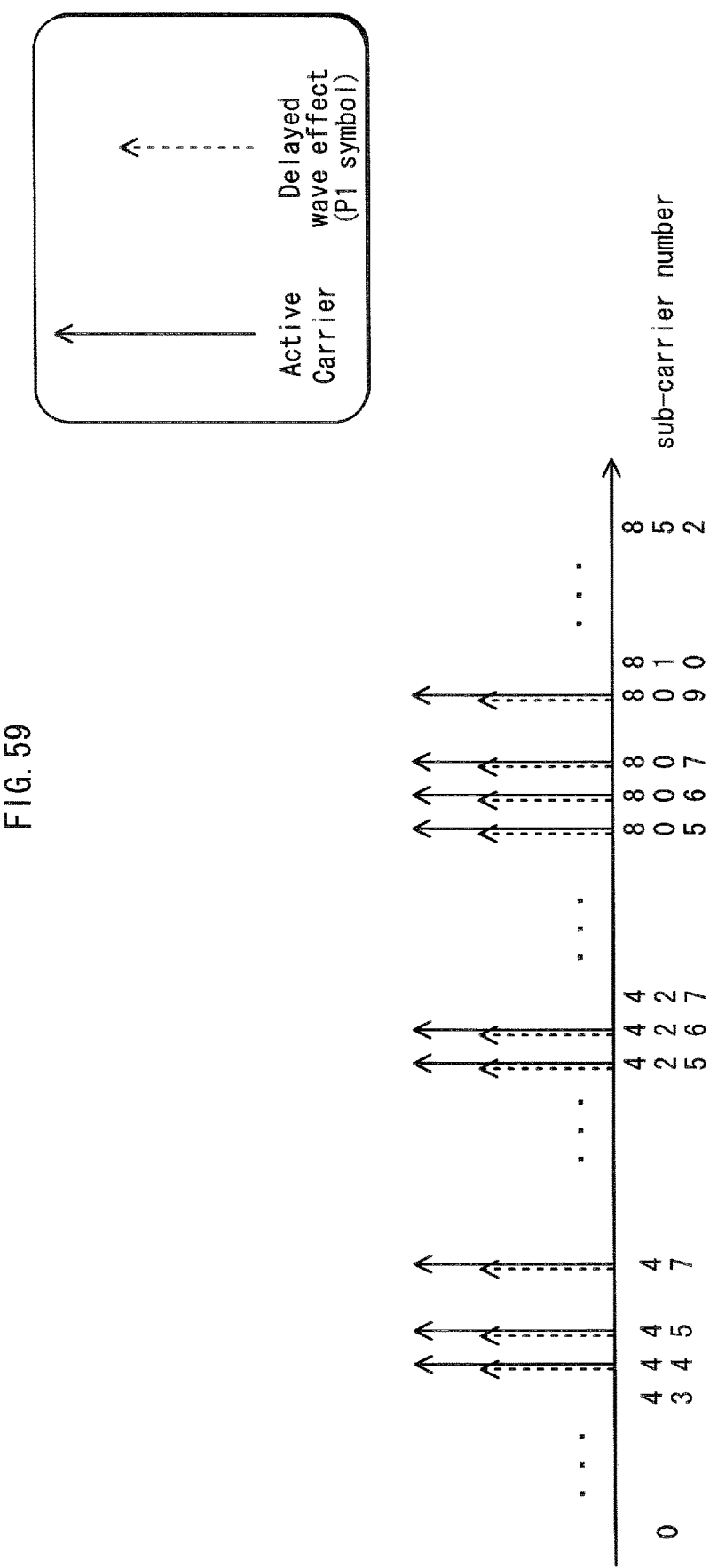
FIG. 59 is a schematic diagram illustrating interference between the P1 symbol and another P1 symbol in a delayed environment.

Meanwhile, the P1 position detector 301 input signal is input to the delayer 316. The delayer 316 delays the P1 position detector 301 input signal by a span equivalent to the length of the first P1 symbol trailing guard interval (Tb=53 μs), then outputs the delayed signal to the complex conjugate calculator 317. The complex conjugate calculator 317 calculates the complex conjugate of the signal output by the delayer 316 and outputs the resulting complex conjugate signal to the multiplier 318. The signal input to the multiplier 318 is the result of the multiplier 311 multiplying the P1 position detector 301 input signal by $\exp(-j2\pi f_{SH}t)$. The multiplier 318 calculates a correlation by multiplying the signal output by the multiplier 311 (the P1 position detector 301 input signal with a frequency shift of $-f_{SH}$ applied thereto) and the complex conjugate calculator 317 output signal, then outputs the correlated value so calculated to the integral calculator 319. The integral calculator 319 integrates the output signal from the multiplier 318 over the length Tb of the trailing guard interval of the first P1 symbol, and then outputs the result to the multiplier 321. This signal processing is also illustrated by FIGS. 56A through 56C.

The signal output from the integral calculator 315 is input to the delayer 320. The delayer 320 delays the signal output from the integral calculator 315 to match the signal output from the integral calculator 319 for output to the multiplier 321. The delayer 320 applies a delay of 2×Tb. The multiplier 321 multiplies the signal output from the integral calculator 319 by the signal output from the delayer 320, and then outputs the product to the peak detector 322. Thus, the peaks are made more prominent by matching the peaks in the correlated value integral taken for the leading guard interval to the peaks in the correlated value integral taken for the trailing guard interval. The peak detector 322 detects the position of the first P1 symbol within the P1 position detector 301 input signal (i.e., the signal input to the first P1 symbol demodulator 300) by detecting the peak position in the signal output from the multiplier 321. The peak detector 322 then accordingly outputs position information for the first P1 symbol to the FFT unit 302 shown in FIG. 12. Given the presence of a delayed wave, a peak correlation appears in correspondence to the level and position of the delay.

The FFT unit 302 shown in FIG. 12 performs an FFT on the signal input from the first P1 symbol demodulator 300 (a time-domain signal) in accordance with the first P1 symbol position information, thus obtaining a converted frequency-domain signal for output to the P1 decoder 303. The P1 decoder 303 generates or stores a carrier location sequence a[j] such that, as shown in FIG. 4, a[j]=1 (indicating the Active carriers) for a sub-carrier number j, and a[j]=0 (indicating the Null carriers) for all other sub-carriers. The P1 decoder 303 then, in accordance with the carrier location sequence a[j], uses the Active carrier in the frequency-domain signal to perform a decoding process on the first P1 symbol, calculates the values of the S1 and S2 signals that were added to the first P1 symbol, and discerns the transmission parameter information (e.g., the FFT size, MISO/SISO information, and so on) according to these values.

(Second P1 Symbol Demodulator)

Figure 14:
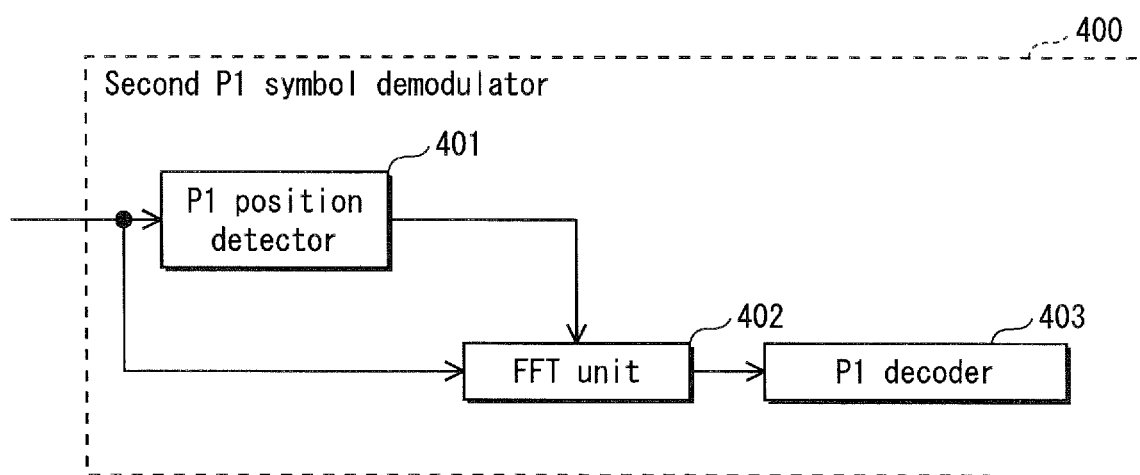
FIG. 14 is a block diagram showing the configuration of a second P1 symbol demodulator 400.

FIG. 14 is a block diagram showing the configuration of the second P1 symbol demodulator 400 shown in FIG. 11. The second P1 symbol demodulator 400 includes a P1 position detector 401, an FFT unit 402, and a P1 decoder 403.

Figure 15:
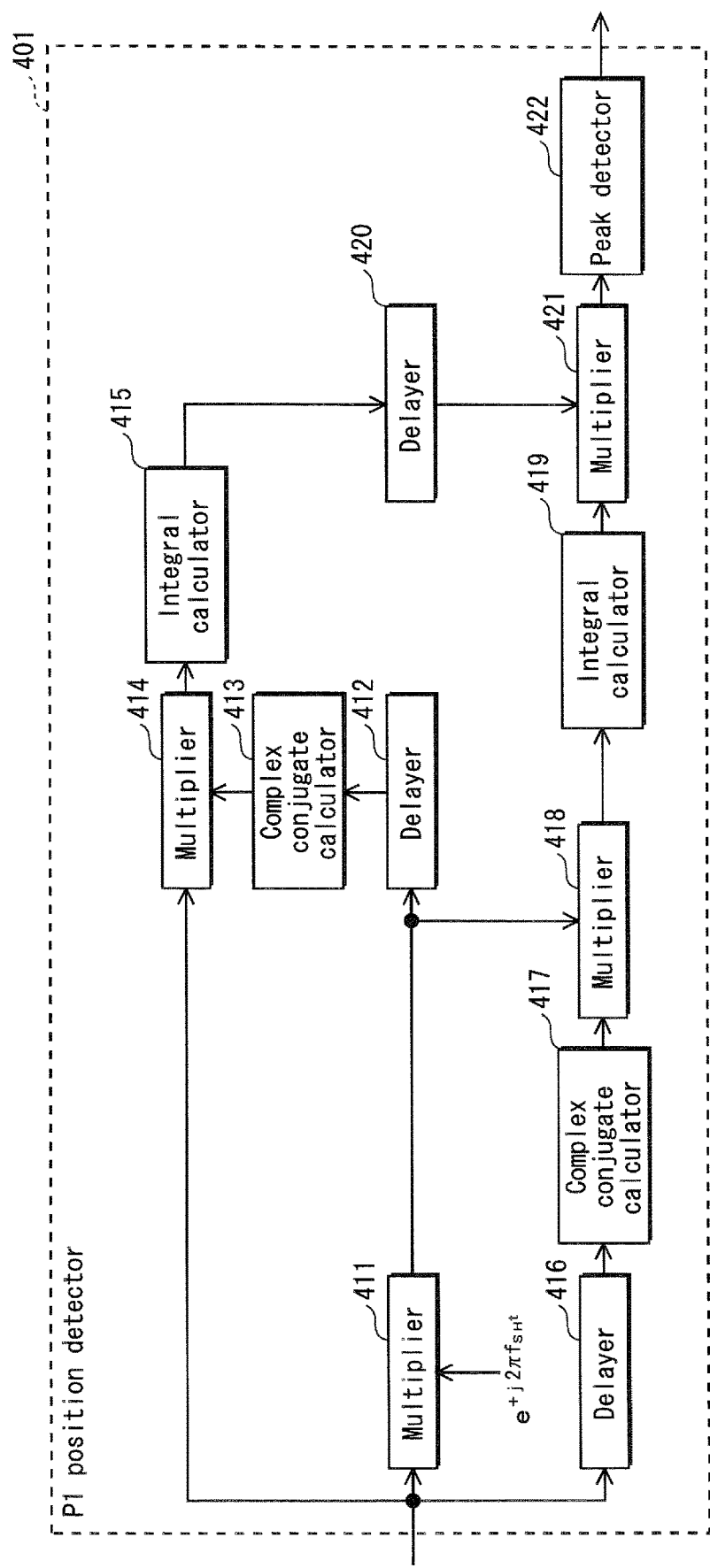
FIG. 15 is a block diagram showing the configuration of a P1 position detector 401 from FIG. 14.

The P1 position detector 401 detects the position of the second P1 symbol in the time-domain signal input thereto (i.e., in the second P1 symbol demodulator 400 input signal) and outputs the second P1 symbol position information so obtained to the FFT unit 402. FIG. 15 shows the structure of the P1 position detector 401.

The P1 position detector 401 includes a multiplier 411, a delayer 412, a complex conjugate calculator 413, a multiplier 414, an integral calculator 415, a delayer 416, a complex conjugate calculator 417, a multiplier 418, an integral calculator 419, a delayer 420, a multiplier 421, and a peak detector 422.

Figures 16A, 16B, 16C:
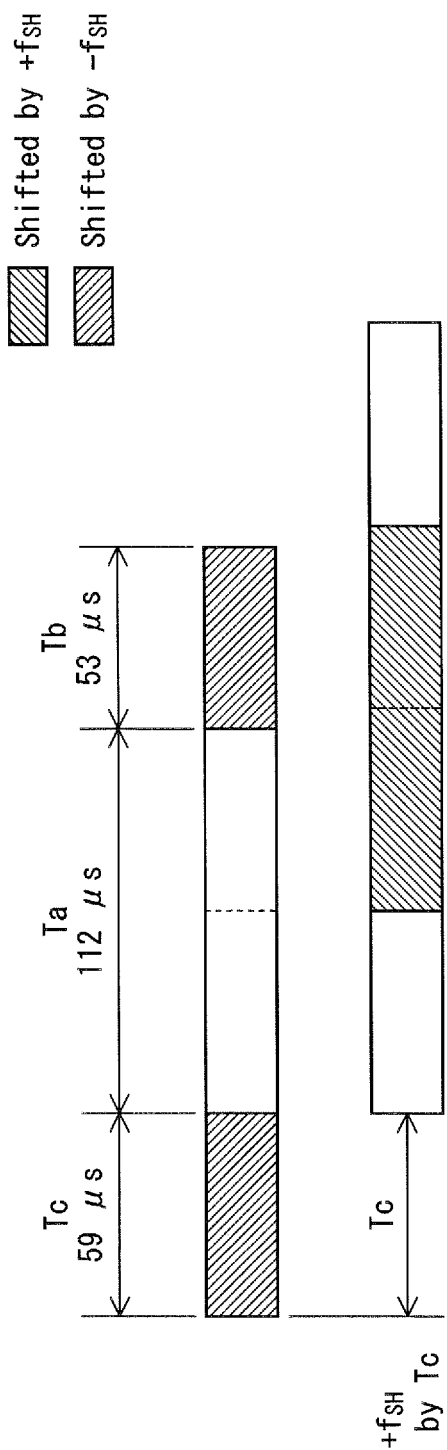
FIGS. 16A, 16B, and 16C are schematic diagrams illustrating correlations taken in the leading portion of the second P1 symbol by the P1 position detector 401 from FIG. 15.

The P1 position detector 401 input signal is input to the multiplier 411. The multiplier 411 multiplies the P1 position detector 401 input signal by $\exp(+j2\pi f_{SH}t)$ in order to apply a frequency shift that is the inverse of the $-f_{SH}$ frequency shift applied by the transmitter to the time-domain signals of the leading and trailing guard intervals of the second P1 symbol (applying a frequency shift of $+f_{SH}$). The multiplier 411 then outputs the result to the delayer 412 and to the multiplier 418. The delayer 412 delays the signal output by the multiplier 411 by a span equivalent to the length of the second P1 symbol leading guard interval (Tc=59 μs), then outputs the delayed signal to the complex conjugate calculator 413. The complex conjugate calculator 413 calculates the complex conjugate of the signal output by the delayer 412 and outputs the resulting complex conjugate signal to the multiplier 414. The multiplier 414 calculates a correlation by multiplying the P1 position detector 401 input signal and the complex conjugate calculator 413 output signal, then outputs the correlated value so calculated to the integral calculator 415. The integral calculator 415 integrates the output signal from the multiplier 414 over the length Tc of the leading guard interval of the second P1 symbol, and then outputs the result to the delayer 420. FIGS. 16A through 16C are schematic diagrams illustrating this signal processing. As shown in FIG. 16A, the leading guard interval obtained by frequency shifting the P1 position detector 401 input signal by $+f_{SH}$ and then delaying the result by the length Tc of the leading guard interval (shown in the lower portion of FIG. 16A) is identical to the leading part of the useful symbol within the P1 position detector 401 (shown in the upper portion of FIG. 16A). The correlation appears in this part, as shown in FIG. 16B. Given that other parts of the signals are not identical, no correlation appears therein. The peak shown in FIG. 16C is the effect of integrating the correlated value shown in FIG. 16B over the length Tc of the leading guard interval.

Figure 17A:
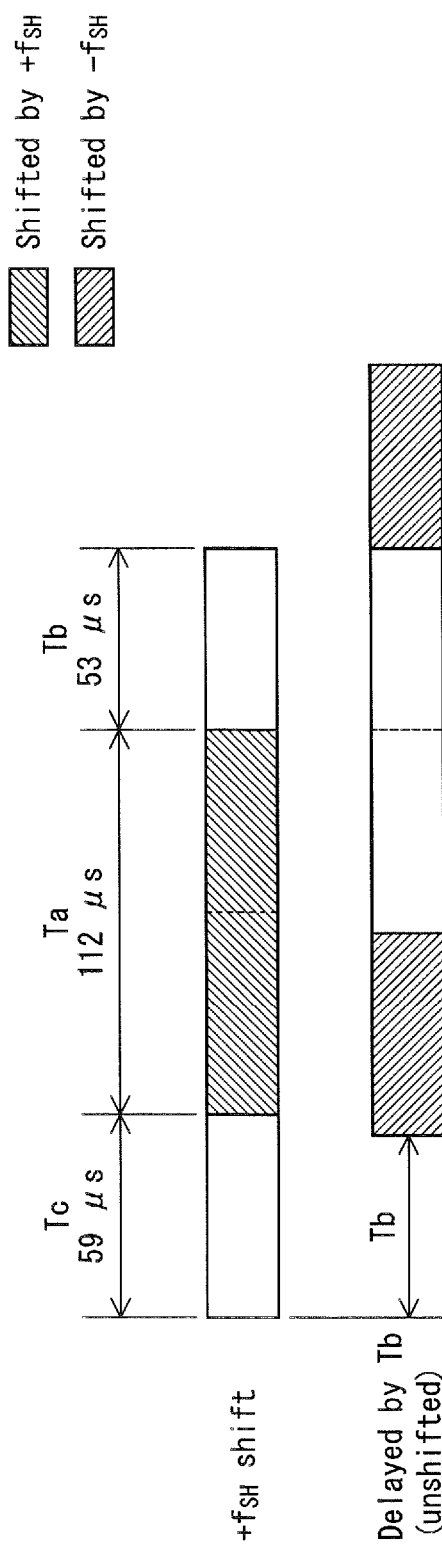
FIGS. 17A, 17B, and 17C are schematic diagrams illustrating correlations taken in the trailing portion of the second P1 symbol by the P1 position detector 401 from FIG. 15.
Figure 17B:
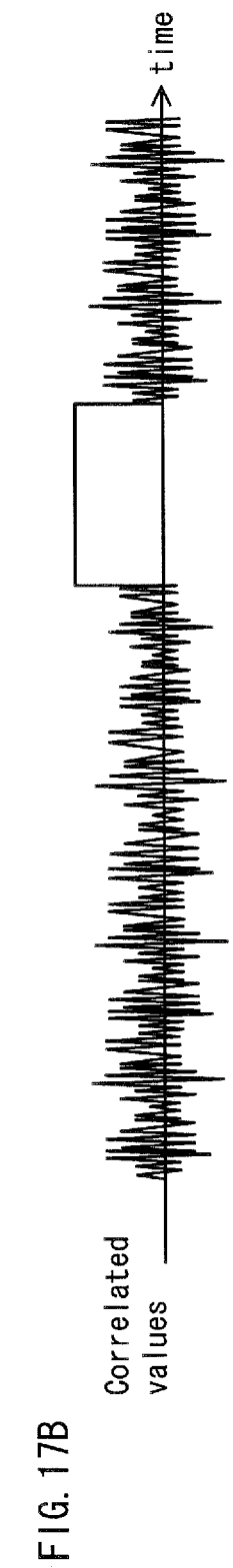
Figure 17C:
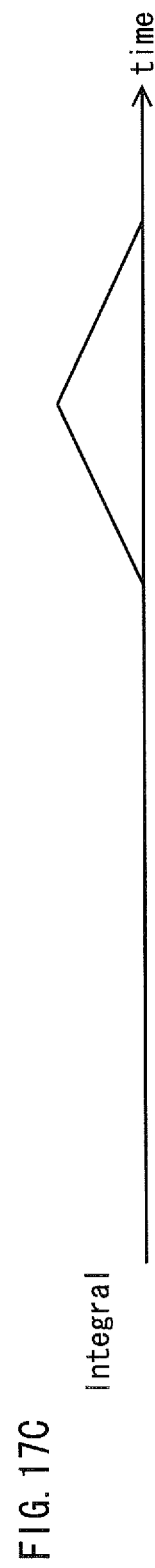

Meanwhile, the P1 position detector 401 input signal is input to the delayer 416. The delayer 416 delays the P1 position detector 401 input signal by a span equivalent to the length of the second P1 symbol trailing guard interval (Tb=53 μs), then outputs the delayed signal to the complex conjugate calculator 417. The complex conjugate calculator 417 calculates the complex conjugate of the signal output by the delayer 416 and outputs the resulting complex conjugate signal to the multiplier 418. The signal input to the multiplier 418 is the result of the multiplier 411 multiplying the P1 position detector 401 input signal by $\exp(+j2\pi f_{SH}t)$. The multiplier 418 calculates a correlation by multiplying the signal output by the multiplier 411 (the P1 position detector 401 input signal with a frequency shift of $+f_{SH}$ applied thereto) and the complex conjugate calculator 417 output signal, then outputs the correlated value so calculated to the integral calculator 419. The integral calculator 419 integrates the output signal from the multiplier 418 over the length Tb of the trailing guard interval of the second P1 symbol, and then outputs the result to the multiplier 421. FIGS. 17A through 17C are schematic diagrams illustrating this signal processing. As shown in FIG. 17A, the trailing guard interval obtained by frequency shifting the P1 position detector 401 input signal by $+f_{SH}$ (shown in the upper portion of FIG. 17A) is identical to the trailing part of the useful symbol within the P1 position detector 401 delayed by the length Tb of the trailing guard interval (shown in the lower portion of FIG. 17A). The correlation appears in this part, as shown in FIG. 17B. Given that other parts of the signals are not identical, no correlation appears therein. The peak shown in FIG. 17C is the effect of integrating the correlated value shown in FIG. 17B over the length Tb of the trailing guard interval.

The signal output from the integral calculator 415 is input to the delayer 420. The delayer 420 delays the signal output from the integral calculator 415 to match the signal output from the integral calculator 419 for output to the multiplier 421. The delayer 420 applies a delay of 2×Tb. The multiplier 421 multiplies the signal output from the integral calculator 419 by the signal output from the delayer 420, and then outputs the product to the peak detector 422. Thus, the peaks are made more prominent by matching the peaks in the correlated value integral taken for the leading guard interval to the peaks in the correlated value integral taken for the trailing guard interval. The peak detector 422 detects the position of the second P1 symbol within the P1 position detector 401 input signal (i.e., the signal input to the second P1 symbol demodulator 400) by detecting the peak position in the signal output from the multiplier 421. The peak detector 422 then accordingly outputs position information for the second P1 symbol to the FFT unit 402 shown in FIG. 14. Given the presence of a delayed wave, a peak correlation appears in correspondence to the level and position of the delay.

The FFT unit 402 shown in FIG. 14 performs an FFT on the signal input from the second P1 symbol demodulator 400 (a time-domain signal) in accordance with the second P1 symbol position information, thus obtaining a converted frequency-domain signal for output to the P1 decoder 403. The P1 decoder 403 generates or stores a carrier location sequence a[j] such that, as shown in FIG. 4, a[j]=1 (indicating the Active carriers) for a sub-carrier number j, and a[j]=0 (indicating the Null carriers) for all other sub-carrier. The P1 decoder 403 then, in accordance with the carrier location sequence a[j], uses the Active carrier in the frequency-domain signal to perform a decoding process on the second P1 symbol, calculates the values of the S1 and S2 signals that were added to the second P1 symbol, and discerns the transmission parameter information according to these values.

As described above, the P1 position detector 301 in the first P1 symbol demodulator 300 frequency-shifts the input signal by $-f_{SH}$ and calculates a correlation in order to detect the first P1 symbol. Similarly, the P1 position detector 401 in the second P1 symbol demodulator 400 frequency-shifts the input signal by $+f_{SH}$ and calculates a correlation in order to detect the second P1 symbol.

(P1 Position Detector of First P1 Symbol Demodulator Operations on Second P1 Symbol)

FIGS. 18A through 18C are schematic diagrams showing a correlation of the leading portion of the second P1 symbol taken by the P1 position detector 301 of the first P1 symbol demodulator 300.

In the second P1 symbol as transmitted, the leading and trailing guard intervals are portions of the useful symbol that have been frequency shifted by $-f_{SH}$ (see FIG. 8). As such, in the P1 position detector 301 of the first P1 symbol demodulator 300, the input signal frequency-shifted by $-f_{SH}$ and delayed by the length Tc of the leading guard interval (the lower portion of FIG. 18A) comes to have leading and trailing guard interval signals that are frequency-shifted by $-2f_{SH}$ while having a useful symbol that is frequency-shifted by $-f_{SH}$. Thus, the leading guard interval signal shown in the lower portion of FIG. 18A does not appear identical to the leading part of the useful symbol of the P1 position detector 301 input signal (the upper portion of FIG. 18A). As shown in FIG. 18B, no correlation appears. While the trailing part of the useful symbol within the signal shown in the lower portion of FIG. 18A is identical to the trailing guard interval signal shown in the upper portion of FIG. 18A, no correlation appears because the two signals are not input to the multiplier 314 at the same time. For this reason, even if an integral of the correlated values shown in FIG. 18B is taken over the length Tb of the leading guard interval, no prominent peaks are produced as can be seen in FIG. 18C.

Figure 19A:
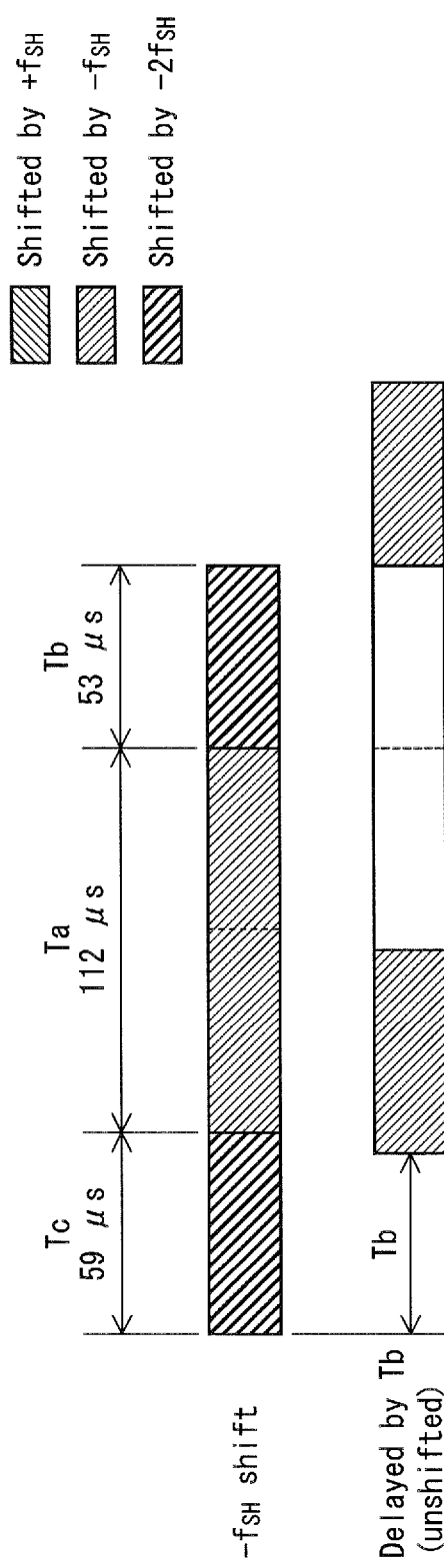
FIGS. 19A, 19B, and 19C are schematic diagrams illustrating correlations taken in the trailing portion of the second P1 symbol by the P1 position detector 301 of the first P1 symbol demodulator 300.
Figure 19B:
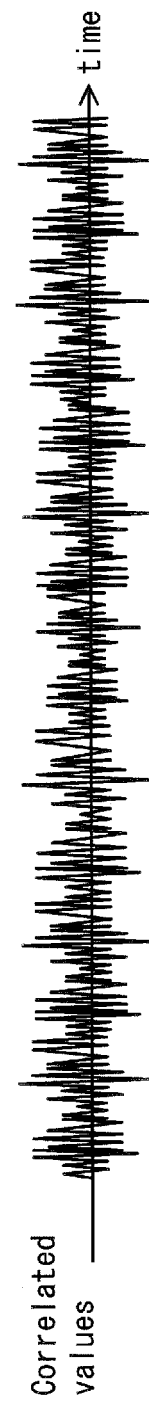
Figure 19C:

FIGS. 19A through 19C are schematic diagrams showing a correlation of the trailing portion of the second P1 symbol taken by the P1 position detector 301 of the first P1 symbol demodulator 300.

In the second P1 symbol as transmitted, the leading and trailing guard intervals are portions of the useful symbol that have been frequency shifted by $-f_{SH}$ (see FIG. 8). As such, in the P1 position detector 301 of the first P1 symbol demodulator 300, the input signal frequency-shifted by $-f_{SH}$ (the upper portion of FIG. 19A) comes to have leading and trailing guard intervals that are frequency-shifted by $-2f_{SH}$ while having a useful symbol that is frequency-shifted by $-f_{SH}$. Thus, the trailing guard interval shown in the upper portion of FIG. 19A does not appear identical to the trailing part of the useful symbol of the P1 position detector 301 input signal with the trailing part delayed by the length Tb of the trailing guard interval (the lower portion of FIG. 19A). As shown in FIG. 19B, no correlation appears. While the leading part of the useful symbol in the signal shown in the upper portion of FIG. 19A is identical to the leading guard interval shown in the lower portion of FIG. 19A, no correlation appears because the two signals are not input to the multiplier 318 at the same time. This is shown in FIG. 19B. For this reason, even if an integral of the correlated values shown in FIG. 19B is taken over the length Tb of the trailing guard interval, no prominent peaks are produced as can be seen in FIG. 19C.

As described above, the first P1 symbol demodulator 300 does not produce peaks in the second P1 symbol, being able to detect the first P1 symbol only. Similarly, the second P1 symbol demodulator 400 does not produce peaks in the first P1 symbol, being able to detect the second P1 symbol only.

(Effects)

According to the above-described Embodiment 1, in the generation of the leading and trailing guard intervals by the transmitter, portions of the first P1 symbol are taken from the useful symbol with a frequency shift of $+f_{SH}$ applied thereto (see FIG. 6) while the frequency shift applied for the second P1 symbol is of $-f_{SH}$ (producing a frequency shift with the same absolute value but the opposite sign as that applied to the first P1 symbol) (see FIG. 8). Accordingly, when the receiver detects a plurality of peaks, the receiver can identify whether the peaks belong to different symbols, or whether one peak is a delayed wave of the other, thus enabling stable reception. In addition, when two P1 symbols are transmitted for the FEF part (i.e., the first P1 symbol and the second P1 symbol), the first P1 symbol is made the leading symbol of the FEF part. Thus, a DVB-T2 receiver equipped only with a demodulator for demodulating the first P1 symbol is unaffected by the second P1 symbol. This secures compatibility with existing DVB-T2 receivers.

Embodiment 2

An OFDM transmitter and an OFDM receiver pertaining to Embodiment 2 of the present invention are described below with reference to the drawings. In the present Embodiment, components having a structure substantially similar to their counterparts in Embodiment 1 use the same reference signs thereas. Explanations of such components are hereinafter simplified or omitted where appropriate.

(OFDM Transmitter)

The OFDM transmitter of the present Embodiment includes a P1 symbol generator 11A that differs from the P1 symbol generator 11 of Embodiment 1. The P1 symbol generator 11A is described below.

(P1 Symbol Generator)

Figure 20:
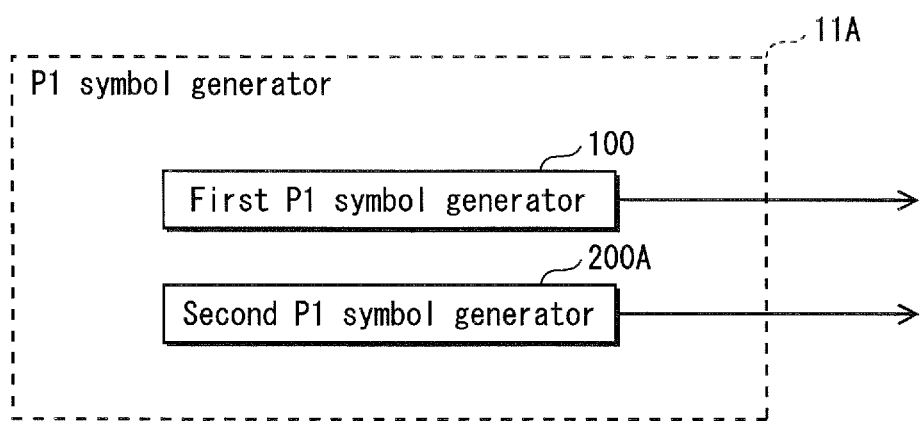
FIG. 20 is a block diagram showing the configuration of a P1 symbol generator 11A in an OFDM transmitter pertaining to Embodiment 2 of the present invention.

FIG. 20 is a block diagram showing the configuration of the P1 symbol generator 11A in the OFDM transmitter pertaining to Embodiment 2. As shown, the P1 symbol generator 11A includes a first P1 symbol generator 100, which generates a first P1 symbol by performing the process described for Embodiment 1, and a second P1 symbol generator 200A. The second P1 symbol generator 200A generates a second P1 symbol for output, and differs from the second P1 symbol generator 200 of Embodiment 1 in the guard interval insertion method employed. The second P1 symbol generator 200A is described below.

(Second P1 Symbol Generator)

Figure 21:
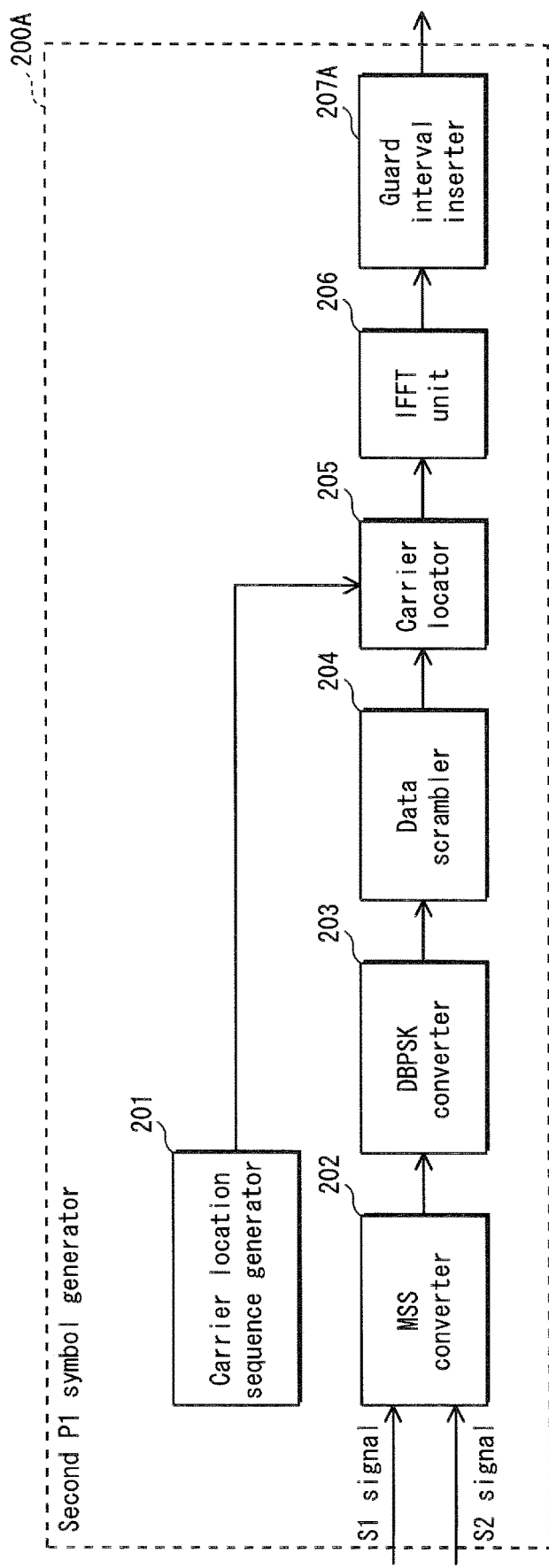
FIG. 21 is a block diagram showing the configuration of a second P1 symbol generator 200A from FIG. 20.

FIG. 21 is a block diagram showing the configuration of the second P1 symbol generator 200A from FIG. 20. In the second P1 symbol generator 200A, the guard interval inserter 207 of the second P1 symbol generator 200 has been replaced with a guard interval inserter 207A.

The guard interval inserter 207A inserts a leading guard interval and a trailing guard interval, which are time-domain signals, into the signal output by the IFFT unit 206 (the useful symbol in the time domain), thus generating the second P1 symbol.

Figure 22:
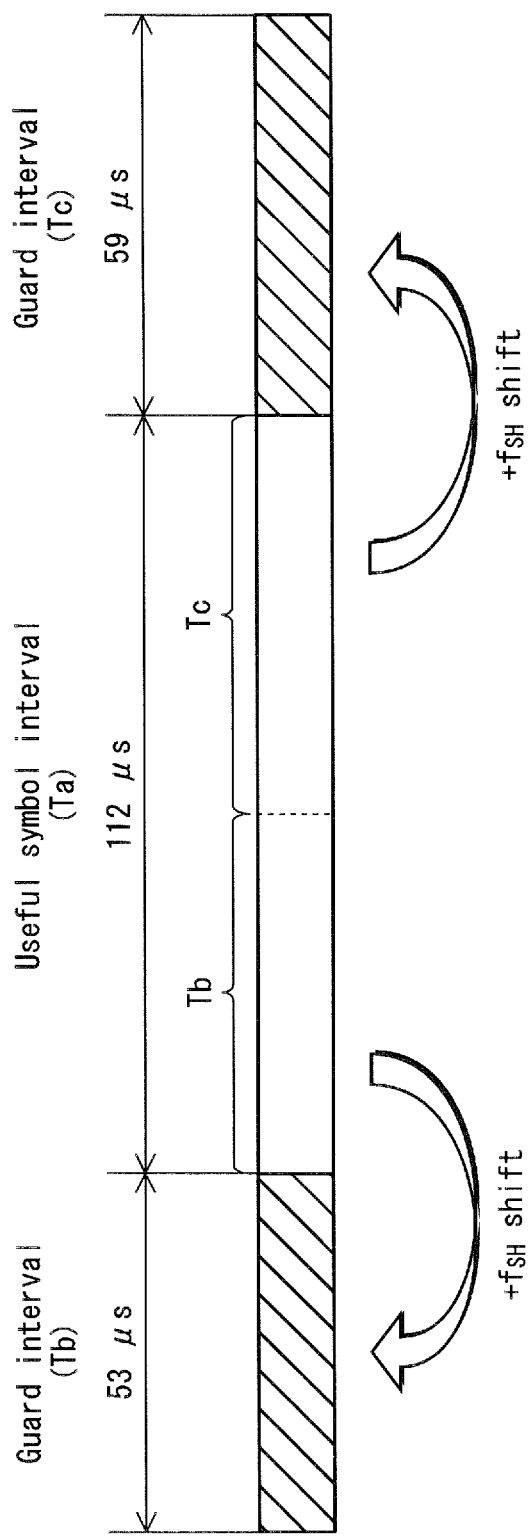
FIG. 22 is a schematic diagram illustrating the second P1 symbol with guard intervals inserted by a guard interval inserter 207A (time domain shown).

FIG. 22 is a schematic diagram illustrating the second P1 symbol with guard intervals inserted by the guard interval inserter 207A (time domain shown). As shown, the guard interval inserter 207A generates the leading guard interval by frequency-shifting the leading portion (Tb=53 μs) of the useful symbol (Ta=112 μs) by +$f_{SH}$. The guard interval inserter 207 then inserts the leading guard interval so generated at the head of the useful symbol. The above are all time-domain signals. Similarly, the guard interval inserter 207A generates the trailing guard interval by frequency-shifting the trailing portion (Tc=59 μs) of the useful symbol by +$f_{SH}$. The guard interval inserter 207A then inserts the trailing guard interval so generated at the tail of the useful symbol. The above are all time-domain signals. This process is expressed in the below-inscribed Math. 4.

$$p1_{2nd}(t') = \begin{cases} p1_{2nd\ A}(t')e^{j2\pi f_{SH}t'} & 0 \leq t' < 482T \\ p1_{2nd\ A}(t' - 482T) & 482T \leq t' < 1506T \\ p1_{2nd\ A}(t' - 1024T)e^{j2\pi f_{SH}t'} & 1506T \leq t' < 2048T \\ 0 & \text{otherwise} \end{cases} \quad \text{(Math. 4)}$$

where $p1_{2nd}(t')$ is the second P1 symbol, $p1_{2ndA}(t')$ is the useful symbol, +$f_{SH}$ is the frequency shift, T is the time of one sample, post-IFFT, t' is time, and the start time of the second P1 symbol is 0. In the DVB-T2 broadcasting system, for a bandwidth of 8 MHz, T=7/64 μs and the useful symbol length is 1024T=112 μs. As shown in FIGS. 6 and 22, the lengths of the guard intervals of the second P1 symbol are the opposite of those of the first P1 symbol (such that the leading guard interval is of length Tb and the trailing guard interval is of length Tc). However, no restriction is intended on this point.

As described above, the leading guard interval and the trailing guard interval of the first and second P1 symbols are time-domain signals obtained by frequency-shifting a given portion of the useful symbol in the time domain by +$f_{SH}$ (≠0), the same frequency shift being used in all cases (see FIGS. 6 and 22). In addition, the leading part of the useful symbol within the time domain is used to generate the leading guard interval for both the first P1 symbol and the second P1 symbol, and the trailing part of the useful symbol in the time domain is used to generate the trailing guard interval (see FIGS. 6 and 22).

However, the span of the useful symbol used to generate the time-domain leading guard interval of the first P1 symbol has length Tc (=59 μs) (see FIG. 6), while the span of the useful symbol used to generate the time-domain leading guard interval of the second P1 symbol has length Tb (=53 μs) (see FIG. 22). The useful symbol spans so used thus differ in length. Similarly, the span of the useful symbol used to generate the time-domain trailing guard interval of the first P1 symbol has a length Tb (=53 μs) (see FIG. 6), while the span of the useful symbol used to generate the time-domain trailing guard interval of the second P1 symbol has a length Tc (=59 μs) (see FIG. 22). The useful symbol spans so used thus differ in length.

(OFDM Receiver)

The OFDM receiver of the present Embodiment includes a P1 symbol demodulator 26A that differs from the P1 symbol demodulator 26 of Embodiment 1. The P1 symbol demodulator 26A is described below.

(P1 Symbol Demodulator)

Figure 23:
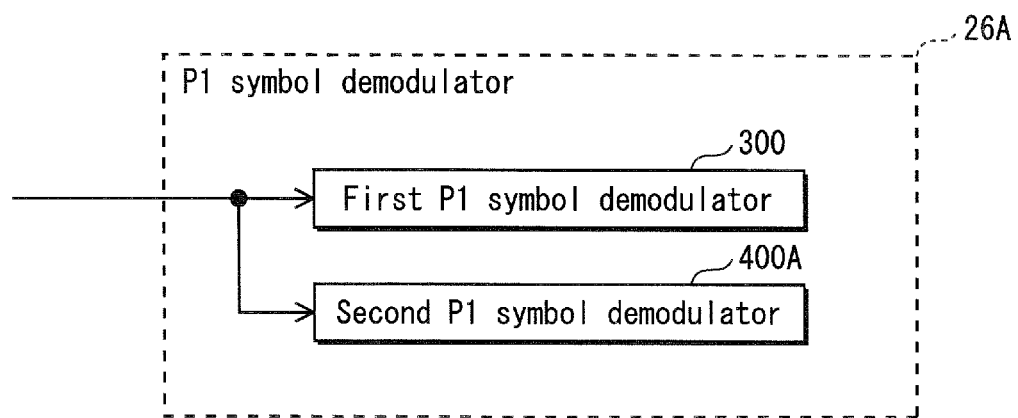
FIG. 23 is a block diagram showing the configuration of a P1 symbol demodulator 26A in the OFDM receiver pertaining to Embodiment 2 of the present invention.

FIG. 23 is a block diagram showing the configuration of the P1 symbol demodulator 26A in the OFDM receiver pertaining to Embodiment 2. The P1 symbol demodulator 26A includes a first P1 symbol demodulator 300, which performs the same process previously described for Embodiment 1, and a second P1 symbol demodulator 400A. The second P1 symbol demodulator 400A demodulates the second P1 symbol and is configured differently than the second P1 symbol demodulator 400 used in Embodiment 1. The second P1 symbol demodulator 400A is described below.

(Second P1 Symbol Demodulator)

Figure 24:
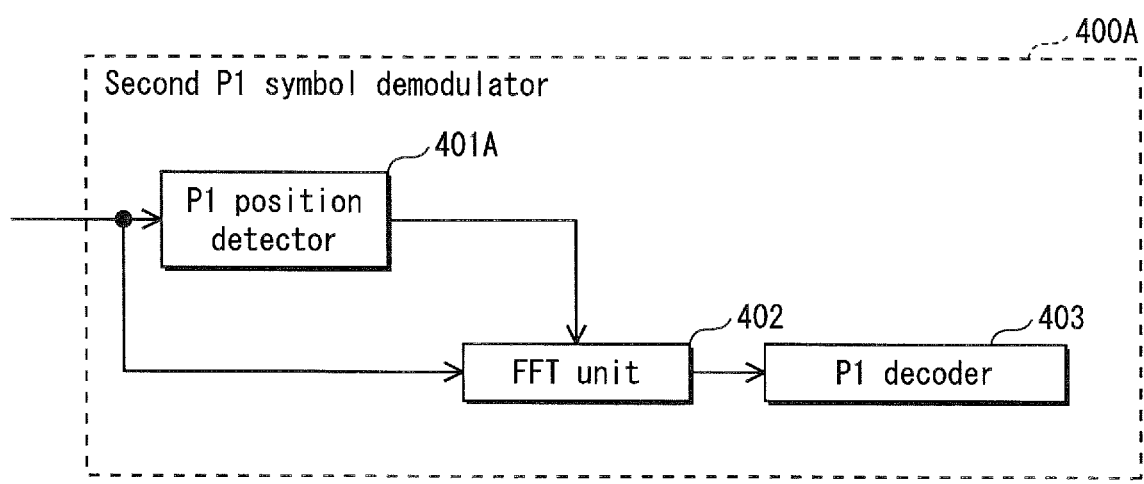
FIG. 24 is a block diagram showing the configuration of a second P1 symbol demodulator 400A from FIG. 23.

FIG. 24 is a block diagram showing the configuration of the second P1 symbol demodulator 400A shown in FIG. 23. The second P1 symbol demodulator 400A includes a P1 position detector 401A, an FFT unit 402, and a P1 decoder 403.

Figure 25:
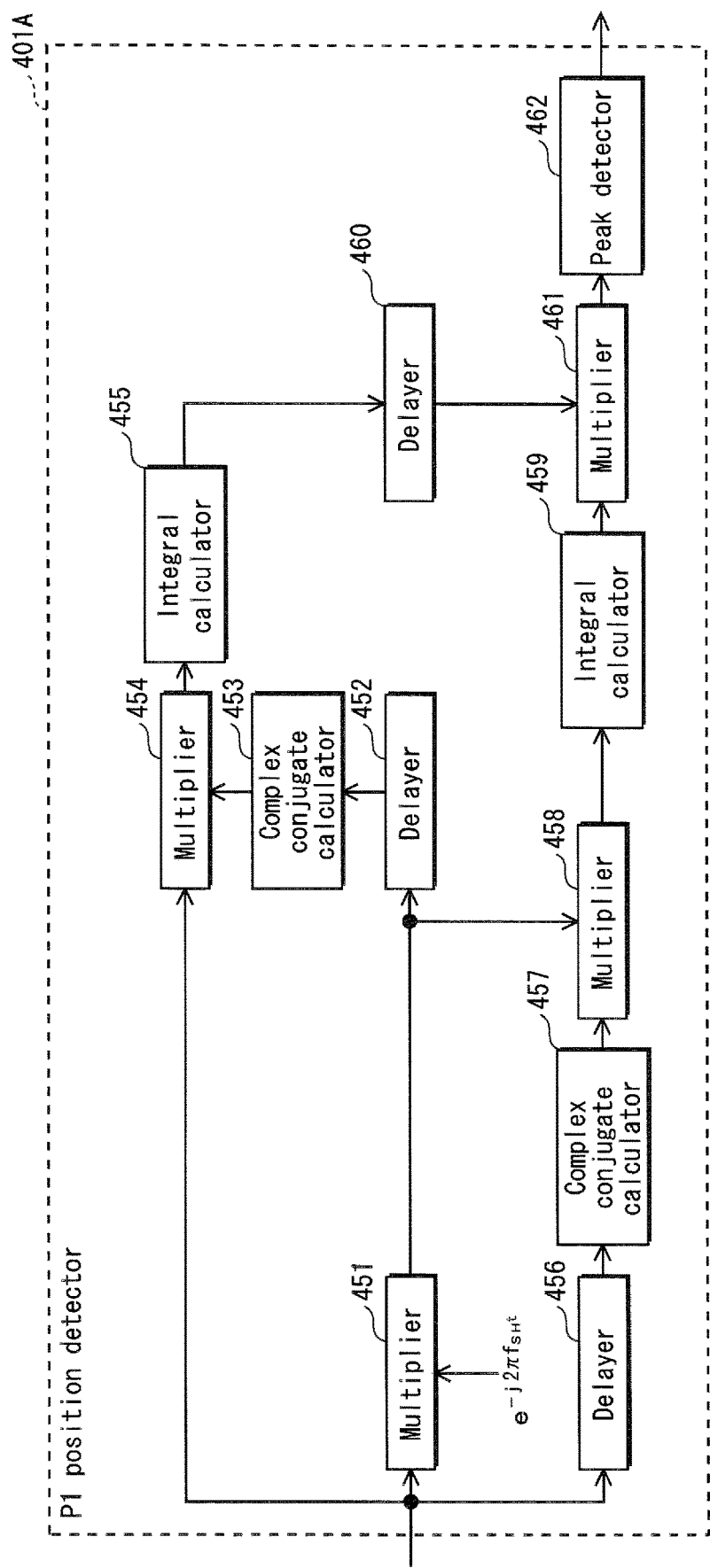
FIG. 25 is a block diagram showing the configuration of a P1 position detector 401A from FIG. 24.

The P1 position detector 401A detects the position of the second P1 symbol in the time-domain signal input thereto (i.e., in the signal input to the second P1 symbol demodulator 400A) and outputs the second P1 symbol position information so obtained to the FFT unit 402. FIG. 25 shows the structure of the P1 position detector 401A.

The P1 position detector 401A includes a multiplier 451, a delayer 452, a complex conjugate calculator 453, a multiplier 454, an integral calculator 455, a delayer 456, a complex conjugate calculator 457, a multiplier 458, an integral calculator 459, a delayer 460, a multiplier 461, and a peak detector 462.

Figure 26A:
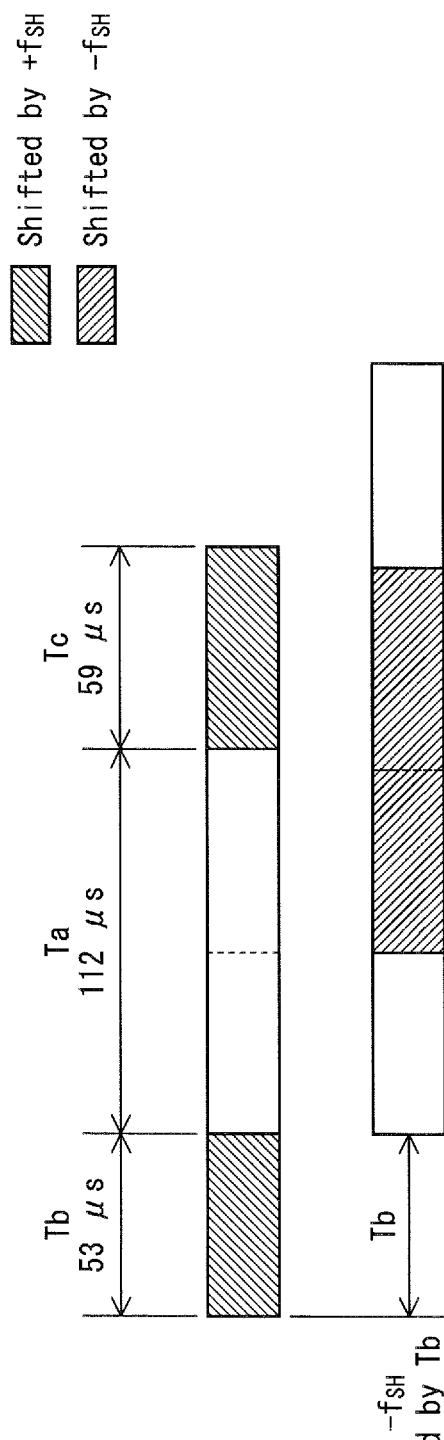
FIGS. 26A, 26B, and 26C are schematic diagrams illustrating correlations taken in the leading portion of the second P1 symbol by the P1 position detector 401A from FIG. 25.
Figure 26B:
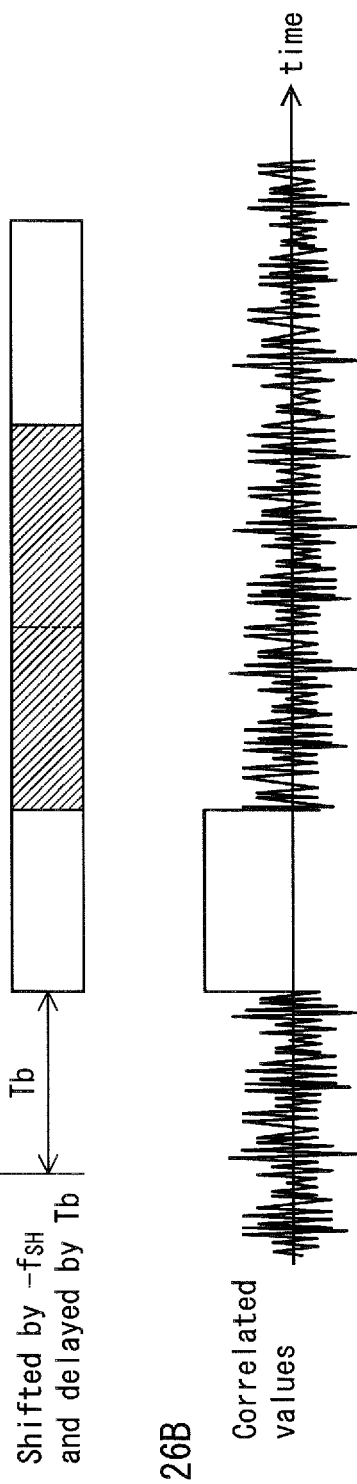
Figure 26C:
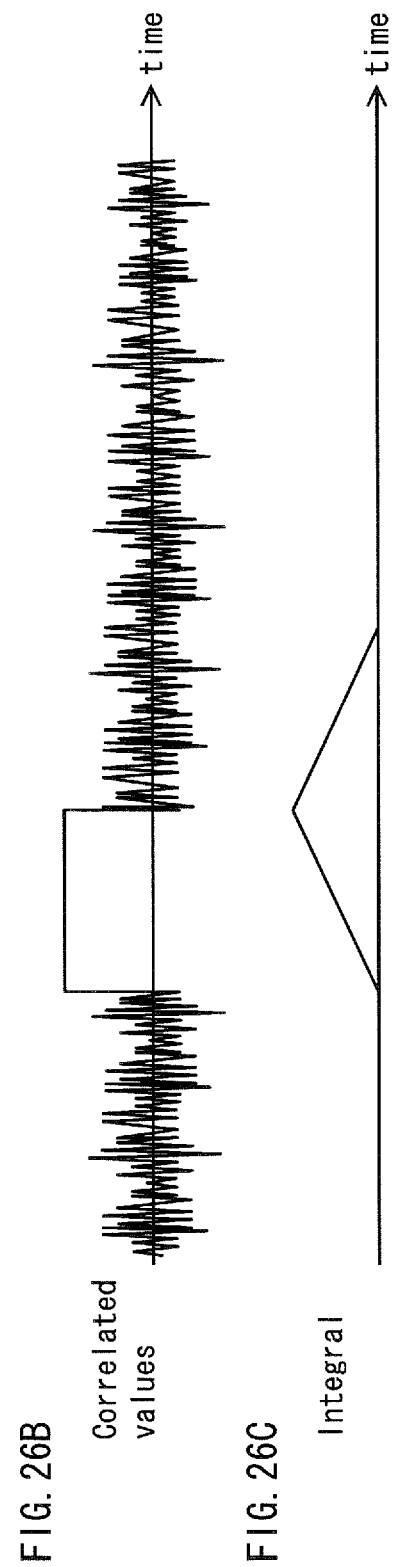

The P1 position detector 401A input signal is input to the multiplier 451. The multiplier 451 multiplies the P1 position detector 401A input signal by exp(−j2π$f_{SH}$t) in order to apply a frequency shift that is the inverse of the +$f_{SH}$ frequency shift applied by the transmitter to the time-domain signals of the leading and trailing guard intervals of the second P1 symbol (applying a frequency shift of −$f_{SH}$). The multiplier 451 then outputs the result to the delayer 452 and to the multiplier 458. The multiplier 451 handles the input signal in a different manner than the multiplier 411 of the second P1 symbol demodulator 400 of Embodiment 1 (see FIG. 15) in applying the same frequency shift as the multiplier 311 of the first P1 symbol demodulator 300 (see FIG. 13). The delayer 452 delays the signal output by the multiplier 451 by a span equivalent to the length of the second P1 symbol leading guard interval (Tb=53 μs), then outputs the delayed signal to the complex conjugate calculator 453. The delay Tb (=53 μs) applied by the delayer 452 differs from the delay Tc (=59 μs) applied by the delayer 312 of the P1 position detector 301 in the first P1 symbol demodulator 300 and from the delay Tc (=59 μs) applied by the delayer 412 of the P1 position detector 401 of the second P1 symbol demodulator 400. The complex conjugate calculator 453 calculates the complex conjugate of the signal output by the delayer 452 and outputs the resulting complex conjugate signal to the multiplier 454. The multiplier 454 calculates a correlation by multiplying the P1 position detector 401A input signal and the complex conjugate calculator 453 output signal, then outputs the correlated value so calculated to the integral calculator 455. The integral calculator 415 integrates the output signal from the multiplier 414 over the length Tb of the leading guard interval of the second P1 symbol, and then outputs the result to the delayer 460. FIGS. 26A through 26C are schematic diagrams illustrating this signal processing. As shown in FIG. 26A, the leading guard interval obtained by frequency shifting the P1 position detector 401A input signal by $-f_{SH}$ and then delaying the result by the length Tb of the leading guard interval (shown in the lower portion of FIG. 26A) is identical to the leading part of the useful symbol within the P1 position detector 401A (shown in the upper portion of FIG. 26A). The correlation appears in this part, as shown in FIG. 26B. Given that other parts of the signals are not identical, no correlation appears therein. The peak shown in FIG. 26C is the effect of integrating the correlated value shown in FIG. 26B over the length Tb of the leading guard interval.

Meanwhile, the P1 position detector 401A input signal is input to the delayer 456. The delayer 456 delays the P1 position detector 401A input signal by a span equivalent to the length of the second P1 symbol trailing guard interval (Tc=59 μs), then outputs the delayed signal to the complex conjugate calculator 457. The delay Tc (=59 μs) applied by the delayer 456 differs from the delay Tb (=53 μs) applied by the delayer 316 of the P1 position detector 301 in the first P1 symbol demodulator 300 and from the delay Tb (=53 μs) applied by the delayer 426 of the P1 position detector 401 of the second P1 symbol demodulator 400. The complex conjugate calculator 457 calculates the complex conjugate of the signal output by the delayer 456 and outputs the resulting complex conjugate signal to the multiplier 458. The signal input to the multiplier 458 is the result of the multiplier 451 multiplying the P1 position detector 401A input signal by $\exp(-j2\pi f_{SH}t)$. The multiplier 458 calculates a correlation by multiplying the signal output by the multiplier 451 (the P1 position detector 401A input signal with a frequency shift of $-f_{SH}$ applied thereto) and the complex conjugate calculator 457 output signal, then outputs the correlated value so calculated to the integral calculator 459. The integral calculator 459 integrates the output signal from the multiplier 458 over the length Tc of the trailing guard interval of the second P1 symbol, and then outputs the result to the multiplier 461. FIGS. 27A through 27C are schematic diagrams illustrating this signal processing. As shown in FIG. 27A, the trailing guard interval obtained by frequency shifting the P1 position detector 401A input signal by $-f_{SH}$ (shown in the upper portion of FIG. 27A) is identical to the trailing part of the useful symbol delayed by the length Tc of the trailing guard interval within the P1 position detector 401A (shown in the lower portion of FIG. 27A). The correlation appears in this part, as shown in FIG. 27B. Given that other parts of the signals are not identical, no correlation appears therein. The peak shown in FIG. 27C is the effect of integrating the correlated value shown in FIG. 27B over the length Tc of the trailing guard interval.

The signal output from the integral calculator 455 is input to the delayer 460. The delayer 460 delays the signal output from the integral calculator 455 to match the signal output from the integral calculator 459 for output to the multiplier 461. The delayer 460 applies a delay of 2×Tc. The multiplier 461 multiplies the signal output from the integral calculator 459 by the signal output from the delayer 460, and then outputs the product to the peak detector 462. Thus, the peaks are made more prominent by matching the peaks in the correlated value integral taken for the leading guard interval to the peaks in the correlated value integral taken for the trailing guard interval. The peak detector 462 detects the position of the second P1 symbol within the P1 position detector 401A input signal (i.e., the signal input to the second P1 symbol demodulator 401A) by detecting the peak position in the signal output from the multiplier 461. The peak detector 422 then accordingly outputs position information for the second P1 symbol to the FFT unit 402 shown in FIG. 24. Given the presence of a delayed wave, a peak correlation appears in correspondence to the level and position of the delay.

(P1 Position Detector of First P1 Symbol Demodulator Operations on Second P1 Symbol)

FIGS. 28A through 28C are schematic diagrams showing a correlation of the leading portion of the second P1 symbol taken by the P1 position detector 301 of the first P1 symbol demodulator 300 (see FIG. 13).

In the second P1 symbol as transmitted, the leading and trailing guard interval signals are portions of the useful symbol with a frequency shift of $+f_{SH}$ applied thereto. The leading guard interval has length Tb (=53 μs) and the trailing guard interval has length Tc (=59 μs) (see FIG. 22). As such, in the P1 position detector 301 of the first P1 symbol demodulator 300, the leading guard interval obtained from the input signal frequency-shifted by $-f_{SH}$ and delayed by the length Tc (=59 μs) of the leading guard interval of the first P1 symbol (the lower portion of FIG. 28A) comes to have a frequency shift of 0 and thus matches the leading portion of the useful symbol of the P1 position detector 301 input signal (the upper portion of FIG. 28A). However, as shown in FIG. 28B, no correlation appears because the two signals are not input to the multiplier 314 at the same time. Similarly, the trailing portion of the useful symbol shown in the lower portion of FIG. 28A is input to the multiplier 314 at the same time as the trailing guard interval shown in the upper portion of FIG. 28A. However, as shown in FIG. 28B, no correlation appears due to the different frequency shifts applied. Therefore, as shown in FIG. 28C, no prominent peaks appear in the correlated values shown in FIG. 28B when integrated over the length of the leading guard interval Tc of the first P1 symbol.

FIGS. 29A through 29C are schematic diagrams showing a correlation of the trailing portion of the second P1 symbol taken by the P1 position detector 301 of the first P1 symbol demodulator 300.

In the second P1 symbol as transmitted, the leading and trailing guard interval signals are portions of the useful symbol with a frequency shift of $+f_{SH}$ applied thereto. The leading guard interval has length Tb (=53 μs) and the trailing guard interval has length Tc (=59 μs) (see FIG. 22). As such, in the P1 position detector 301 of the first P1 symbol demodulator 300, the trailing guard interval obtained from the input signal frequency-shifted by $-f_{SH}$ (the upper portion of FIG. 29A) comes to have a frequency shift of 0 and thus matches the trailing portion of the useful symbol of the P1 position detector 301 input signal delayed by the length Tb (=53 μs) of the trailing guard interval of the first P1 symbol (the lower portion of FIG. 29A). However, as shown in FIG. 29B, the correlation is not significant because the two signals are not input to the multiplier 318 at the same time. Similarly, the leading portion of the useful symbol shown in the upper portion of FIG. 29A is input to the multiplier 318 at the same time as the leading guard interval shown in the lower portion of FIG. 29A. However, different frequency shifts are applied. Therefore, as shown in FIG. 29B, no correlation appears. For this reason, as shown in FIG. 29C, no prominent peaks appear in the correlated values shown in FIG. 29B when integrated over the length of the trailing guard interval Tb of the first P1 symbol.

As described above, the first P1 symbol demodulator 300 does not produce peaks in the second P1 symbol, being able to detect the first P1 symbol only. Similarly, the second P1 symbol demodulator 400A does not produce peaks in the first P1 symbol, being able to detect the second P1 symbol only.

(Effects)

According to Embodiment 2 as described above, the transmitter generates leading and trailing guard interval signals such that the first P1 symbol has a leading guard interval of length Tc and a trailing guard interval of length Tb (see FIG. 6). In contrast, the second P1 symbol has a leading guard interval of length Tb and a trailing guard interval of length Tc (see FIG. 22). As such, the differing lengths of the guard intervals in the first and second P1 symbols are employed in the structure of the first and second P1 symbols so that the receiver can easily distinguish whether or not the second P1 symbol is a delayed wave of the first P1 symbol, thereby enabling secure reception. In addition, when two P1 symbols are used for the FEF part (i.e., the first P1 symbol and the second P1 symbol), the first P1 symbol is made the leading symbol of the FEF part. Thus, a DVB-T2 receiver equipped only with a demodulator for demodulating the first P1 symbol is unaffected by the second P1 symbol. This ensures compatibility with existing DVB-T2 receivers.

Embodiment 3

An OFDM transmitter and an OFDM receiver pertaining to Embodiment 3 of the present invention are described below with reference to the drawings. In the present Embodiment, components having a structure substantially similar to their counterparts in Embodiments 1 and 2 use the same reference signs thereas. Explanations of such components are hereinafter simplified or omitted where appropriate.

(OFDM Transmitter)

The OFDM transmitter of the present Embodiment includes a P1 symbol generator 11B that differs from the P1 symbol generator 11 of Embodiment 1. The P1 symbol generator 11B is described below.

(P1 Symbol Generator)

Figure 30:
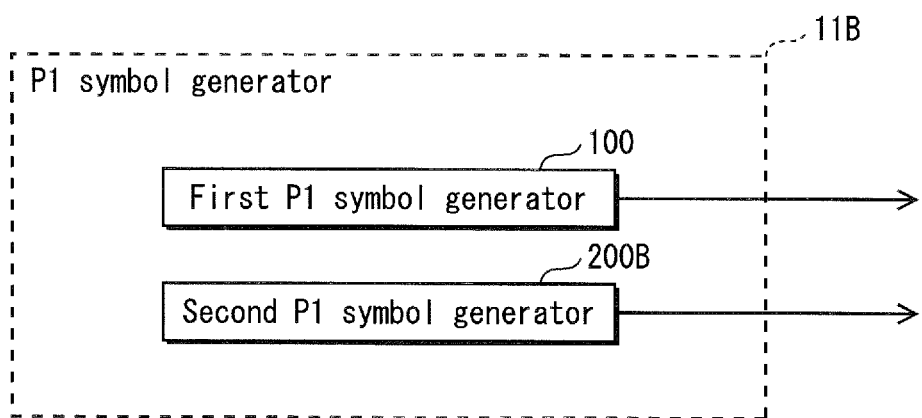
FIG. 30 is a block diagram showing the configuration of a P1 symbol generator 11B in the OFDM transmitter pertaining to Embodiment 3 of the present invention.

FIG. 30 is a block diagram showing the configuration of the P1 symbol generator 11B in the OFDM transmitter pertaining to Embodiment 3. As shown, the P1 symbol generator 11B includes a first P1 symbol generator 100, which generates a first P1 symbol by performing the process described for Embodiment 1, and a second P1 symbol generator 200B. The second P1 symbol generator 200B generates a second P1 symbol for output, and differs from the second P1 symbol generators 200 and 200A of Embodiments 1 and 2 in the guard interval insertion method employed. The second P1 symbol demodulator 200B is described below.

(Second P1 Symbol Generator)

Figure 31:
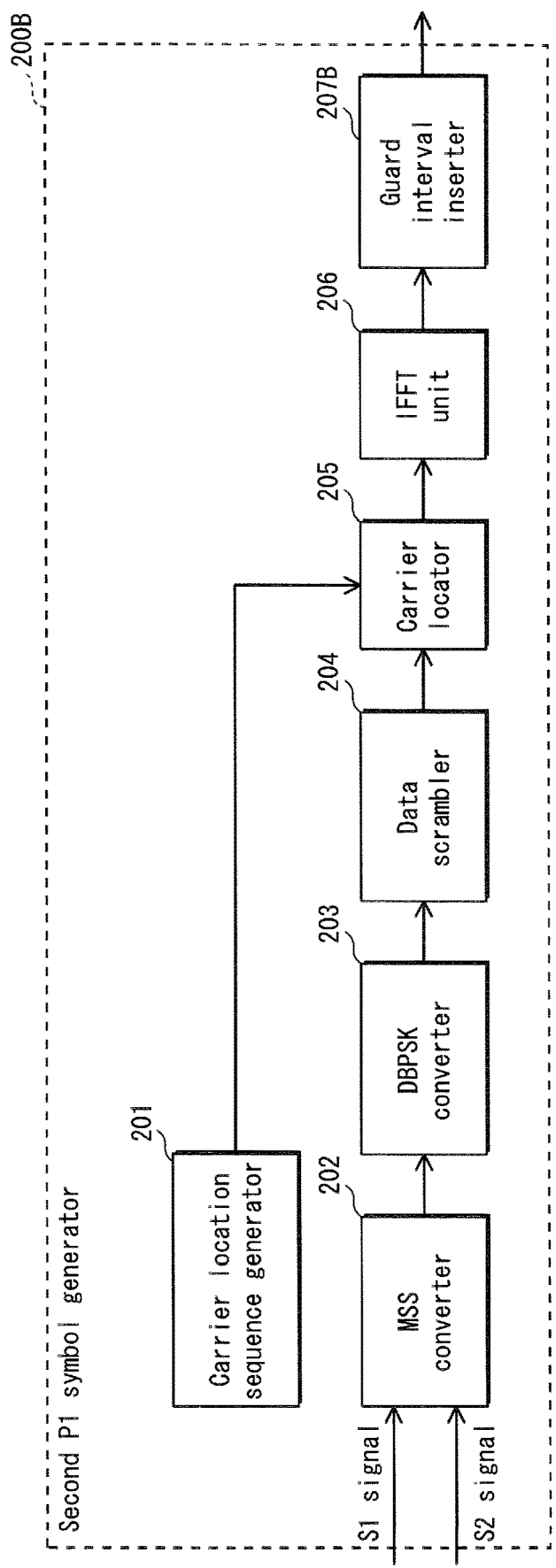
FIG. 31 is a block diagram showing the configuration of a second P1 symbol generator 200B from FIG. 30.

FIG. 31 is a block diagram showing the configuration of the second P1 symbol generator 200B from FIG. 30. In the second P1 symbol generator 200B, the guard interval inserter 207 of the second P1 symbol generator 200 has been replaced with a guard interval inserter 207B.

The guard interval inserter 207B inserts a leading guard interval and a trailing guard interval, which are time-domain signals, into the signal output by the IFFT unit 206 (signal with a useful symbol in the time domain), thus generating the second P1 symbol.

Figure 32:
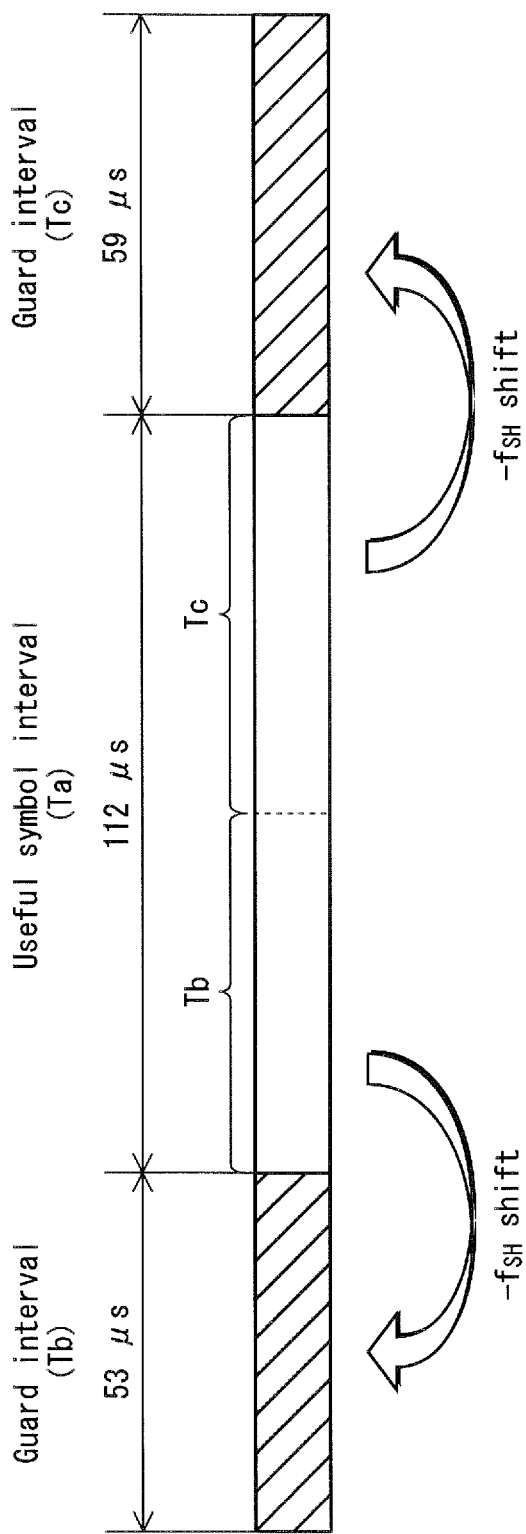
FIG. 32 is a schematic diagram illustrating a second P1 symbol with guard intervals inserted by a guard interval inserter 207B (time domain shown).

FIG. 32 is a schematic diagram illustrating the second P1 symbol with guard intervals inserted by the guard interval inserter 207B (time domain shown). As shown, the guard interval inserter 207B generates the leading guard interval by frequency-shifting the leading portion (Tb=53 µs) of the useful symbol (Ta=112 µs) by $-f_{SH}$. The guard interval inserter 207 then inserts the leading guard interval so generated at the head of the useful symbol. The above are all time-domain signals. As similarly shown, the guard interval inserter 207B generates the trailing guard interval by frequency-shifting the trailing portion (Tc=59 µs) of the useful symbol (Ta=112 µs) by $-f_{SH}$, and then inserting the trailing guard interval so generated at the tail of the useful symbol. The above are all time-domain signals.

As described above, for both the first P1 symbol and the second P1 symbol, the leading part of the useful symbol in the time domain is used to generate the leading guard interval, while the trailing part of the useful symbol in the time domain is used to generate the trailing guard interval (see FIGS. 6 and 32).

However, the leading guard interval and the trailing guard interval of the first P1 symbol are time-domain signals obtained by frequency-shifting a given portion of the useful symbol in the time domain by $+f_{SH}$ ($\neq 0$) (see FIG. 6). In contrast, the leading guard interval and the trailing guard interval of the second P1 symbol are time-domain signals obtained by frequency-shifting a given portion of the useful symbol in the time domain by $-f_{SH}$ (equal in absolute value but opposite in sign to $+f_{SH}$) (see FIG. 32). Thus, the first and second P1 symbols differ in terms of the frequency shift applied to the useful symbol in the time domain in order to generate the guard intervals.

Furthermore, the span of the useful symbol used to generate the time-domain leading guard interval of the first P1 symbol has length Tc (=59 µs) (see FIG. 6), while the span of the useful symbol used to generate the time-domain leading guard interval of the second P1 symbol has length Tb (=53 µs) (see FIG. 32). The useful symbol spans so used thus differ in length. Similarly, the span of the useful symbol used to generate the time-domain trailing guard interval of the first P1 symbol has length Tb (=53 µs) (see FIG. 6), while the span of the useful symbol used to generate the time-domain trailing guard interval of the second P1 symbol has length Tc (=59 µs) (see FIG. 32). The useful symbol spans so used thus differ in length.

(OFDM Receiver)

The OFDM receiver of the present Embodiment includes a P1 symbol demodulator 26B that differs from the P1 symbol demodulator 26 of Embodiment 1. The P1 symbol demodulator 26B is described below.

(P1 Symbol Demodulator)

Figure 33:
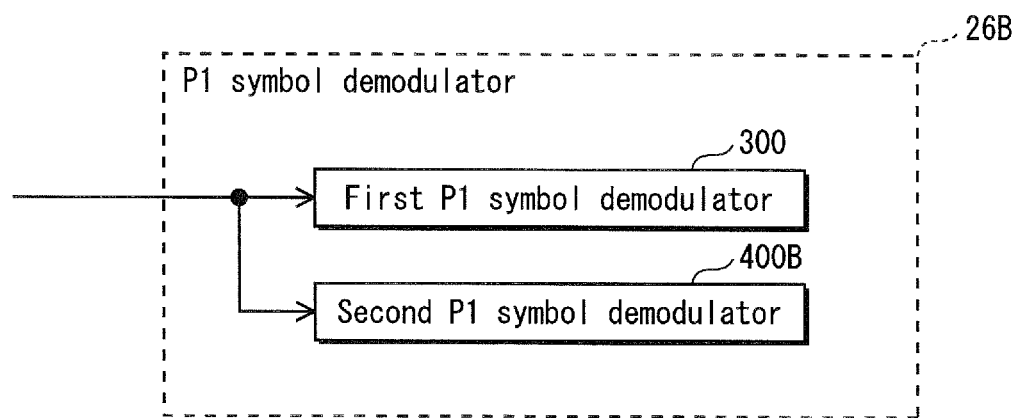
FIG. 33 is a block diagram showing the configuration of a P1 symbol demodulator 26B in the OFDM receiver pertaining to Embodiment 3 of the present invention.

FIG. 33 is a block diagram showing the configuration of the P1 symbol demodulator 26B in the OFDM receiver pertaining to Embodiment 3. The P1 symbol demodulator 26B includes a first P1 symbol demodulator 300, which performs the same process previously described for Embodiment 1, and a second P1 symbol demodulator 400B. The second P1 symbol demodulator 400B demodulates the second P1 symbol and is configured differently than the second P1 symbol demodulators 400 and 400A used in Embodiments 1 and 2. The second P1 symbol demodulator 400B is described below.

(Second P1 Symbol Demodulator)

Figure 34:
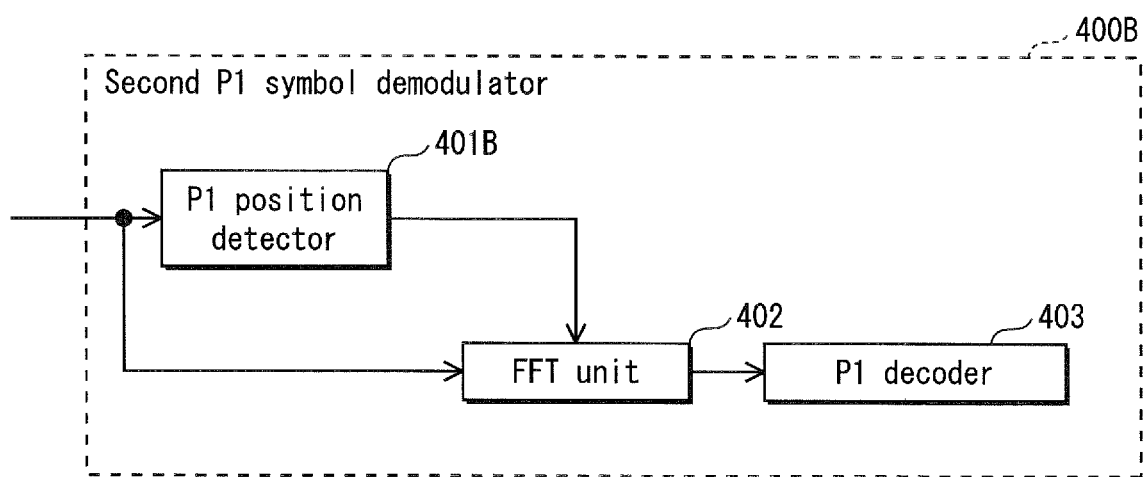
FIG. 34 is a block diagram showing the configuration of a second P1 symbol demodulator 400B from FIG. 33.

FIG. 34 is a block diagram showing the configuration of the second P1 symbol demodulator 400B shown in FIG. 33. The second P1 symbol demodulator 400B includes a P1 position detector 401B, an FFT unit 402, and a P1 decoder 403.

Figure 35:
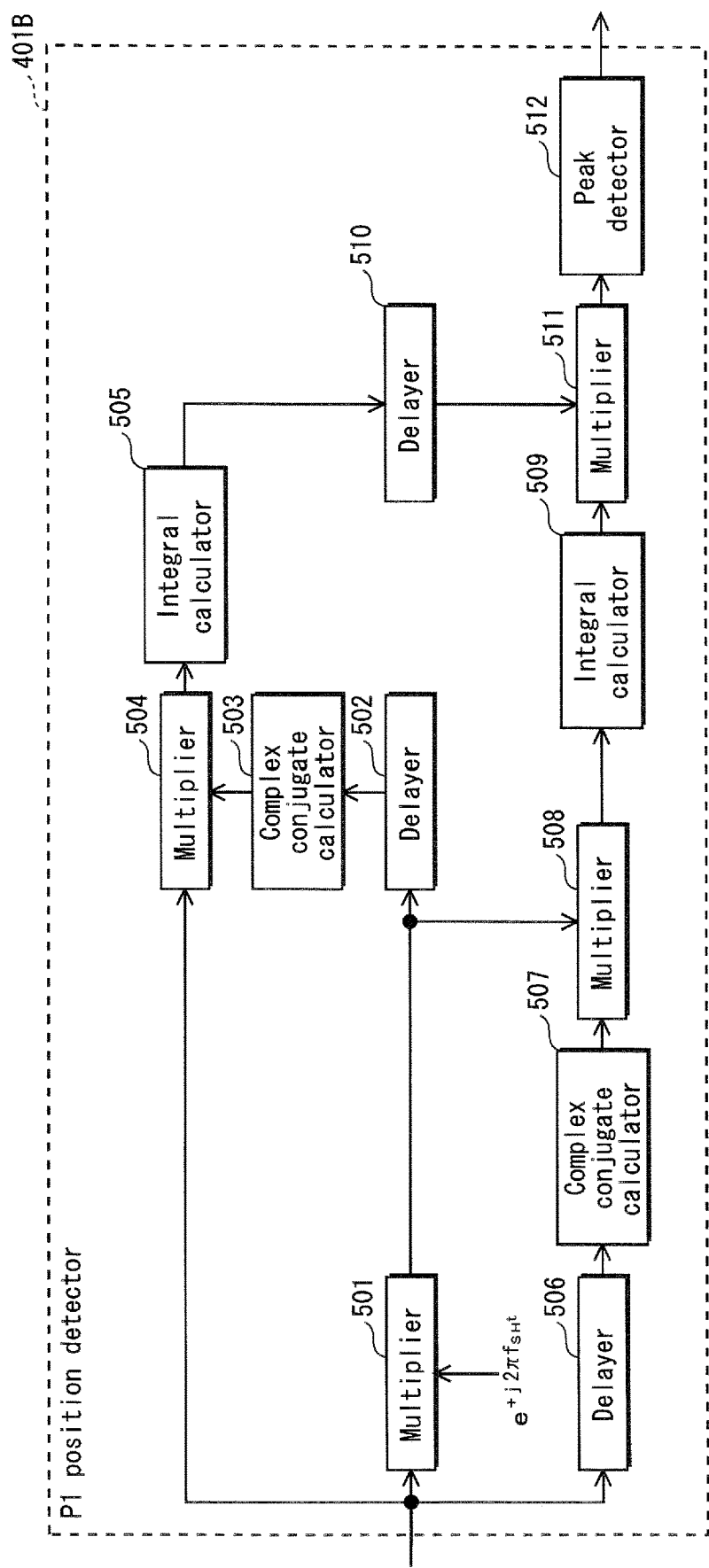
FIG. 35 is a block diagram showing the configuration of a P1 position detector 401B from FIG. 34.

The P1 position detector 401B detects the position of the second P1 symbol in the time-domain signal input thereto (i.e., in the signal input to the second P1 symbol demodulator 400B) and outputs the second P1 symbol position information so obtained to the FFT unit 402. FIG. 35 shows the structure of the P1 position detector 401B.

The P1 position detector 401B includes a multiplier 501, a delayer 502, a complex conjugate calculator 503, a multiplier 504, an integral calculator 505, a delayer 506, a complex conjugate calculator 507, a multiplier 508, an integral calculator 509, a delayer 510, a multiplier 511, and a peak detector 512.

The P1 position detector 401B input signal is input to the multiplier 501. The multiplier 501 multiplies the P1 position detector 401B input signal by $\exp(+j2\pi f_{SH}t)$ in order to apply a frequency shift that is the inverse of the $-f_{SH}$ frequency shift applied by the transmitter to the time-domain signals of the leading and trailing guard intervals of the second P1 symbol (applying a frequency shift of $+f_{SH}$). The multiplier 501 then outputs the result to the delayer 502 and to the multiplier 508. The multiplier 501 applies a different frequency shift to the input signal than the multiplier 311 of the first P1 symbol demodulator 300 (see FIG. 13). The delayer 502 delays the signal output by the multiplier 501 by a span equivalent to the length of the second P1 symbol leading guard interval (Tb=53 μs), then outputs the delayed signal to the complex conjugate calculator 503. The delay Tb (=53 μs) applied by the delayer 502 differs from the delay Tc (=59 μs) applied by the delayer 312 of the P1 position detector 301 in the first P1 symbol demodulator 300. The complex conjugate calculator 503 calculates the complex conjugate of the signal output by the delayer 502 and outputs the resulting complex conjugate signal to the multiplier 504. The multiplier 504 calculates a correlation by multiplying the P1 position detector 401B input signal and the complex conjugate calculator 503 output signal, then outputs the correlated value so calculated to the integral calculator 505. The integral calculator 505 integrates the output signal from the multiplier 504 over the length Tb of the leading guard interval of the second P1 symbol, and then outputs the result to the delayer 510.

Meanwhile, the P1 position detector 401B input signal is input to the delayer 506. The delayer 506 delays the P1 position detector 401B input signal by a span equivalent to the length of the second P1 symbol trailing guard interval (Tc=59 μs), then outputs the delayed signal to the complex conjugate calculator 507. The delay Tc (=59 μs) applied by the delayer 506 differs from the delay Tb (=53 μs) applied by the delayer 316 of the P1 position detector 301 in the first P1 symbol demodulator 300. The complex conjugate calculator 507 calculates the complex conjugate of the signal output by the delayer 506 and outputs the resulting complex conjugate signal to the multiplier 508. The signal input to the multiplier 508 is the result of the multiplier 501 multiplying the P1 position detector 401B input signal by $\exp(+j2\pi f_{SH}t)$. The multiplier 508 calculates a correlation by multiplying the signal output by the multiplier 501 (the P1 position detector 401B input signal with a frequency shift of $+f_{SH}$ applied thereto) and the complex conjugate calculator 507 output signal, then outputs the correlated value so calculated to the integral calculator 509. The integral calculator 509 integrates the output signal from the multiplier 508 over the length Tc of the trailing guard interval of the second P1 symbol, and then outputs the result to the multiplier 511.

The signal output from the integral calculator 505 is input to the delayer 510. The delayer 510 delays the signal output from the integral calculator 505 to match the signal output from the integral calculator 509 for output to the multiplier 511. The delayer 510 applies a delay of 2×Tc. The multiplier 511 multiplies the signal output from the integral calculator 519 by the signal output from the delayer 510, and then outputs the product to the peak detector 512. Thus, the peaks are made more prominent by matching the peaks in the correlated value integral taken for the leading guard interval to the peaks in the correlated value integral taken for the trailing guard interval. The peak detector 512 detects the position of the second P1 symbol within the P1 position detector 401B input signal (i.e., the signal input to the second P1 symbol demodulator 401B) by detecting the peak position in the signal output from the multiplier 511. The peak detector 512 then accordingly outputs position information for the second P1 symbol to the FFT unit 402 shown in FIG. 34. Given the presence of a delayed wave, a peak correlation appears in correspondence to the level and position of the delay.

(Effects)

According to Embodiment 3 as described above, the same results can be obtained as for Embodiments 1 and 2. In this Embodiment, if, for example, the process performed on the second P1 symbol by the P1 position detector 301 of the first P1 symbol demodulator 300 produces mistaken results in the correlation or integral calculated by components from the multiplier 311 through the integral calculator 315 generating peaks in the trailing portion of the guard interval, or if mistaken results in the correlation or integral calculated by components from the multiplier 311 and the delayer 316 through the integral calculator 319 mistakenly generate peaks in the leading portion of the guard interval, the peaks will be eliminated through the multiplication performed by the multiplier 321. Thus, the second P1 symbol position is not incorrectly detected as the first P1 symbol position. Similarly, the P1 position detector 401B of the second P1 symbol demodulator 400B does not incorrectly detect the first P1 symbol position as the second P1 symbol position.

A variation of Embodiment 3 in which, for the first P1 symbol, the leading guard interval may have length Tc1 and the trailing guard interval may have length Tb1, while for the second P1 symbol, the leading guard interval may have length Tc2 and the trailing guard interval may have length Tb2, such that the values of Tc1, Tb1, Tc2, and Tb2 are distinct, is also possible. In such a case, the process performed on the second P1 symbol by the P1 position detector 301 of the first P1 symbol demodulator 300 produces no peaks. Similarly, the process performed on the first P1 symbol by the P1 position detector 401B of the second P1 symbol demodulator 400B also produces no peaks.

Embodiment 4

An OFDM transmitter and an OFDM receiver pertaining to Embodiment 4 of the present invention are described below with reference to the drawings. In the present Embodiment, components having a structure substantially similar to their counterparts in Embodiments 1 through 3 use the same reference signs thereas. Explanations of such components are hereinafter simplified or omitted where appropriate.

(OFDM Transmitter)

The OFDM transmitter of the present Embodiment includes a P1 symbol generator 11C that differs from the P1 symbol generator 11 of Embodiment 1. The P1 symbol generator 11C is described below.

(P1 Symbol Generator)

Figure 36:
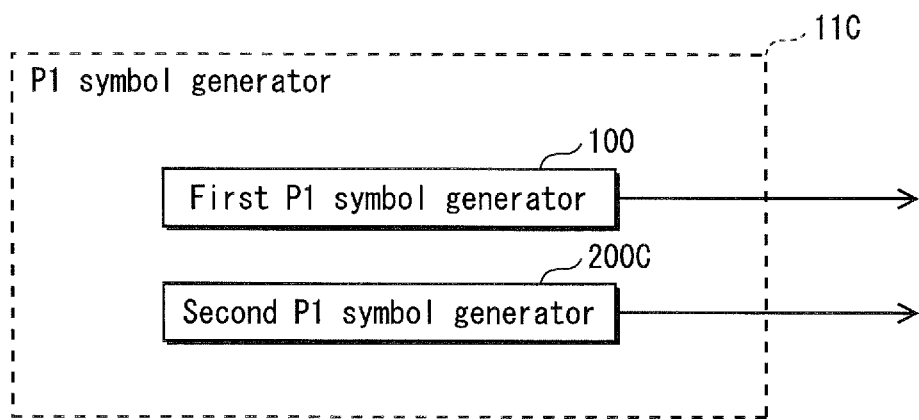
FIG. 36 is a block diagram showing the configuration of a P1 symbol generator 11C in the OFDM transmitter pertaining to Embodiment 4 of the present invention.

FIG. 36 is a block diagram showing the configuration of the P1 symbol generator 11C in the OFDM transmitter pertaining to Embodiment 4. As shown, the P1 symbol generator 11C includes a first P1 symbol generator 100, which generates a first P1 symbol by performing the process described for Embodiment 1, and a second P1 symbol generator 200C. The second P1 symbol generator 200C generates the second P1 symbol for output, using sub-carrier locations (Active and Null carrier locations) unlike those used by the second P1 symbol generators 200, 200A, and 200B of Embodiments 1 through 3. The second P1 symbol generator 200C is described below.

(Second P1 Symbol Generator)

Figure 37:
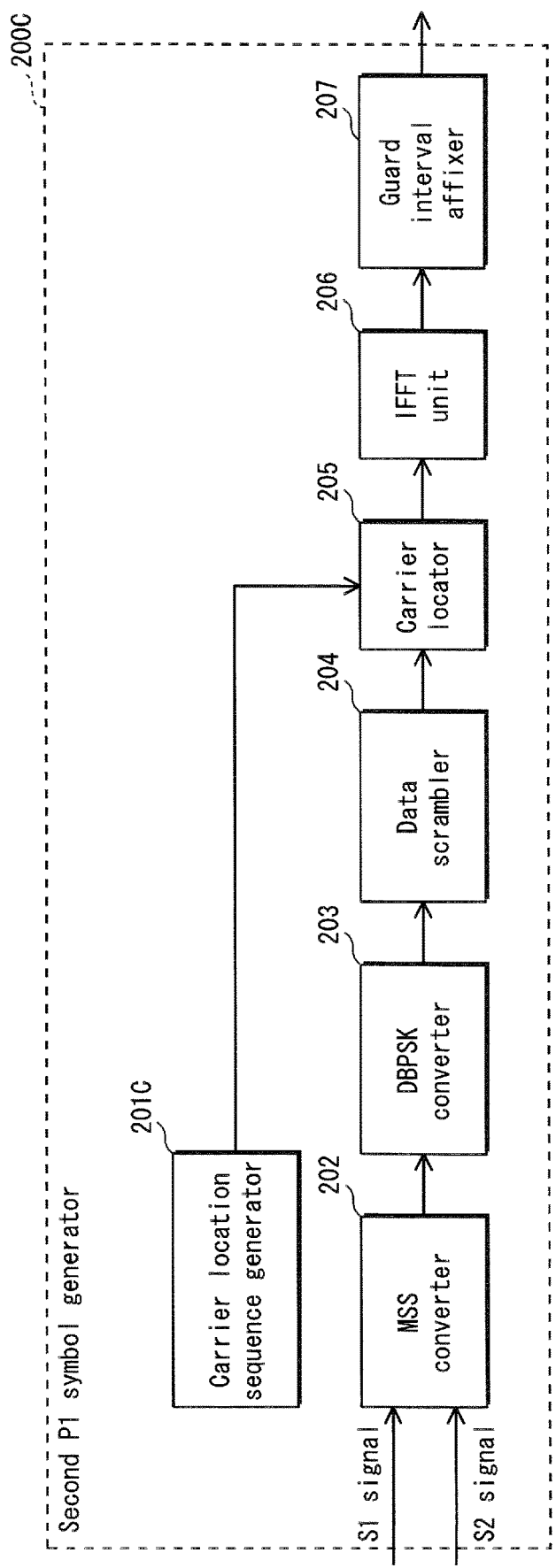
FIG. 37 is a block diagram showing the configuration of a second P1 symbol generator 200C from FIG. 36.

FIG. 37 is a block diagram showing the configuration of the second P1 symbol generator 200C from FIG. 36. In the second P1 symbol generator 200C, the carrier location sequence generator 201 of the second P1 symbol generator 200 has been replaced with a carrier location sequence generator 201C.

The carrier location sequence generator 201C generates or saves a carrier location sequence b[j] that differs from the carrier location sequence a[j] output to the carrier locator 105 by the carrier location sequence generator 101 of the first P1 symbol generator 100, and outputs the carrier location sequence b[j] to the carrier locator 205. However, the sub-carrier number j of the Active carriers are set such that b[j]=1 while the sub-carrier numbers j of the Null carriers are set such that b[j]=0. The carrier locator 205 maps data to the Active carrier using the carrier location sequence b[j] rather than the carrier location sequence a[j].

The carrier location sequence a[j] and the carrier location sequence b[j] are defined so as to assure orthogonality (non-correspondence). An example is shown in FIGS. 38A and 38B. FIG. 38A is a schematic diagram (in the frequency domain) showing the first P1 symbol sub-carrier locations (the sub-carrier locations indicated by the carrier location sequence a[j]). FIG. 38B is a schematic diagram (in the frequency domain) showing the second P1 symbol sub-carrier locations (the sub-carrier locations indicated by the carrier location sequence b[j]).

Rather than making the carrier location sequence a[j] used for the first P1 symbol and the carrier location sequence b[j] used for the second P1 symbol orthogonal, the following may be applied. The carrier location sequences a[j] and b[j] may be made such that a subset of the multiple positions indicating 0 within the carrier location sequence a[j] for the first P1 symbol are positions indicating 1 in the carrier location sequence b[j] for the second P1 symbol. That is, a subset of Null carriers for the first P1 symbol (equal in number to the subset of Active carriers for the second P1 symbol) may be used as Active carriers for the second P1 symbol. An example is shown in FIGS. 39A and 39B. FIG. 39A is a schematic diagram (in the frequency domain) showing the first P1 symbol sub-carrier locations (the sub-carrier locations indicated by the carrier location sequence a[j]). FIG. 39B is a schematic diagram (in the frequency domain) showing the second P1 symbol sub-carrier locations (the sub-carrier locations indicated by the carrier location sequence b[j]).

(OFDM Receiver)

The OFDM receiver of the present Embodiment includes a P1 symbol demodulator 26C that differs from the P1 symbol demodulator 26 of Embodiment 1. The P1 symbol demodulator 26C is described below.

(P1 Symbol Demodulator)

Figure 40:
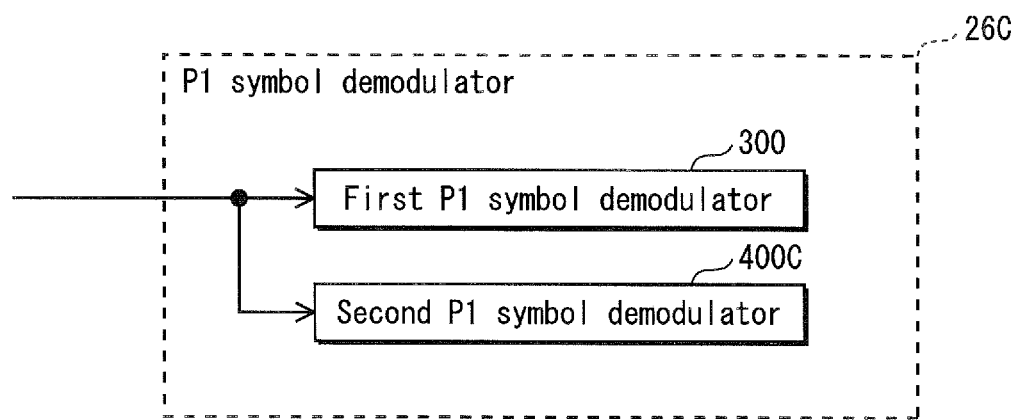
FIG. 40 is a block diagram showing the configuration of a P1 symbol demodulator 26C in the OFDM receiver pertaining to Embodiment 4 of the present invention.

FIG. 40 is a block diagram showing the configuration of the P1 symbol demodulator 26C in the OFDM receiver pertaining to Embodiment 4. The P1 symbol demodulator 26C includes a first P1 symbol demodulator 300, which performs the same process previously described for Embodiment 1, and a second P1 symbol demodulator 400C. The second P1 symbol demodulator 400C demodulates the second P1 symbol and is configured differently than the second P1 symbol demodulators 400, 400A, and 400C used in Embodiments 1 through 3. The second P1 symbol demodulator 400C is described below.

(Second P1 Symbol Demodulator)

Figure 41:
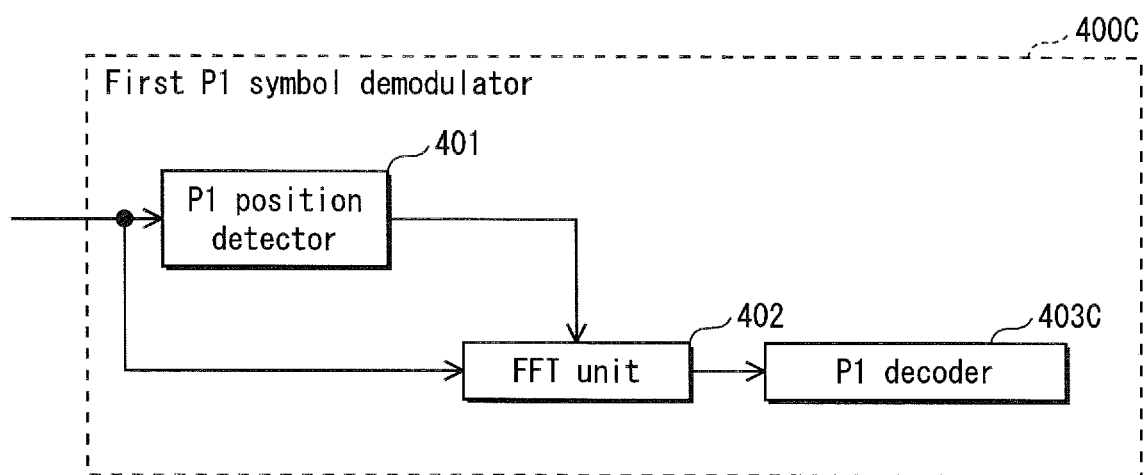
FIG. 41 is a block diagram showing the configuration of a second P1 symbol demodulator 26C.

FIG. 41 is a block diagram showing the configuration of the second P1 symbol demodulator 400C from FIG. 40. In the second P1 symbol demodulator 400C, the P1 decoder 403 of the second P1 symbol demodulator 400 from Embodiment 1 has been replaced with a P1 decoder 403C.

The P1 decoder 403C generates or stores the carrier location sequence b[j] and performs a decoding process for the second P1 symbol using the Active carriers in the frequency domain according to the carrier location sequence b[j] so generated. The P1 decoder 403C then calculates the values of the S1 and S2 signals added to the second P1 symbol to obtain transmission parameter information therefrom.

(Effects)

Figure 42:
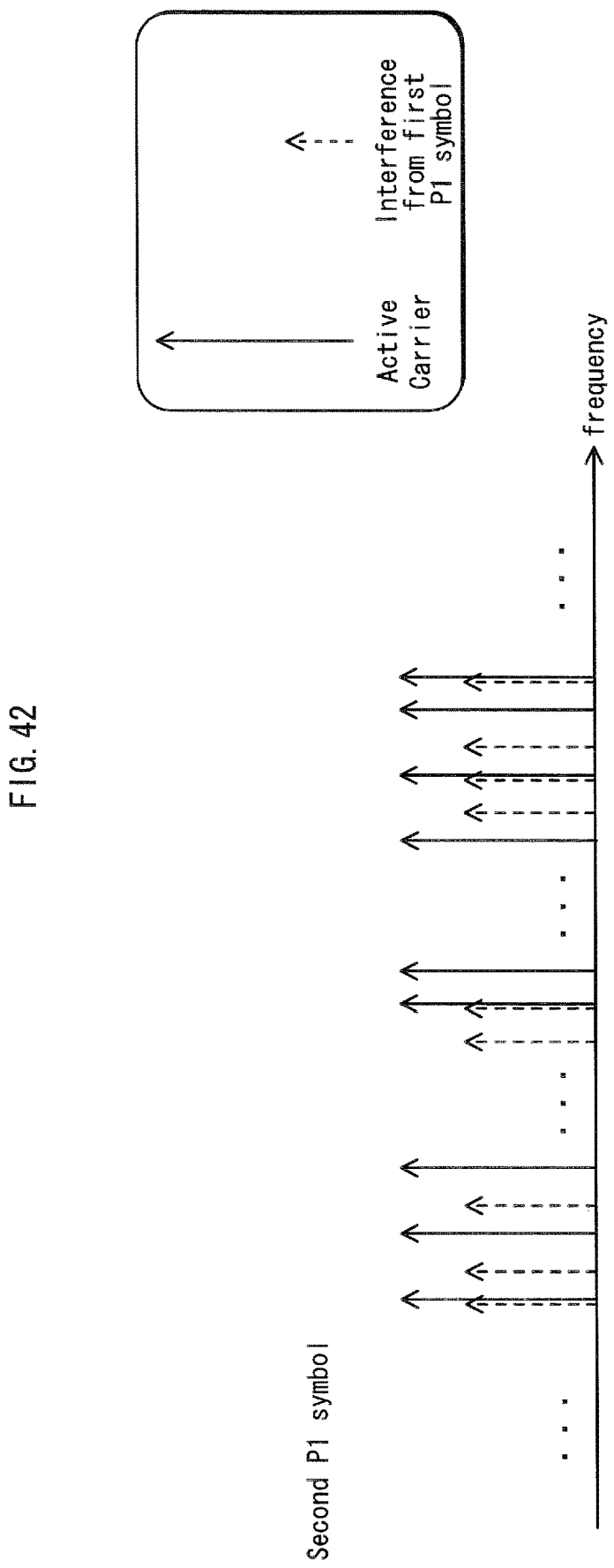
FIG. 42 is a schematic diagram illustrating interference between the first and second P1 symbols in a delayed environment.

In the OFDM transmitter and the OFDM receiver described above, the locations of the Active carriers for the first P1 symbol are different from the locations of the Active carriers for the second P1 symbol (some (but not all) of the Active carriers for the first P1 symbol have the same sub-carrier locations as some (but not all) of the Active carriers for the second P1 symbol). Thus, as shown in FIG. 42, interference is reduced in the delayed environment. By having the carrier location sequence first and second P1 symbols be orthogonal, the quantity of carriers affected by P1 symbol interference in the delayed wave is reduced by nearly half. Also, by making only the Null carrier positions for the first P1 symbol into the Active carrier positions for the second P1 symbol, the quantity of carriers affected by interference falls to almost zero. Therefore, secure reception is assured even in a delayed environment. Furthermore, when transmitting with an FEF part, the first P1 symbol comes to be at the head of the FEF part. Given that the carrier locations of the second P1 symbol differ from those of the first P1 symbol, DVB-T2 receivers can easily distinguish the first and second P1 symbols, thereby ensuring that the second P1 symbol will not be made unreceivable.

[Variations]

The present invention is not limited to the above-described Embodiments. Any other Embodiment that accomplishes or supports the accomplishment of the aims of the present invention is also possible, such as the following.

(1) In Embodiment 1, when the leading and trailing guard interval signals are generated, the first P1 symbol is frequency-shifted by +$f_{SH}$ (see FIG. 6) and the second P1 symbol is frequency-shifted by −$f_{SH}$ (see FIG. 8). However, the invention is not limited in this manner. For example, when the leading and trailing guard intervals are generated, the first P1 symbol may be frequency-shifted by +$f_{SH}$ while the second P1 symbol is frequency-shifted by +2$f_{SH}$. Any frequency shift may be used as long as the shifts applied to the first and second P1 symbols are different. This includes cases where one frequency shift is zero while the other is a non-zero value, as zero is also a possible frequency shift amount. When the second P1 symbol is frequency-shifted by $+2f_{SH}$, the second P1 symbol demodulator 400 is configured to calculate a correlation by applying a frequency shift of $-2f_{SH}$ (multiplying the multiplier 411 input signal by $\exp(-2\pi f_{SH}t)$).

(2) In Embodiment 1, the same frequency shift ($+f_{SH}$) is applied to the leading guard interval as well as the trailing guard interval of the first P1 symbol, and the same frequency shift ($-f_{SH}$) is applied to the leading guard interval as well as the trailing guard interval of the first P1 symbol. However, the invention is not limited in this manner. A different frequency shift may be applied to the leading and trailing guard intervals of the first P1 symbol, and a different frequency shift may be applied to the leading and trailing guard intervals of the second P1 symbol. In such a case, the frequency shifts applied to the leading guard intervals of the first and second P1 symbols should differ, as should the frequency shifts applied to the trailing guard intervals of the first and second P1 symbols. Then, the P1 position detector 301 shown in FIG. 13 is modified as follows, for example. The multiplier 311 applies a frequency shift to the input signal that is the inverse of the frequency shift applied to the leading guard interval signal of the first P1 symbol, then outputs the result to the delayer 312 (nothing is output to the multiplier 318). Furthermore, a new multiplier is added to the P1 position detector. The newly-added multiplier applies a frequency shift to the input signal that is the inverse of the frequency shift applied to the trailing guard interval signal of the first P1 symbol, and then outputs the result to the multiplier 318. Then, the P1 position detector 401 shown in FIG. 15 is modified as follows, for example. The multiplier 411 applies a frequency shift to the input signal that is the inverse of the frequency shift applied to the leading guard interval signal of the second P1 symbol, then outputs the result to the delayer 412 (nothing is output to the multiplier 418). Furthermore, a new multiplier is added to the P1 position detector. The newly-added multiplier applies a frequency shift to the input signal that is the inverse of the frequency shift applied to the trailing guard interval signal of the second P1 symbol, and then outputs the result to the multiplier 418.

(3) In Embodiment 1, two P1 symbols (the first P1 symbol and the second P1 symbol) are used. However, the invention is not limited in this manner. Three or more P1 symbols may also be used. In such a case, when the leading and trailing guard intervals are generated, the frequency shifts applied to each of the three or more P1 symbols should preferably differ.

(4) In Embodiment 1, the first and second P1 symbols correspond to the P1 symbol from the DVB-T2 specification, and as such, the first and second P1 symbols each have a leading guard interval of length Tc (=59 μs) and a trailing guard interval of length Tb (=53 μs). However, the invention is not limited in this manner. The length of the leading guard interval of the first and second P1 symbols may be other than Tc (=59 μs), and the length of the trailing guard interval of multiple P1 symbols may be other than Tb (=53 μs). The same applies to cases with a plurality of P1 symbols. For instance, the length of the leading guard interval of the first and second P1 symbols may be Tb (=53 μs) and the length of the trailing guard interval may be Tc (=59 μs). Alternatively, the leading and trailing guard intervals may be of equal length. In such a case, if, for example, the process performed on the second P1 symbol by the P1 position detector 301 of the first P1 symbol demodulator 300 produces mistaken results in the correlation or integral calculated by components from the multiplier 311 through the integral calculator 315 generating peaks in the trailing portion of the guard interval, or if mistaken results in the correlation or integral calculated by components from the multiplier 311 and the delayer 316 through the integral calculator 319 mistakenly generate peaks in the leading portion of the guard interval, the peaks will be eliminated through the multiplication performed by the multiplier 321. Thus, the second P1 symbol position is not mistakenly detected as the first P1 symbol position.

(5) In Embodiments 1 through 3, the first and second P1 symbols correspond to the P1 symbol from the DVB-T2 specification, and as such, the sub-carrier locations are indicated according to a carrier location sequence shown in FIG. 4 (in which the Active sub-carrier locations are indicated). However, the invention is not limited in this manner. Any type of carrier location sequence may be used. The Active carriers need not be discrete. All of the sub-carriers may be Active, or a middle portion of a plurality of sub-carriers may be used as the Active sub-carriers.

Figure 43:
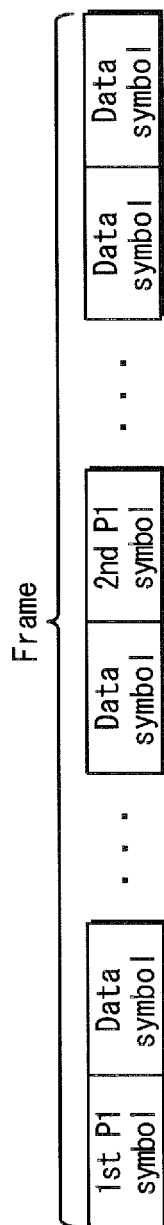
FIG. 43 is a schematic diagram showing a variation on the frame structure from FIG. 9.
Figure 44:
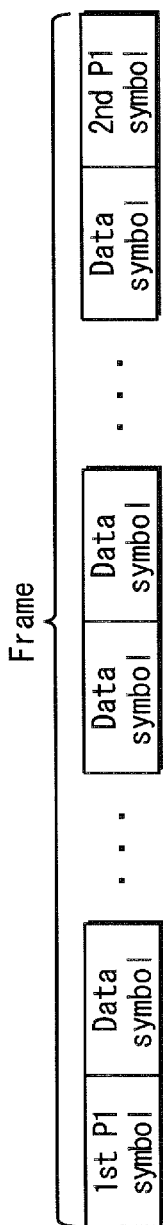
FIG. 44 is a schematic diagram showing a variation on the frame structure from FIG. 9.

(6) In Embodiments 1 through 4, the structure of the frames is, as shown in FIG. 9, such that the first P1 symbol is at the head of the frame, immediately followed by the second P1 symbol. However, the invention is not limited in this manner. As shown in FIG. 43, the first P1 symbol may be arranged at the head of the frame while the second P1 symbol is arranged farther back in the frame. Alternatively, as shown in FIG. 44, the first P1 symbol may be arranged at the head of the frame while the second P1 symbol is arranged at the end of the frame. No particular restriction is intended regarding frame structure. In FIGS. 43 and 44, the label "1st P1 symbol" shows the first P1 symbol and the label "2nd P1 symbol" shows the second P1 symbol. Furthermore, the second P1 symbol may appear only in alternate frames, for example.

(7) In Embodiments 1 through 4, a portion of the time-domain useful symbol is rotated post-IFFT to generate the time-domain guard interval signal (the leading and trailing guard intervals). However, the time-domain guard interval generation method is not limited in this manner. The following is also possible. The frequency-domain signal may be frequency-shifted pre-IFFT, so that the IFFT is applied to the frequency-domain signal after the frequency shift, with a portion of the post-IFFT time-domain signal being used as the time-domain signal of the guard interval.

(8) In Embodiments 1 through 4, the P1 symbol demodulators are configured such that the first and second P1 symbol demodulators each include the P1 position detector. However, the invention is not limited in this manner. The P1 symbol demodulators may include either one of a P1 position detector for the first P1 symbol or a P1 position detector for the second P1 symbol (e.g., include only a P1 position detector for the first P1 symbol). In such a case, the P1 position detector detects the position of one P1 symbol and estimates the position of the other P1 symbol according to that position and the relationship between the first and second P1 symbols in the transmission format being used. One FFT unit then performs an FFT according to the detected position of one P1 symbol while the other FFT unit performs an FFT according to the estimated position of the other P1 symbol. Thus, the quantity of P1 position detectors is reduced, enabling the circuit scale to be constrained.

Figure 45:
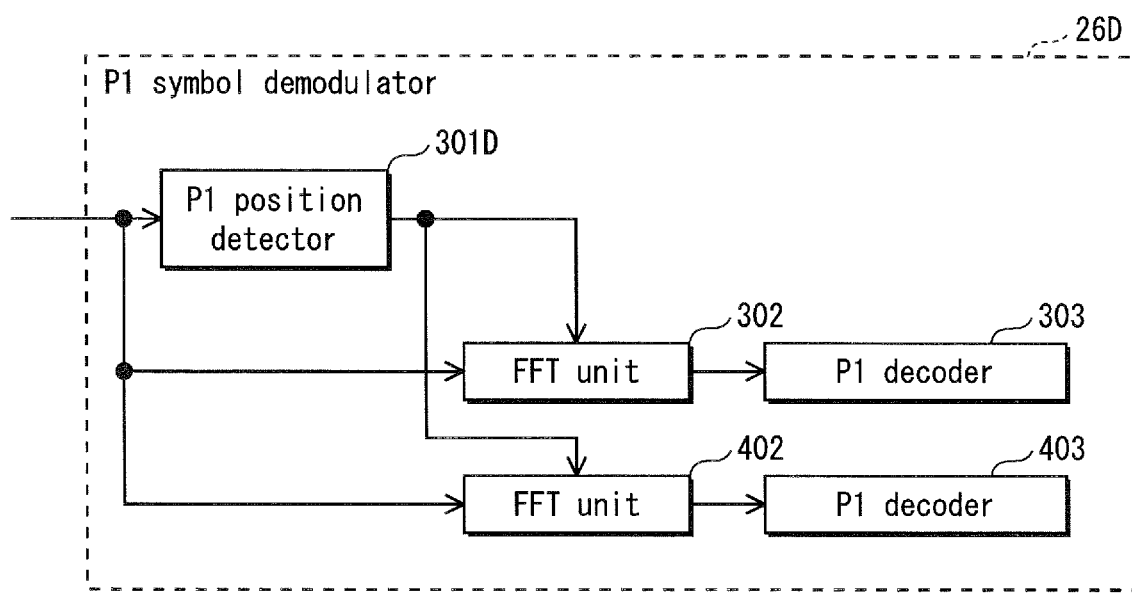
FIG. 45 is a block diagram showing the configuration of another P1 symbol demodulator 26D.

FIG. 45 shows an example configuration of a P1 symbol demodulator 26D with a P1 position detector 301D used to detect the first P1 symbol, only. This example describes a variation of the P1 symbol demodulator 26 from Embodiment 1. However, the same variation is applicable to the P1 symbol demodulators 26A, 26B, and 26C of Embodiments 2 through 4. The P1 position detector 301D of the P1 symbol demodulator 26D is configured like the P1 position detector 301 shown in FIG. 13, with the following additional functions. The P1 position detector 301D uses the positional relationship between the first and second P1 symbols in the transmission format to estimate the position of the second P1 symbol from the position of the first P1 symbol detected by the peak detector 322, and then outputs the resulting position information for the second P1 symbol to the FFT unit 402. The FFT unit 402 performs an FFT on the P1 symbol demodulator 26D input signal (a time-domain signal) according to the position information for the second P1 symbol from the P1 position detector 301D.

If M P1 symbols are used (where M is an integer, M≥3), then P1 position detectors may be included to detect each of the M P1 symbols. Alternatively, P1 position detectors may be included to detect each of M−1 P1 symbols.

(9) In Embodiments 1 through 4, the P1 symbol demodulators are configured to individually detect the first and second P1 symbol positions. However, the invention is not limited in this manner. The P1 symbol demodulator may be configured to find the positions of the first and second P1 symbols by delaying and then multiplying the product of integrals taken for each half of the first P1 symbol and the product of integrals taken for each half of the second P1 symbol, thereby causing prominent peaks to appear.

Figure 46:
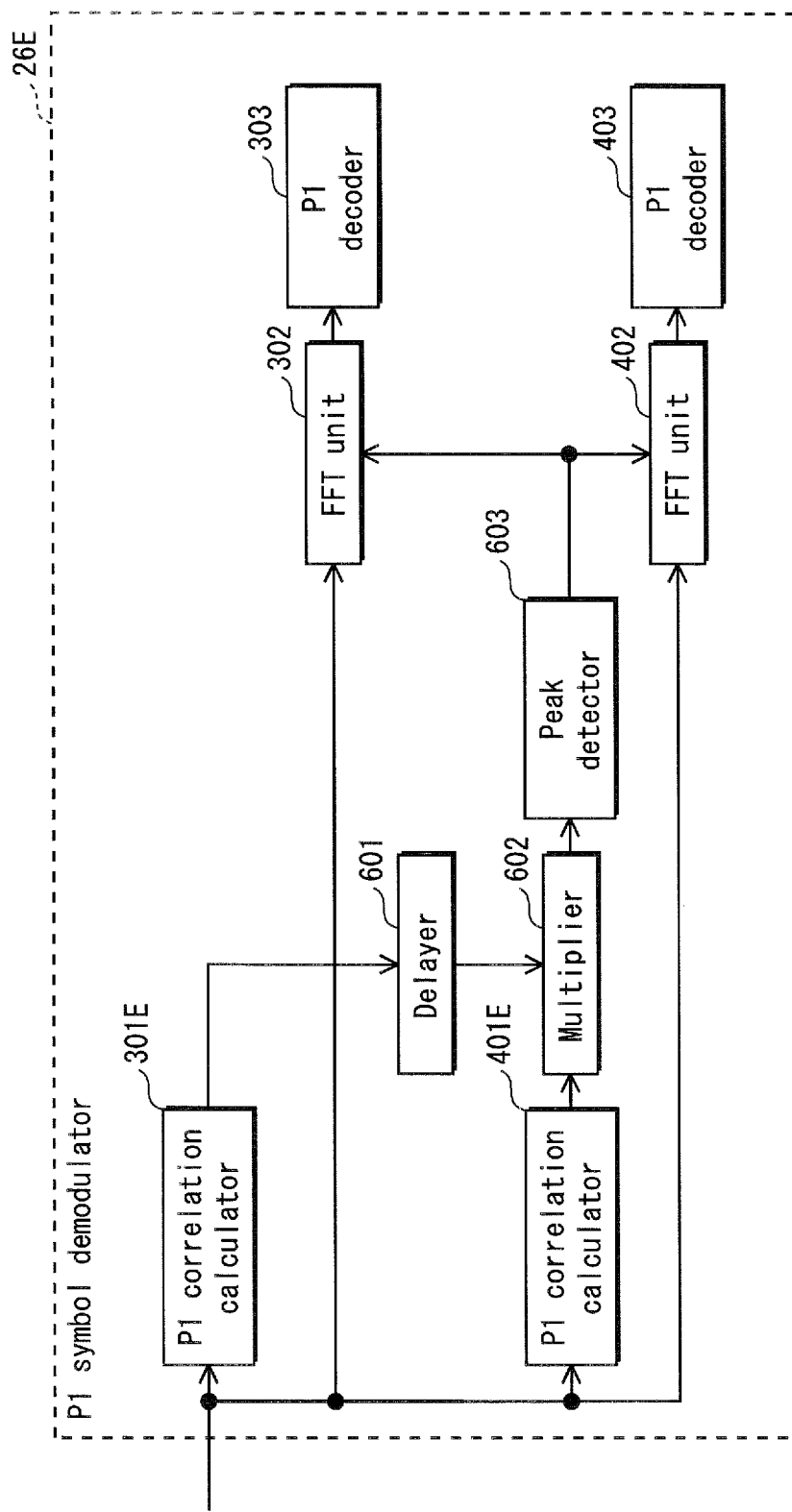
FIG. 46 is a block diagram showing the configuration of another P1 symbol demodulator 26E.

FIG. 46 shows an example configuration of a P1 symbol demodulator 26E. This example describes a variation of the P1 symbol demodulator 26 from Embodiment 1. However, the same variation is applicable to the P1 symbol demodulators 26A, 26B, and 26C of Embodiments 2 through 4.

The P1 symbol demodulator 26E includes a P1 correlation calculator 301E, a P1 correlation calculator 401E, a delayer 601, a multiplier 602, a peak detector 603, an FFT unit 302, a P1 decoder 303, an FFT unit 402, and a P1 decoder 403.

Figure 47:
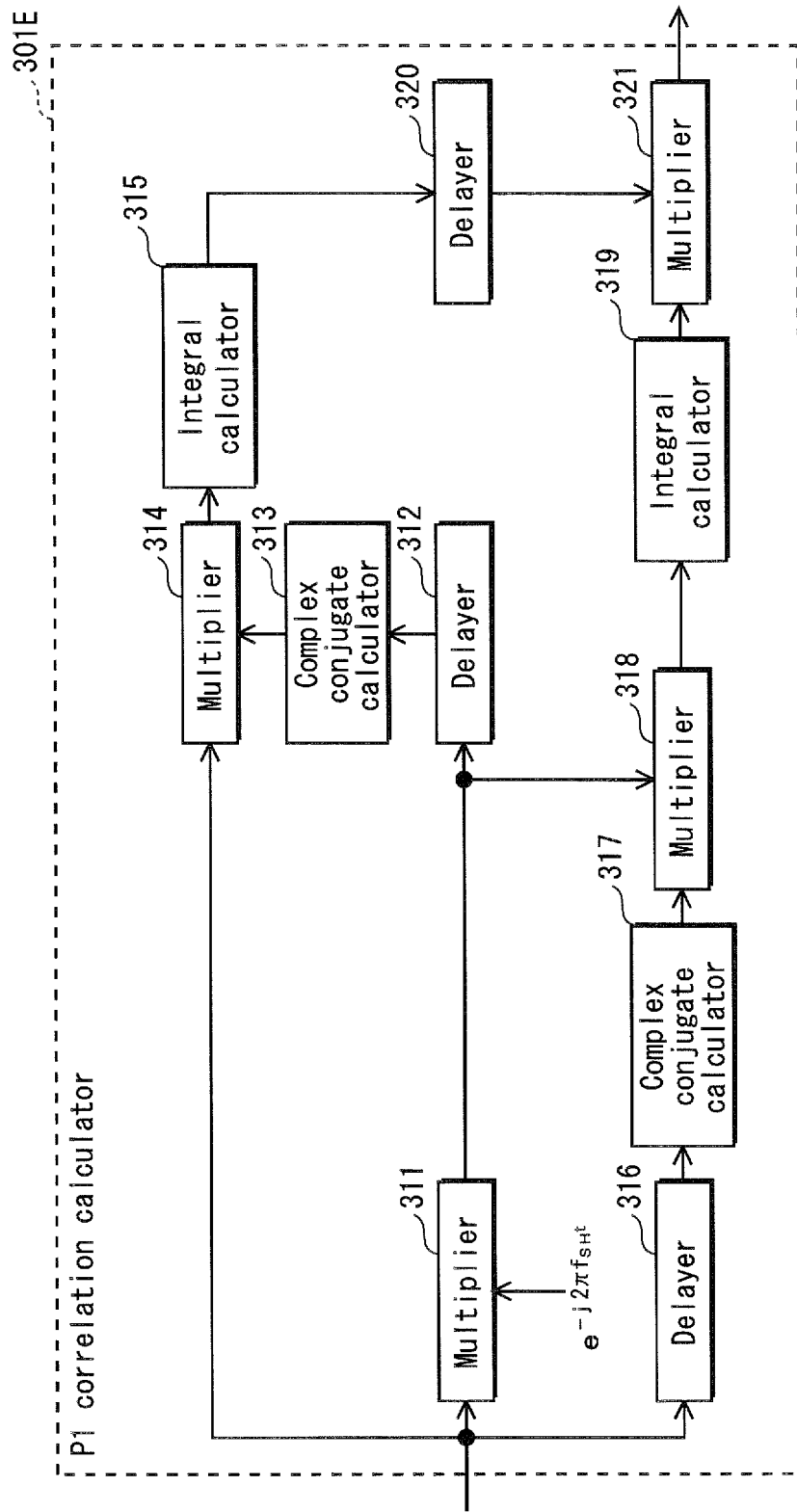
FIG. 47 is a block diagram showing the configuration of a P1 correlation calculator 301E from FIG. 46.
Figure 48:
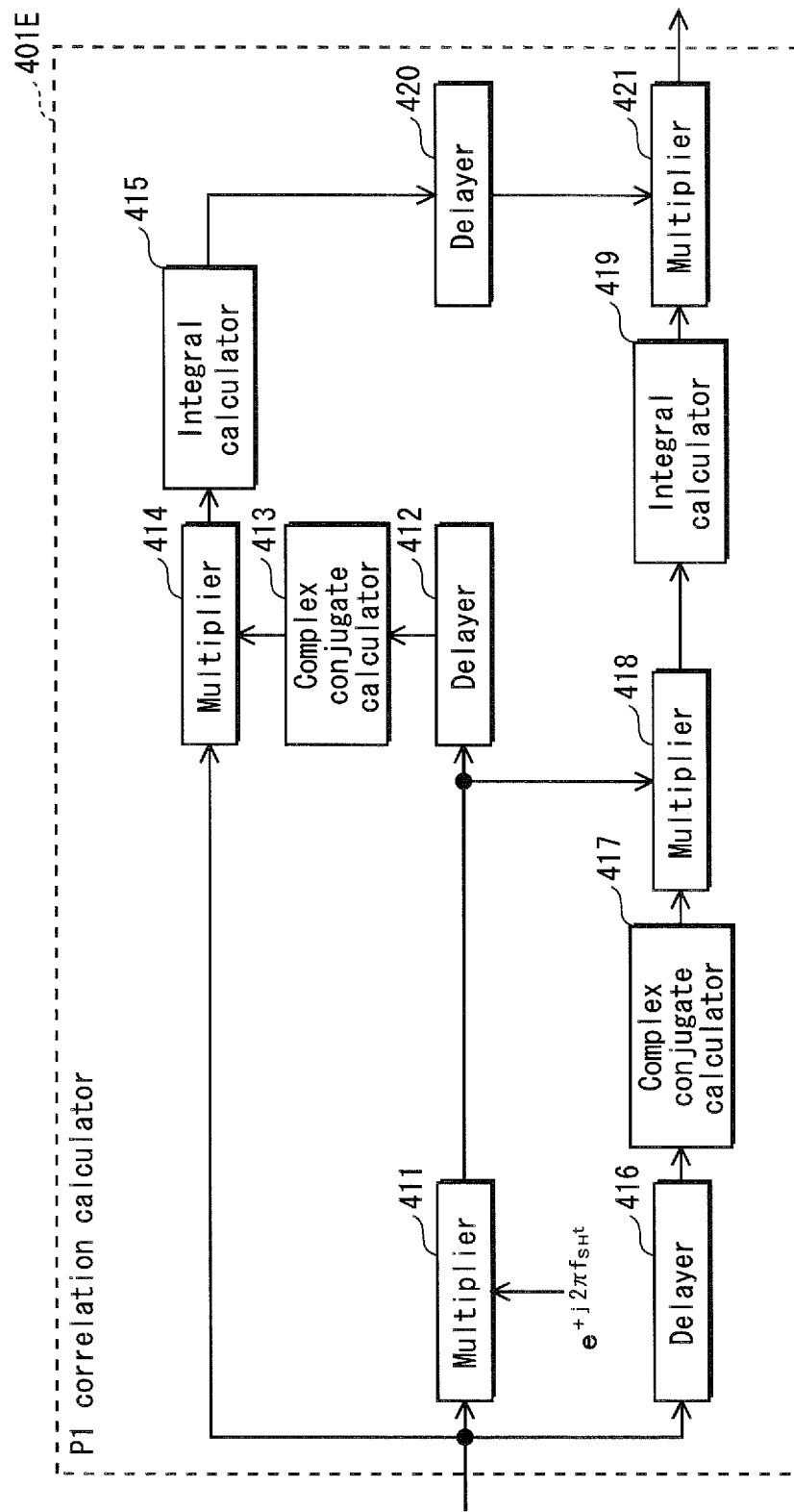
FIG. 48 is a block diagram showing the configuration of a P1 correlation calculator 401E from FIG. 46.
Figure 50:
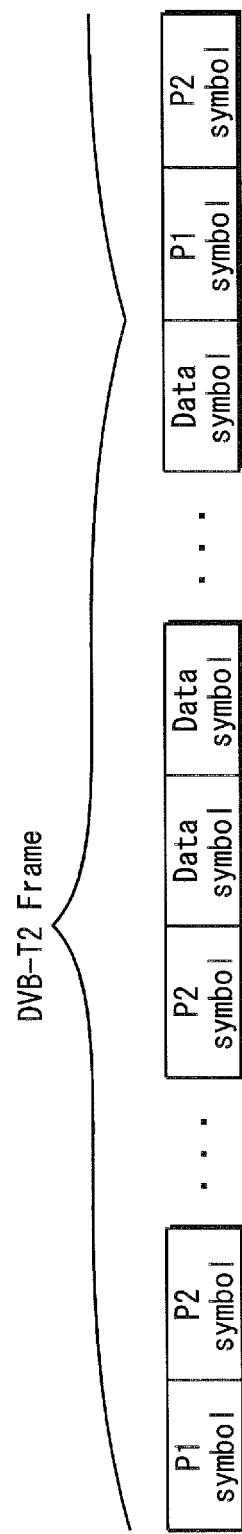
FIG. 50 is a schematic diagram illustrating the frame structure of the DVB-T2 broadcasting format.
Figure 51:
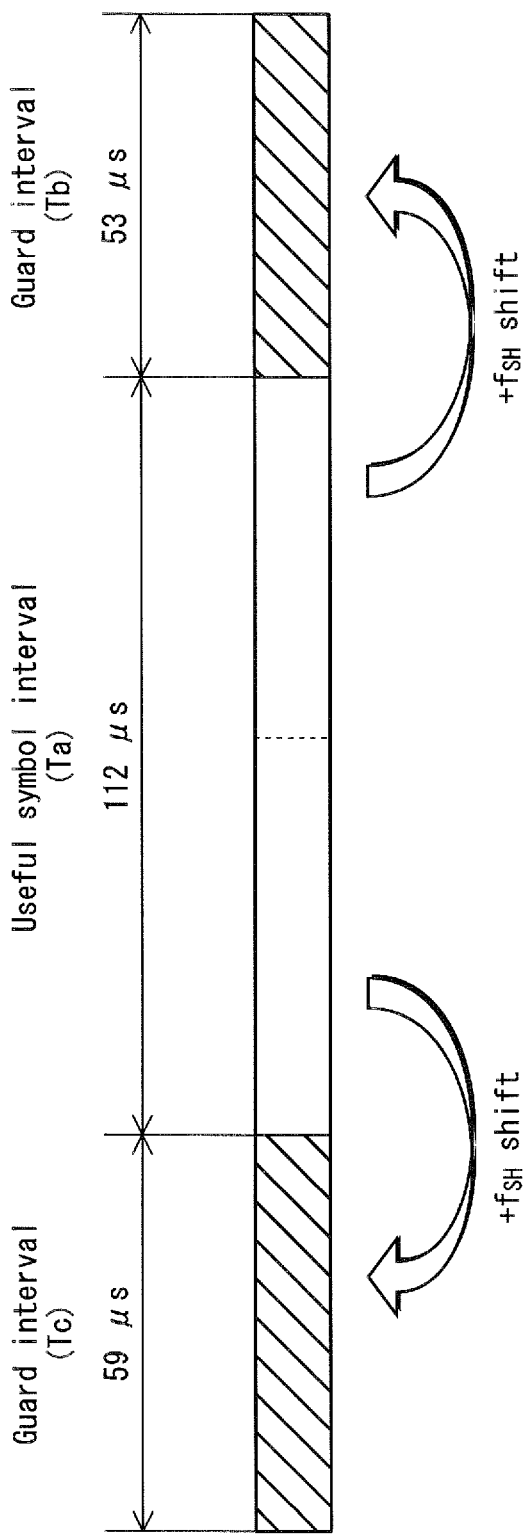
FIG. 51 is a schematic diagram illustrating the transmission format of the P1 symbol in the time dimension.
Figure 52:
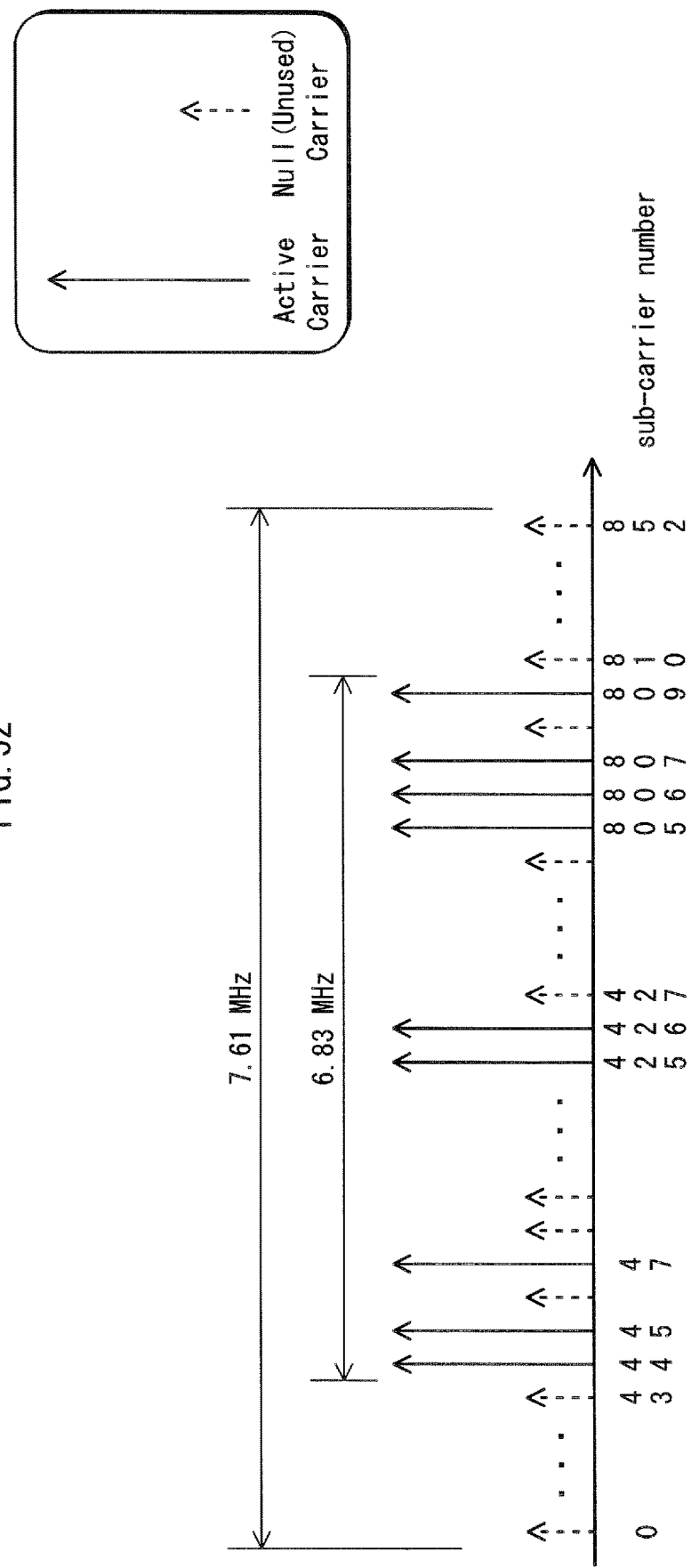
FIG. 52 is a schematic diagram illustrating the transmission format of the P1 symbol in the frequency dimension.
Figure 53:
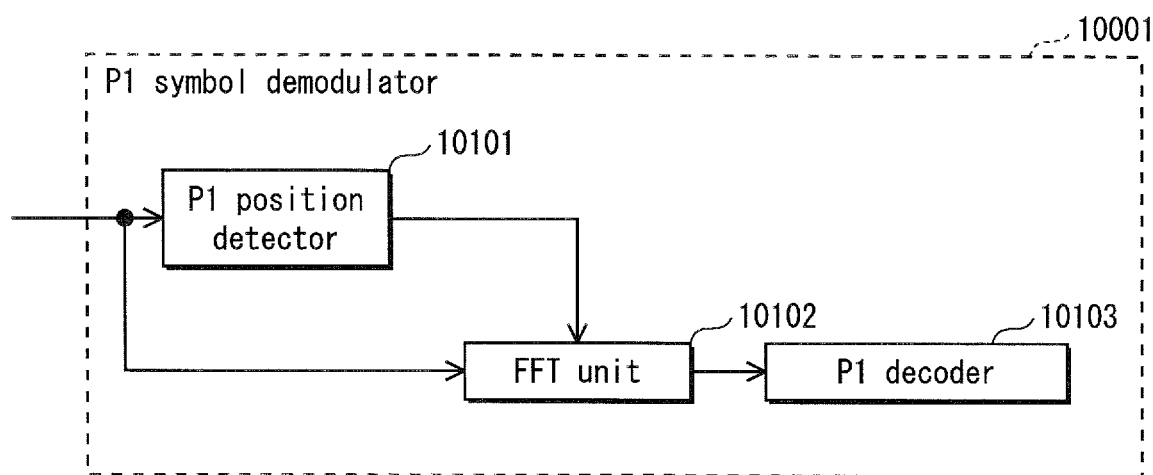
FIG. 53 is a block diagram showing the configuration of a P1 symbol demodulator 10001 according to Non-Patent Literature 1.
Figure 54:
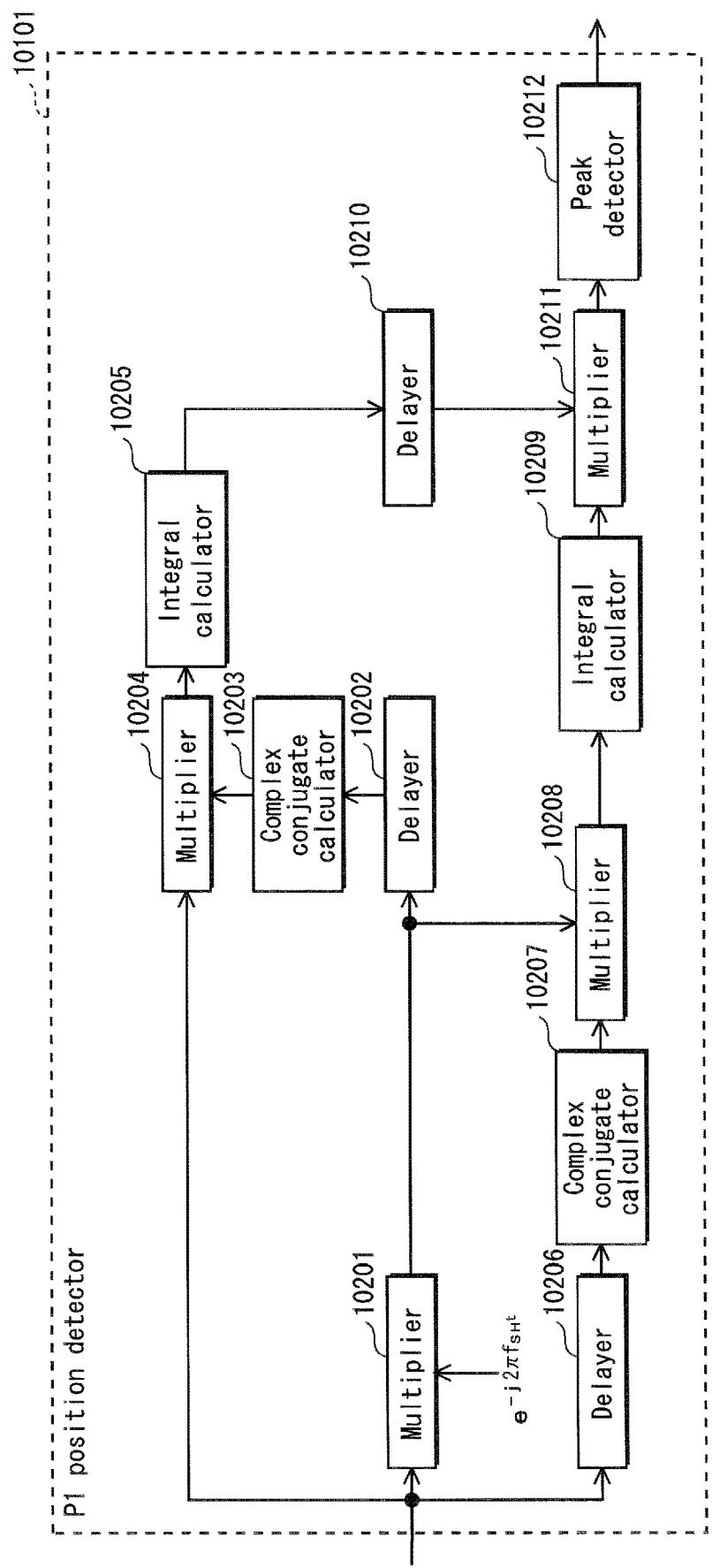
FIG. 54 is a block diagram showing the configuration of a P1 position detector 10101 from FIG. 53.

As shown in FIG. 47, the multiplier 321 of the P1 correlation calculator 301E outputs multiplication results to the delayer 601. The P1 correlation calculator 301E shown in FIG. 47 is configured identically to the P1 position detector 301 shown in FIG. 13, but lacks the peak detector 322. As shown in FIG. 48, the multiplier 421 of the P1 correlation calculator 401E outputs multiplication results to the multiplier 602. The P1 correlation calculator 401E shown in FIG. 48 is configured identically to the P1 position detector 401 shown in FIG. 15, but lacks the peak detector 422.

The delayer 601 delays the signal output by the multiplier 321 of the P1 correlation calculator 301E to match the signal output by the multiplier 421 of the P1 correlation calculator 401E (applies delay adjustments to the first and second P1 symbols) and then outputs the result to the multiplier 602. The multiplier 602 multiplies the delayer 601 output signal by the signal output by the multiplier 421 of the P1 correlation calculator 401E, and then outputs the product to the peak detector 603. The peak detector 603 detects peaks in the multiplier 602 output signal and obtains the positions of the first and second P1 symbols in the P1 symbol demodulator 27E input signal according to the detection results and the positional relationship between the first and second P1 symbols in the transmission format. Then, the peak detector 603 outputs the position information for the first P1 symbol to the FFT unit 302. The FFT unit 302 applies an FFT based on this information. The peak detector 603 outputs the position information for the second P1 symbol to the FFT unit 402. The FFT unit 402 applies an FFT based on this information. Thus, the precision of detection for the first and second P1 symbols is improved.

(10) In Embodiments 1 through 4, the P1 symbol demodulators may reduce the circuit scale by having the FFT unit and the decoder commonly realized, through multi-processing or the like.

(11) In Embodiments 1 through 4 and in the variations, the P1 position detectors and the P1 correlation calculators of the variations are configured to apply a frequency-shift that is the inverse of the frequency shift applied by the transmitter (equal in absolute value but opposite in sign) and then obtain a correlation. However, as long as the processes are mathematically similar, the frequency-shifting, delaying, and correlation calculating (complex conjugation and multiplication) processes may be performed in any order, and the direction of the frequency shift may be adjusted as required.

(12) In Embodiments 1 through 4, the transmitter applies an IFFT (an inverse orthogonal transformation) while the receiver applies an FFT (an orthogonal transformation). However, the invention is not limited in this manner. The transmitter may apply any of an inverse Fourier transform, an inverse cosine transform, an inverse wavelet transform, an inverse Hadamard transform, or any other inverse orthogonal transformation, while the receiver applies a Fourier transform, a cosine transform, a wavelet transform, a Hadamard transform, or a similar orthogonal transformation.

(13) In Embodiment 2, as shown in FIGS. 6 and 22, the span of the useful symbol used to generate the leading and trailing guard interval time-domain signals of the first and second P1 symbols is given as an example. However, the invention is not limited in this manner. The span of the useful symbol used to generate the leading guard interval time-domain signals of the first and second P1 symbols may vary (may be of a different length than the leading guard interval). Similarly, the span of the useful symbol used to generate the trailing guard interval time-domain signals of the first and second P1 symbols may vary (may be of a different length than the trailing guard interval). In such a case, the length of the leading and trailing guard intervals for the first P1 symbol may or may not be equal. The same is true of the leading and trailing guard intervals for the second P1 symbol.

(14) In Embodiment 2, a frequency shift of $+f_{SH}$ (equivalent to the sub-carrier spacing in the first and second P1 symbols) is used when generating the guard intervals for the first and second P1 symbols. However, the invention is not limited in this manner. A frequency shift of another value (including 0) may also be applied.

(15) The portion of the useful symbol used to generate the leading guard interval time-domain signals of the first and second P1 symbols may vary, as may the portion of the useful symbol used to generate the trailing guard interval time-domain signals of the first and second P1 symbols. An example is shown in FIGS. 49A and 49B. In the example shown, the guard interval inserter generates the leading guard interval by applying a frequency shift of $+f_{SH}$ to the leading part of the useful symbol for the first P1 symbol and to the trailing part of the useful symbol for the second P1 symbol, and then inserts the leading guard interval so generated at the head of the useful symbol. The above are all signals in the time-domain. Similarly, the guard interval inserter generates the trailing guard interval by applying a frequency shift of $+f_{SH}$ to the trailing part of the useful symbol for the first P1 symbol and to the leading part of the useful symbol for the second P1 symbol, and then inserts the trailing guard interval so generated at the tail of the useful symbol. These intervals are all signals in the time-domain. In such a case, as shown in FIG. 25, the P1 position detector 401A should adjust the delay imparted by the delayers 452, 456, and 460 so as to calculate the correlation.

The lengths of the leading and trailing guard intervals are given as an example. The invention is not limited in this manner. Also, the frequency shift is given as example, and the invention is not limited in this manner. A frequency shift of another value (including 0) may also be applied rather than a frequency shift of $+f_{SH}$ (equivalent to the sub-carrier spacing in the first and second P1 symbols).

(16) In Embodiment 2, the method used to generate the guard intervals may be combined with that described above for variation (15). That is, the portion and the span of the useful symbol used to generate the time-domain leading guard interval of the first P1 symbol and the portion and the span of the useful symbol used to generate the time-domain leading guard interval of the second P1 symbol may differ in length. Similarly, the portion and span of the useful symbol used to generate the time-domain trailing guard interval of the first P1 symbol and the portion and span of the useful symbol used to generate the time-domain trailing guard interval of the second P1 symbol may differ in length.

(17) In Embodiment 2 and in variations (15) and (16), two P1 symbols (the first and second P1 symbols) are used. However, the invention is not limited in this manner. Three or more P1 symbols may be used. In such a case, when the leading and trailing guard intervals are generated, at least one of the span and portion of the useful symbol used for each of the three or more P1 symbols should preferably differ.

(18) The variations described for Embodiments 1 and 2 may also be applied to Embodiment 3, with regard to the span of the useful symbol, as well as the frequency shift applied thereto, used to generate the leading and trailing guard interval time-domain signals.

(19) The method used to generate the guard intervals may be a combination of those described above for Embodiments 1 and 2, and for variation (15). In other words, the method used to generate the guard intervals may be that described above for variation (15) may be combined in Embodiment 3. That is, the portion and the span of the useful symbol, as well as the frequency shift, used to generate the time-domain leading guard interval of the first P1 symbol and the portion and the span of the useful symbol, as well as the frequency shift, used to generate the time-domain leading guard interval of the second P1 symbol may differ in all aspects. Similarly, the portion and span of the useful symbol, as well as the frequency shift, used to generate the time-domain trailing guard interval of the first P1 symbol and the portion and span, as well as the frequency shift, of the useful symbol used to generate the time-domain trailing guard interval of the second P1 symbol may differ in all aspects.

When three or more P1 symbols are used, the portion and span of the useful symbol, as well as the frequency shift applied thereto, used to generate the time-domain signal guard intervals of each P1 symbol (the leading and trailing guard intervals) may vary.

(20) In Embodiment 4, the method used to insert the guard intervals (in which the frequency shift applied to each P1 symbol differs) was described as being identical to that used in Embodiment 1. However, the invention is not limited in this manner. The method described for Embodiments 2 through 4, or for variations of Embodiments 1 through 4, may also be used to insert the guard intervals. Furthermore, the span and portion of the useful symbol, as well as the frequency shift, used to generate the leading and trailing guard interval time-domain signals of the first and second P1 symbols may be the same.

(21) In Embodiment 4, two P1 symbols are used (the first and second P1 symbols). However, the invention is not limited in this manner. Three or more P1 symbols may also be used. In such a case, the carrier location sequence used for each of the three or more P1 symbols should differ.

(22) In Embodiments 1 through 4, the P1 symbols correspond to the P1 symbols from the DVB-T2 specification. However, the invention is not limited in this manner. The P1 symbols need not necessarily correspond to the DVB-T2 specification. For example, the sub-carrier mapping carried out pre-IFFT may use a different configuration, information may be appended to all sub-carriers, and non-DBPSK differential modulation, or non-differential modulation, may be used. The guard interval may come from either half of the useful symbol, taken alone (a single guard interval signal may be generated from the entirety of the useful symbol, or only from a portion thereof). Also, the FFT size of the first and second P1 symbols need not be 1 k, and the useful symbol need not have a length of 112 μs. Furthermore, the frequency-dimension format of the first and second P1 symbols need not be constant (in terms of MSS conversion, DBSK modulation, data scrambling and so on).

(23) The components of the above-described OFDM transmitters and OFDM receivers may be realized as LSIs. In such a case, each component may be realized on an individual chip. Alternatively, some or all of the components may be realized on a single chip. Also, while LSIs are given as an example, ICs, system LSIs, super LSIs, and ultra LSIs, which vary in terms of integration density, are also plausible. Furthermore, the integrated circuit method is not limited to LSI, but may also be realized as a private circuit or as a general-purpose processor. A FPGA (Field Programmable Gate Array) or a reconfigurable processor, in which circuit cell connections within the LSI can be reconfigured, may also be used. In addition, developments in semiconductor technology or in other emerging technologies may lead to LSIs being replaced by other integrated circuit technology. Such technology may, naturally, be used to integrate the functional blocks of the present invention. Biotechnology applications are also plausible.

(24) The order of operations for the above-described OFDM transmitters may be at least partially written as a transmission program for execution by, for example, a CPU (Central Processing Unit) reading the program from memory. The aforementioned program may also be recorded on a recording medium for distribution. The order of operations for the above-described OFDM receivers may be at least partially written as a transmission program for execution by, for example, a CPU reading the program from memory. The aforementioned program may also be recorded on a recording medium for distribution.

(25) The above-described OFDM transmitters may perform only a subset of the transmission process presently explained. The above-described OFDM receivers may perform only a subset of the transmission process presently explained.

(26) Embodiments 1 through 4 and all variations thereon may be realized by any combination of an OFDM transmitter, an OFDM transmission method, a transmitter integrated circuit, an OFDM transmission program, an OFDM receiver, an OFDM reception method, a receiver integrated circuit, an OFDM reception program performing the above-described transmission or reception process. For example, a portion of the OFDM transmitter described above in the Embodiments or variations may be realized as an OFDM transmitter or as a transmitter integrated circuit, while the order of operations for all remaining portions is written as an OFDM transmission program for execution by, for example, a CPU reading the program from memory. Similarly, a portion of the OFDM receiver described above in the Embodiments or variations may be realized as an OFDM receiver or as a receiver integrated circuit, while the order of operations for all remaining portions is written as an OFDM reception program for execution by, for example, a CPU reading the program from memory.

(27) The above explanations describe control symbols used in the DVB-T2 format, called P1 symbols. However, the invention is not limited in this manner. The information transmitted thereby need not necessarily consist of transmission parameter information. Also, the above explanations are applicable to fields using OFDM transmissions with a plurality of special symbols (control symbols) that transmit control information like the P1 symbols, regardless of the presence of an FEF part.

INDUSTRIAL APPLICABILITY

The present invention is effective in the transmission and reception of multiple characteristic control symbols.

REFERENCE SIGNS LIST

11 P1 symbol generator
12 Data symbol generator
13 P1 symbol inserter
26 P1 symbol demodulator
27 Data symbol demodulator
100 First P1 symbol generator
101 Carrier location sequence generator
102 MSS converter
103 DBPSK converter
104 Data scrambler
105 Carrier locator
106 IFFT unit
107 Guard interval inserter
200 Second P1 symbol generator
201 Carrier location sequence generator
202 MSS converter
203 DBPSK converter
204 Data scrambler
205 Carrier locator
206 IFFT unit
207 Guard interval inserter
300 First P1 symbol demodulator
301 P1 position detector
302 FFT unit
303 P1 decoder
400 Second P1 symbol demodulator
401 P1 position detector
402 FFT unit
403 P1 decoder

The invention claimed is:

1. An OFDM transmission method, comprising:
generating a first control symbol and a second control symbol such that the first control symbol includes a first useful part and a first guard interval part following the first useful part and that the second control symbol includes a second useful part and a second guard interval part preceding the second useful part, the first guard interval part being a copy of at least a portion of the first useful part with frequency shifted by a first amount, the second guard interval part being a copy of at least a portion of the second useful part with frequency shifted by a second amount, the second amount being different from the first amount;
generating an information symbol different from the first control symbol and the second control symbol;
combining the first control symbol, the second control symbol, and the information symbol such that the second control symbol is provided between the first control symbol and the information symbol; and
generating an OFDM signal based on the combined symbols,
wherein the first control symbol includes a first additional guard interval part which precedes the first useful part and which is a copy of at least a portion of the first useful part.

2. An OFDM transmission device comprising:
a control symbol generator that generates a first control symbol and a second control symbol such that the first control symbol includes a first useful part and a first guard interval part following the first useful part and that the second control symbol includes a second useful part and a second guard interval part preceding the second useful part, the first guard interval part being a copy of at least a portion of the first useful part with frequency shifted by a first amount, the second guard interval part being a copy of at least a portion of the second useful part with frequency shifted by a second amount, the second amount being different from the first amount;
an information symbol generator that generates an information symbol different from the first control symbol and the second control symbol;
a combiner that combines the first control symbol, the second control symbol, and the information symbol such that the second control symbol is provided between the first control symbol and the information symbol; and
an OFDM signal generator that generates an OFDM signal based on the combined symbols,
wherein the first control symbol includes a first additional guard interval part which precedes the first useful part and which is a copy of at least a portion of the first useful part.

* * * * *